US012760800B2

(12) United States Patent
McCarty et al.

(10) Patent No.: US 12,760,800 B2
(45) Date of Patent: Oct. 13, 2026

(54) REPAIRABLE VALVE

(71) Applicant: FLOWSERVE PTE LTD, Singapore (SG)

(72) Inventors: William Russell McCarty, Spring, TX (US); Anthony Neal Hodge, Montgomery, TX (US); Phillip Michael Inman, Pearland, TX (US); Asmaa Sadek Kassab, Cypres, TX (US)

(73) Assignee: Flowserve Pte Ltd, Singapore (SG)

( * ) Notice: Subject to any disclaimer, the term of this patent is extended or adjusted under 35 U.S.C. 154(b) by 0 days.

(21) Appl. No.: 19/126,233

(22) PCT Filed: Nov. 7, 2023

(86) PCT No.: PCT/US2023/036972
§ 371 (c)(1),
(2) Date: Apr. 30, 2025

(87) PCT Pub. No.: WO2024/102377
PCT Pub. Date: May 16, 2024

(65) Prior Publication Data

US 2026/0177150 A1 Jun. 25, 2026

Related U.S. Application Data

(60) Provisional application No. 63/382,629, filed on Nov. 7, 2022.

(51) Int. Cl.
*F16K 5/06* (2006.01)
*F16K 1/44* (2006.01)
(Continued)

(52) U.S. Cl.
CPC ............ *F16K 5/0689* (2013.01); *F16K 1/443* (2013.01); *F16K 5/0626* (2013.01);
(Continued)

(58) Field of Classification Search
CPC .... F16K 5/0626; F16K 5/0647; F16K 41/026; Y10T 137/6031; Y10T 137/6035; Y10T 137/6048; Y10T 137/6062
See application file for complete search history.

(56) References Cited

U.S. PATENT DOCUMENTS 3,056,576 A 10/1962 Kulisek
3,462,120 A 8/1969 Priese
(Continued)

FOREIGN PATENT DOCUMENTS

CN 105003677 10/2018
EP 3665409 6/2021
(Continued)

*Primary Examiner* — Kevin F Murphy
(74) *Attorney, Agent, or Firm* — Daniel N. Lundeen; Lundeen & Lundeen PLLC

(57) ABSTRACT

Repairable valve with in-line replaceable stem. A bracket fixedly supported from the valve body has a stem opening aligned with the stem bore. A shear bushing rotatably receives a first end of the stem and a second end of the stem engages the flow control element. The bushing is rotatably disposable axially between the bracket and a stem shoulder. The bushing has a profile cooperating with a profile of the stem opening for selective retention of the valve stem by the bracket or release of the shear bushing and valve stem for axial passage through the stem opening. Also, repairable trim with downstream seats removable by a tool inserted through the inlet end; trim insertable as a cartridge; trim with a lapped downstream seat land; hub end connectors; bidirectional valves; and methods and tools for assembling and servicing the valves.

26 Claims, 17 Drawing Sheets

(51) Int. Cl.
*F16K 31/122* (2006.01)
*F16K 31/60* (2006.01)

(52) U.S. Cl.
CPC ........ *F16K 5/0647* (2013.01); *F16K 31/1221* (2013.01); *F16K 31/60* (2013.01); *Y10T 137/6035* (2015.04); *Y10T 137/6062* (2015.04)

(56) References Cited

U.S. PATENT DOCUMENTS

| | | | |
|---|---|---|---|
| 3,480,253 | A | 11/1969 | Priese et al. |
| 3,484,079 | A | 12/1969 | Reagan |
| 4,247,080 | A | 1/1981 | Morrison |
| 4,342,444 | A | 8/1982 | Sonderman |
| 4,477,055 | A | 10/1984 | Partridge |
| 4,587,990 | A | 5/1986 | Pennell et al. |
| 4,637,421 | A | 1/1987 | Stunkard |
| 4,802,652 | A | 2/1989 | Kaniut et al. |
| 4,815,701 | A | 3/1989 | Stone |
| 5,277,404 | A | 1/1994 | Andersson |
| 5,333,834 | A | 8/1994 | Soderberg |
| 5,524,863 | A | 6/1996 | Davis |
| 5,927,685 | A | 7/1999 | Gosling |
| 6,669,171 | B1 | 12/2003 | Stunkard |
| 7,093,819 | B1 | 8/2006 | Hall et al. |
| 7,249,751 | B2 | 7/2007 | Hall et al. |
| 7,267,323 | B1 | 9/2007 | O'Callaghan |
| 7,690,626 | B2 | 4/2010 | Stunkard |
| 7,836,909 | B2 | 11/2010 | Church |
| 7,850,143 | B1 | 12/2010 | Rosada et al. |
| 7,887,025 | B2 | 2/2011 | Harmna et al. |
| 8,100,199 | B2 | 1/2012 | Braddick |
| 8,308,132 | B2 | 11/2012 | Partridge |
| 8,312,889 | B2 | 11/2012 | Oltman et al. |
| 8,672,042 | B2 | 3/2014 | Braddick |
| 8,770,546 | B2 | 7/2014 | Fan |
| 8,998,173 | B2 | 4/2015 | Buck |
| 9,249,889 | B1 | 2/2016 | Anderson et al. |
| 9,366,345 | B2 | 6/2016 | Anderson et al. |
| 9,488,033 | B2 | 11/2016 | Buck |
| 9,500,285 | B2 | 11/2016 | Anderson et al. |
| 9,551,425 | B2 | 1/2017 | Buck |
| 9,958,080 | B2 | 5/2018 | Fan |
| 10,400,901 | B2 | 9/2019 | Salem et al. |
| 10,539,242 | B2 | 1/2020 | Balan et al. |
| 11,137,077 | B2 | 10/2021 | Buck |
| 11,162,595 | B2 | 11/2021 | Scattini |
| 11,199,270 | B1 | 12/2021 | Valera et al. |
| 11,644,109 | B2 | 5/2023 | Laverty et al. |
| 2002/0166588 | A1 | 11/2002 | Dean |
| 2005/0269542 | A1 | 12/2005 | Scaramucci |
| 2006/0237677 | A1 | 10/2006 | Williams et al. |
| 2015/0137020 | A1 | 5/2015 | Fan |
| 2016/0146355 | A1 | 5/2016 | Anderson et al. |
| 2019/0226613 | A1 | 7/2019 | Schneider et al. |
| 2020/0141507 | A1 | 5/2020 | McGuire et al. |
| 2020/0370658 | A1 | 11/2020 | McGuire et al. |
| 2020/0408310 | A1 | 12/2020 | McGuire et al. |
| 2021/0123533 | A1 | 4/2021 | Mullins et al. |
| 2022/0120350 | A1 | 4/2022 | Valera et al. |

FOREIGN PATENT DOCUMENTS

| | | |
|---|---|---|
| GB | 2238094 | 5/1991 |
| KR | 102006924 | 8/2019 |

REPAIRABLE VALVE

BACKGROUND

High-reliability valves suitable for high pressure steam service with trim inserted through only one end of a flow bore are disclosed in commonly assigned U.S. Pat. Nos. 7,093,819 and 7,2497,51. Such valves are generally welded in place in the line in which they are installed, necessitating cutting of the line to remove and replace them. Additionally, the valve stem has a blowout prevention feature which prevents the stem from being removed without removing the valve from the line and first removing the upstream seat and ball. Thus, to repair the stem packing in-line (without removing the valve), cut ring packing must be used since the stem cannot be removed. Moreover, the valves are not generally repairable due to the inability to remove the downstream seat without damaging the seat and/or valve body and the valves are thus generally replaced in their entirety.

Moreover, during assembly of such valves, it can be difficult to place the ball and upstream seat in the flow passage because these elements are floating in the flow passage and the ball needs to be aligned to properly engage the stem, which is installed first in the '819 and '751 patents.

Additional references of interest include U.S. Pat. Nos. 4,342,444, 6,669,171, 7,690,626, 7,850,143, 8,998,173, 9,249,889, 9,488,033, 9,551,425, 10,400,901, 11,137,077, 11,644,109, KR102006924, US2019226613, GB2238094, U.S. Pat. Nos. 4,637,421, 11,199,270, US2022120350, CN111810668, US2020141507, US2020370658. US2020408310, US2021123533, EP3665409, U.S. Pat. No. 10,400,901, 11,162,595, CN105003677, US2015137020, U.S. Pat. Nos. 9,958,080, 8,770,546, 10,539,242, 8,312,889, 8,308,132, 8,100,199, 8,672,042, 7,88,7025, 7,836,909, 7,267,323, 3,056,576, 3,462,120, 5,333,834, 5,524,863, 4,247,080, 4,587,990, 5,277,404, 4,815,701, 4,802,652, 4,477,055, 11,137,077, 8,998,173, 9,488,033, 9,551,425, 9,249,889, 9,366,345, 9,500,285, 7,690,626, 6,669,171, 4,342,444, 3,484,079, and 3,480,253.

What is needed is such a valve with a stem that is removable in-line so that the stem packing can be replaced, while retaining the blowout prevention features; a valve that can be installed without welding; a valve that can be repaired by removing the valve internals without damaging the valve body and/or the internals; a valve design that facilitates proper placement of the floating ball in the flow passage; and/or a valve that can be easily assembled, disassembled and serviced by inserting and/or removing the valve trim internals through one end of the flow bore.

SUMMARY OF THE INVENTION

The present invention addresses the valve stem removability issues of the prior art valves in an embodiment by using a shear bushing having a noncircular outer profile that cooperates with a profile of a stem opening in the stem bracket such that the shear bushing can be selectively rotated on the valve stem to pass through the opening to release or install the valve stem, or prevented from passing through the opening so the shear bushing and the valve stem are retained by the bracket.

Stated another way, the present invention addresses the issues with the prior art valves in an embodiment by using a shear bushing rotatable on the stem with respect to the bracket that has at least one laterally extending portion with a radial dimension larger than a minor inside diameter (ID)

of a bracket opening, and one or more matching lateral openings in the bracket opening. The stem can be selectively retained by or removed through the bracket opening by offsetting or aligning the laterally extending portions of the bushing with the matching openings of the bracket bore.

For example, the shear bushing can have a major outside diameter (OD), a minor OD. and one or more minor OD portions alternated with one or more lobes extending to the major OD; and the stem opening can have a minor ID, a major ID, and one or more minor ID portions alternated with one or opening passages extending to the major ID, where the minor ID portions can axially pass the minor OD portions and the opening passages can axially pass the lobes.

Also, the present invention provides embodiments addressing the placement of the flow control element in a floating ball valve configuration where the valve trim is inserted through one end of the flow bore, by using a cartridge assembly that, during assembly, releasably retains the relative position of the flow control element in engagement with the upstream seat assembly and/or aligns the flow control element with the downstream seat element in its approach to the downstream seat; and upon engagement with the downstream seat releases the flow control element to float between the upstream and downstream seat elements.

For example, the cartridge assembly can use an annular spacer following behind the flow control element to support an expandable sleeve to releasably engage the flow control element and hold the upstream seat assembly between the annular spacer and the flow control element for insertion into the flow bore, where the valve comprises an outwardly tapered surface to expand the sleeve and release the flow control element to float between the upstream and downstream seat elements. The sleeve assembly can, for example, have retention arms inwardly angled to a small angle and spaced around the flow control element, and the outwardly tapered surface can, for example, be provided as a tapered annular surface formed on the downstream seat adjacent the downstream seat element positioned to engage leading ends of the retention arms and spreads them apart as the cartridge is advanced to release the flow control element to float.

Further, the present invention provides embodiments addressing the repairability of floating ball valves where the valve trim is inserted through one end of the flow bore, by using repairable trim where the seat body is removable through the flow bore for service or replacement. For example, the seat body can be threaded or friction fit into an entry bore into the outlet bore where it can be removed with a tool that can be inserted in the flow bore; or it can sealingly engage a seat landing secured in the entry bore.

In certain embodiments, the assembly or disassembly of the repairable valve trim comprising a floating flow control element using the cartridge assembly and/or the removable downstream seat body, is enabled or facilitated by the ability to install and/or remove the valve trim free of valve stem intrusion into the flow bore that might otherwise interfere with placement or removal of the valve trim components, since the valve stem can be installed after the valve trim is installed or removed before the valve trim is removed, even when the valve body and bracket are integrally forged and there is a stem blowout prevention feature. For example, placement or removal of the flow control element in the flow bore of a valve with a stem blowout feature, where the single piece valve body and stem bracket are integrally formed together, e.g., by forging, can be free of interference from the valve stem.

In one aspect, embodiments of the present invention provide a valve comprising:

a valve body comprising a flow bore and a stem bore;

a flow control element rotatably disposed in the flow bore;

a bracket fixedly supported from the valve body and comprising a stem opening aligned with the flow bore;

a valve stem rotatably disposed in the stem bore and comprising a first end disposed in a central bore of a shear bushing adjacent the bracket, a stem shoulder to engage the shear bushing adjacent the first end, and a second end engaging the flow control element; and a bushing profile of the shear bushing cooperating with an opening profile of the stem opening for selective retention and release of the valve stem, wherein the shear bushing is rotatable between a stem release position, wherein the bushing profile is aligned with the opening profile and the shear bushing can pass through the stem opening, and a stem retention position, wherein the bushing profile is offset with respect to the opening profile and the bracket and stem shoulder engage opposite sides of the shear bushing to retain the valve stem in the stem bore.

In another aspect, embodiments provide a method of inserting a valve stem in a valve that comprises:

installing a flow control element in a flow passage through a valve body;

inserting a first end of a valve stem into a central bore of a shear bushing;

inserting the valve stem into a stem opening through a bracket fixedly supported from the valve body;

radially aligning the shear bushing with respect to the bracket in a stem release position wherein a bushing profile of the shear bushing cooperates with an opening profile of the stem opening for axial passage of the shear bushing through the stem opening;

axially positioning the shear bushing between the bracket and a stem shoulder on the valve stem;

inserting a second end of the valve stem into a stem bore through the valve body to engage the flow control element; and rotating the shear bushing into a stem retention position wherein the bushing profile is offset from the opening profile and the bracket and a stem shoulder on the valve stem engage opposite surfaces of the shear bushing to retain the valve stem in the stem bore.

In another aspect, embodiments of the present invention provide a repairable valve. The valve comprises:

a valve body with an axial fluid flow bore therethrough;

a spherical flow control element disposed in the flow bore and rotatable between open and closed positions;

a valve stem having one end in engagement with the flow control element for rotation thereof, the valve stem removably passing through a stem bore formed through the valve body;

wherein the fluid flow bore comprises a main passage, an inlet end, and an outlet end, wherein the main passage has a diameter larger than a diameter of the flow control element, wherein one of the inlet and outlet ends has an innermost diameter equal to or larger than the diameter of the main passage;

valve trim comprising a downstream seat and an upstream seat assembly, the downstream seat disposed between the outlet end and the flow control element for sealing between the flow control element and the valve body, wherein the downstream seat comprises a body seal to sealingly engage the valve body and a seat element having a sealing surface to sealingly engage the flow control element, wherein the upstream seat assembly, the flow control element, and at least the downstream seat element are removable from the valve body through one end of the flow bore; and the upstream seat assembly disposed in the main passage between the inlet end and the flow control element, the upstream seat assembly comprising a spring to bias an upstream seat element against the flow control element and the flow control element against the downstream seat element, wherein the flow control element floats between the upstream and downstream seat elements; and a retainer removably attached to the valve body about the fluid flow bore and having one or more projections into the flow bore to secure the downstream seat, the flow control element, and the upstream seat assembly in the flow bore and load the spring.

In another aspect, a method of assembling the repairable valve just described comprises the steps of:

installing the downstream seat into the main passage adjacent the outlet end for sealing engagement with the valve body;

installing the flow control element into the main passage against the downstream seat;

installing the upstream seat assembly into the main passage against the flow control element; and installing the retainer and loading the spring to bias the upstream seat element against the flow control element and the flow control element against the downstream seat element.

In another aspect, a method of servicing the repairable valve just described comprises the steps of:

removing the retainer;

removing the upstream seat assembly from the main passage;

removing the flow control element from the main passage; and removing at least a seat element of the downstream seat from the main passage.

In another aspect, embodiments of the present invention provide a repairable valve assembly system, comprising components adapted to be assembled together into a repairable valve. The components comprise:

a valve body with an axial fluid flow bore therethrough, wherein the fluid flow bore comprises a main passage, an inlet end, and an outlet end;

a downstream seat adapted to be inserted into the main passage through the inlet end and at least a portion of the downstream seat sealingly secured to the valve body adjacent the outlet end, wherein the downstream seat comprises a seat element having a sealing surface to sealingly engage a flow control element and a tapered outer surface adjacent the sealing surface, wherein at least the downstream seat element is removable from the valve body through the inlet end;

a cartridge assembly adapted to be inserted into the main passage through the inlet end, the cartridge assembly comprising:

the flow control element, wherein the flow control element has a diameter less than the diameter of the main passage;

an upstream seat assembly comprising an upstream seat element having a surface to engage the flow control element, an annular spacer having an outside diameter larger than the flow control element, and a spring disposed between the spacer and the upstream seat element; and a sleeve receiving the flow control element and at least a portion of the spacer, wherein the sleeve comprises radially spaced arms extending axially from a base at a first end adjacent the spacer to a second end extending beyond the flow control element;

wherein the arms are positioned at a small angle with respect to a longitudinal axis to hold the flow control element in engagement with the upstream seat element, the upstream seat element in engagement with the spring, and the spring in engagement with the spacer in an installation configuration; and wherein installation of the cartridge assembly in the installation configuration through the inlet end of the flow bore causes the second ends of the arms to contact the taper, spread the arms apart, and release the flow control element to float between the upstream and downstream seat elements; and a retainer adapted to be removably attached to the valve body about the fluid flow bore and having one or more projections into the flow bore to secure the downstream seat, the flow control element, and the upstream seat assembly in the flow bore and load the spring.

In another aspect, embodiments of the present invention provide a method of assembling a valve from the components just described. The method comprises the steps of:

installing the downstream seat through the inlet end and securing at least a portion of the downstream seat in sealing engagement with the valve body;

inserting the cartridge assembly through the inlet end and into the main passage until the arms contact the taper of the downstream seat element;

advancing the cartridge assembly to spread the arms apart and release the flow control element and the upstream seat element; and installing the retainer through the inlet end to load the spring and bias the upstream seat element against the flow control element and the flow control element against the downstream seat element.

In another aspect, embodiments of the present invention provide a repairable bidirectional version of such valves. The upstream seat element has a sealing surface to sealingly engage the flow control element. The retainer comprises an annular plug having an enlarged end threadedly engaged in the inlet end. A gasket is shouldered between the enlarged end of the plug and the valve body.

BRIEF DESCRIPTION OF THE DRAWINGS

The invention is described below in reference to the following drawing figures in which.

DETAILED DESCRIPTION

Definitions

Figure 1:
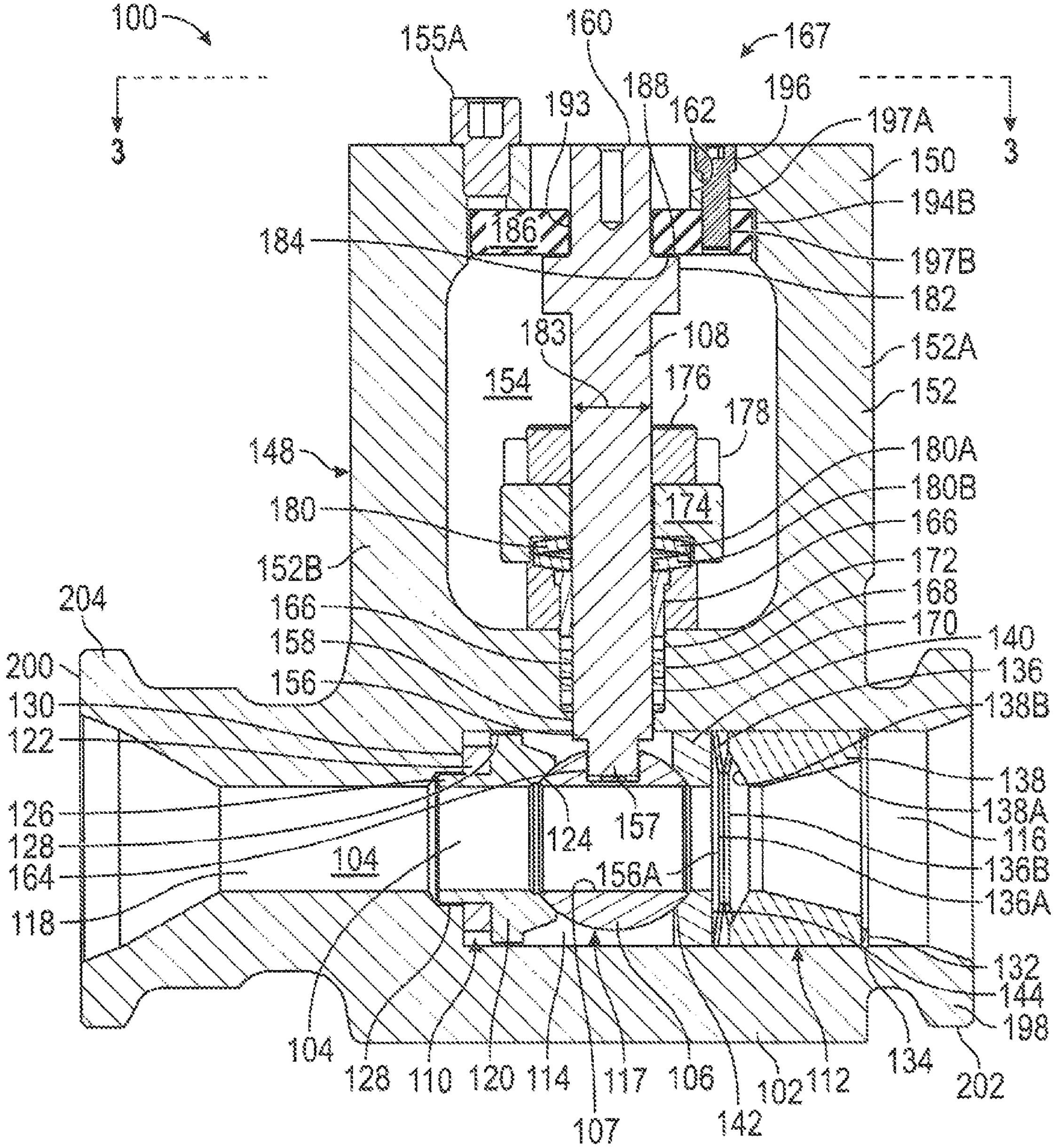
FIG. 1 is a cross-sectional view of a repairable valve according to an embodiment of the present invention.

As used herein, the term “adjacent” refers to something in, on, or near something else; not distant.

As used herein, the term “assembly” refers to the fitting together of manufactured parts into a complete machine, structure, or unit of a machine, or a collection of parts so assembled.

As used herein, the term “axially” refers to located in the direction of an axis.

As used herein, the term “flow control element” refers to an at least partially spherical plug having a flow control bore therethrough which can be rotated to allow or block or control fluid flow.

As used herein, the term “ball valve” refers to a valve having a generally spherical flow control element disposed in a flow passage through a body of the valve that can be rotated to align (“open”) or un-align (“closed”) a flow control bore through the flow control element with the flow bore through the valve body.

As used herein, the term "Bi-directional" refers to a valve that is operable to seal against flow in both directions, i.e., when a high pressure is applied to the normally upstream side, as well as when a high pressure is applied to the normally downstream side.

As used herein, the term "bore" refers to a hole or passage made by or as if by use of a drill.

As used herein, the term "bracket" refers to a support member that provides attachment locations.

As used herein, the term "butterfly profile" refers to a profile having a relatively slender central body and a pair of opposing wings extending outwardly from the body.

As used herein, "cartridge" refers to a small modular unit designed to be inserted into a larger piece of equipment.

As used herein, "central" refers to containing or constituting a center: situated at, in, or near the center.

As used herein, the term "clamping hub" refers to a flanged hub suitable for sealingly clamping to a similarly flanged hub of adjoining piping, e.g., pipe, pipe fitting or another component.

As used herein, the term "contiguous" refers to connecting without a break.

As used herein, "embodiments" refers to a particular structure or feature as an example of the invention.

As used herein, the term "downstream" refers to the normally low pressure or outlet side of a process or a location in a process that occurs later in a process.

As used herein, the term "engaging" refers to any type of mechanical engagement capable of coming into contact, interlocking, or meshing two separate components.

As used herein, the term "entry bore" refers to the transition profile at an entrance to one passage from another passage, e.g., into the outlet bore from the main bore.

As used herein, the term "extending" refers to continuing for a particular distance or in a particular direction.

As used herein, the term "fixedly" refers to a reversibly or preferably permanent attachment of an object such that relative movement is prevented.

As used herein, the term "flare fitting" refers to a compression fitting in which a flare nut secures the tapered end of a flared tubing to create a pressure- and leak-resistant seal, e.g., a 37-degree fitting conforming to AN (Air Force—Navy Aeronautical Design Standards) or JIC (Joint Industries Council) such as SAE (Society of Automotive Engineers) J514/ISO-8434-2.

As used herein, the term "floating ball valve" refers to type of ball valve where the ball-shaped flow control element is held between two seat elements so that it "floats" normally off the surfaces of the flow passage.

As used herein, the term "in line" refers to a valve or other piping component connected at both ends to process piping, or to operation or servicing of the piping component while it is connected at both ends to process piping.

As used herein, the terms "ID" and "OD" refer to an inside diameter and an outside diameter, respectively. As used herein, the terms "major ID" and "major OD" refer to the largest inside and outside diameters, respectively. As used herein, the terms "minor ID" and "minor OD" refer to the smallest inside and outside diameters, respectively.

As used herein, the terms "inner" and "outer" refer to the location of valve components disposed near or towards the flow control element, and distant or away from the flow control element, respectively.

As used herein, the term "integral" refers to a one-piece monolithic item having no removable parts without damaging or modifying the item.

As used herein, the terms "leading" and "trailing" refer to things that come first or follow, respectively.

As used herein, the term "lobe" refers to a usually rounded or pointed projection on an object that sticks out from the main part.

As used herein, the term "machine taper" refers to an internal connection interface in which a tapered conical male member fits into a female socket with a matching taper, including Brown and Sharpe tapers, Morse tapers, Jacobs tapers, Jarno tapers, NMTB (National Machine Tool Builders Association) tapers, hollow taper shank (HSK) tapers, R8 tapers, and the like.

As used herein, the term "main" refers to chief in size, extent, or importance; principal.

As used herein, the term "offset" refers to a first shape profile having edge lines that cross edge lines of a second shape profile superimposed over the first shape profile, e.g., the axes of similarly shaped profiles may be offset, coaxial profiles of similar shape may be angularly offset (rotated), and so on.

As used herein, the term "passage" refers to a path, channel, or course by which something passes.

As used herein, the term "polygon cut profile" refers to a profile having a plurality of regularly spaced points, e.g., a hex cut profile has six or a multiple of six regularly spaced points derived from a six-sided polygon(s).

As used herein, the term "profile" refers to an outline of an object.

As used herein, the term "received" refers to positioned or oriented.

As used herein, the term "removable" refers to a component that can be removed from an assembly without damage to or modification of the removed component or other components of the assembly.

As used herein, a "retaining ring", sometimes also called a circlip, refers to a flat spring ring split at one point so that it can be sprung closed to pass into a bore and allowed to spring out into an annular recess to form a shoulder in the bore, or sprung open to pass over a shaft or spindle, and allowed to close into a closely fitting annular recess to form a collar on the shaft.

As used herein, a "retention member" refers to any member that retains the position of one part with respect to another.

As used herein, a "seal" refers to a tight and perfect or nearly perfect closure (as against the passage of gas or water).

As used herein, the term "single piece" refers to a monolithic structure formed from or as from or into one piece, and the term "single piece valve" refers to a valve having a single piece valve body.

As used herein, a "seat" refers to a part or surface designed for another part to be received or rest, and "valve seat" to a part or assembly of parts inside a valve that has a surface that contacts the moving closure member of a valve, usually to effect or assist closure to seal off or to restrict flow in a passageway of the valve. A "fixed seat" refers to a valve seat held against the closure member so that it does not normally move, whereas a "spring-driven seat" or "pusher seat" refers to a seat biased by a spring. As used herein, the term "seat body" refers to the physical structure of a seat, whereas the term "seat element" refers to a part or component of a valve seat that has a surface that engages the closure member.

As used herein, the term "seat land" or "seat landing" refers to a machined piece with a site specifically adapted to receive a seat, e.g., in a sealing relationship.

As used herein, the term “shear bushing” refers to a hollow bushing acted on by two forces in opposite directions.

As used herein, the term “shoulder” refers to a projection made on a piece of shaped wood, metal, or stone, where its width or thickness is suddenly changed.

As used herein, a “sleeve” refers to a generally tubular piece, as of metal, fitting over another part or parts.

As used herein, the term “small angle” refers to an angle greater than 0 degrees and less than 20 degrees, preferably less than 10 degrees, and especially less than 5 degrees.

As used herein, the term “solid height”, also sometimes called the solid length or closed length or height, refers to the length of a compression spring at the complete extent of compression, i.e., when compressed to the extent that each and every coil is in contact with the next or a compressing surface.

As used herein, the term “spherical” refers to having the form of a sphere or one of its segments.

As used herein, “supported” refers to objects that are located above and sitting on a supporting structure or device.

As used herein, the term “tang” refers to a projection by which a tool, such as a chisel or knife, is attached to its handle or stock; shank.

As used herein, “trapezoidal screw threads” are screw threads having profiles with trapezoidal outlines, including acme and trapezoidal metric thread forms having a thread height half of the pitch and a flat apex and valley.

As used herein, the term “trim” refers to the internal components of a valve.

As used herein, the term “upstream” refers to the normally high pressure or inlet side of a process or a process location that is earlier in a process.

As used herein, the term “valve” refers to a device to control the flow of a liquid, gas, or other material through a channel, and a “valve body” refers to the main, central, or principal physical structure of a valve to which other components are attached and often includes channels generally housing the flow control element and through which a material can flow.

As used herein, a “valve cavity” refers to the space in a valve body receiving the flow control element; also, the space between an interior surface of the main passage or bore of the valve body and the flow control element. The surface of the valve cavity is often formed as a main bore in the valve body.

Embodiments

As disclosed herein, a valve according to the present invention is one of the general type where a flow bore is formed through the valve body and a flow control element is rotatably received in the flow bore to control fluid flow by rotation of the flow control element using a valve stem. In preferred embodiments, the valve body is preferably of single piece construction including integral user end connections, and since valves of this type do not have any removable ends or access covers on the top, bottom or sides, by which the flow control element and other valve trim can be installed in the valve cavity, the valve trim is often installed via one end of the flow bore, and only one end of the flow bore, that has a larger inside diameter (ID) than another end.

Stem Retention Embodiments

Broadly, in one embodiment, the valve comprises a valve body, preferably of single piece construction, comprising a flow bore and a stem bore. A preferably spherical flow control element is rotatably disposed in the flow bore and is often rotatable between open and closed positions. The valve stem is rotatably received in the stem bore to engage and operate the flow control element. A bracket is fixedly supported from the valve body, e.g., spaced laterally from the valve body on a support, and comprises a stem opening aligned with the stem bore. The bracket and valve body are preferably integrally forged together, which can often improve and maintain the alignment of the stem bore and stem opening in the bracket.

The valve stem has a first end disposed in a central bore of a shear bushing adjacent the bracket, a stem shoulder to engage the shear bushing adjacent the first end of the valve stem, and a second end of the valve stem engages the flow control element. The stem shoulder is often formed on the valve stem with an enlarged outer diameter relative to a main diameter of the valve stem to axially engage the shear bushing, e.g., adjacent the bracket. The stem shoulder often supports a first slide bearing surface, and the shear bushing often supports a second slide bearing surface opposing the first slide bearing surface.

The shear bushing has a bushing profile that cooperates with an opening profile of the stem opening for selective retention and release of the valve stem. The shear bushing is rotatable on the valve stem with respect to the bracket between a stem release position, where the bushing profile is aligned with the opening profile so that the shear bushing can pass through the stem opening, and a stem retention position, where the bushing profile is offset with respect to the opening profile and the bracket and stem shoulder engage opposite sides of the shear bushing to inhibit axial movement of the shear bushing and valve stem away from the valve body, and thus retain the valve stem in the stem bore. This arrangement preferably prevents stem blowout in the event of excessively high pressures of the process fluid within the valve body.

For example, the bushing profile can be defined by a minor outside diameter (OD), a major OD, and one or more minor OD portions along the minor OD alternated with one or more lobes extending radially from the minor OD toward or to the major OD. The stem opening in the bracket can likewise be defined by a minor inside diameter (ID), a major ID, one or more minor ID portions along the minor ID, often corresponding to the one or more minor OD portions of the shear bushing, alternated with one or more major ID portions along the major ID, and one or more opening passages extending radially from the minor ID to the major ID, often corresponding to the one or more lobes of the shear bushing.

Often, the OD of the stem shoulder and the minor OD of the shear bushing are less than the minor ID of the stem opening, and the lobes extend radially beyond the minor ID of the stem opening. Preferably, the bushing profile and the opening profile comprise diametrically opposed pairs of the minor OD portions, the lobes, the minor ID portions, and the opening passages, and the lobes are smaller than the opening passages to allow axial passage.

More preferably, the bushing profile and the opening profile comprise matching butterfly profiles, although other shapes such as dogbone, square or rectangular are not excluded.

The valve often further comprises a bushing retention member securing the shear bushing in the stem retention position, preferably wherein the bushing retention member is elongated to extend through a retaining bore in the bracket into or adjacent to the lobes, more preferably wherein the elongated bushing retention member is threaded and extends into one of the lobes. The bushing retention member thus provides a lockout feature to protect against inadvertently placing the shear bushing in the stem release position when it is not intended.

A packing bore is desirably formed in the valve body coaxial with the stem bore. One or more preferably contiguous packing rings are often disposed around the stem in the packing bore to form a seal between the stem and the valve body, and a packing gland can be positioned around the stem to load the one or more packing rings. A gland flange in an open access area between the bracket and the valve body is often secured to the valve body around the valve stem to load the packing gland. Preferably, one or more live loading springs are disposed between the gland flange and the packing gland, which can, for example, be disc sprigs or springs around bolts securing the gland flange to the valve body.

In any embodiment, since the valve stem is removable, the shear bushing and/or the one or more packing rings can be contiguous, e.g., even when the bracket is integral, preferably forged together with a single-piece valve body, and the valve stem and packing can be serviced in line.

The removable-stem valve of this embodiment has wide versatility to be used with almost any valve trim. For example, the valve trim often comprises the flow control element, a downstream seat to form a seal between the valve body and the flow control element, and a spring-driven upstream seat to bias the flow control element against the downstream seat, where the flow control element often floats between the upstream seat and the downstream seat. Preferably, the valve trim is insertable into the flow bore through one end of the flow bore, and at least the upstream seat and the flow control element are removable through the one end. A retainer having an annular structure in the one end is often used to secure the valve trim in the flow bore. Preferably, the retainer comprises a retaining ring disposed in a groove in the one end or a threaded member threadedly engaged in the one end.

In the following discussion, reference is made to the outlet bore having a smaller ID than the inlet bore, and the retainer being a retaining ring or annular plug, by way of non-limiting example for the purposes of clarity and simplicity.

In one preferred embodiment, the valve trim desirably comprises a cartridge assembly comprising the flow control element, the upstream seat, and a sleeve to hold the flow control element and the upstream seat together in relative position for insertion into an inlet bore of the flow bore. The sleeve is preferably expandable to release the flow control element to float between the upstream seat and the downstream seat. Preferably, the valve comprises an entry bore to an outlet bore of the flow bore, wherein the downstream seat comprises an annular seat body having a downstream seat element to sealingly engage the flow control element and an attachment end for removably securing the annular seat body in the entry bore.

In a preferred embodiment of this cartridge trim example, the attachment end and the entry bore are threaded for threaded engagement. The annular seat body conveniently comprises internal notching for installation with a square bar inserted through the inlet bore. Preferably, either (A) the annular seat body comprises a seat body flange between the attachment end and the downstream seat element, and a gasket is compressed between the seat body flange and an annular surface of the valve body adjacent the outlet bore, more preferably wherein the attachment end comprises trapezoidal screw threads; or (B) the entry bore comprises a threaded section adjacent the main bore receiving a threaded portion of the attachment end, a cylindrical section adjacent an ID of the outlet bore receiving a cylindrical portion of the attachment end, and a tapered section between the threaded and cylindrical sections engaging a tapered portion of the attachment end, more preferably wherein the attachment end and the entry bore comprise a flare fitting profile.

In another preferred embodiment of this cartridge trim example, the entry bore comprises a female machine tapered cone and the attachment end comprises a male machine tapered cone. The attachment end is received in the entry bore in an interference fit. More preferably, the machine tapered cone comprises ridges to form a labyrinthine seal.

In another preferred embodiment, the downstream seat comprises a seat land secured in an entry bore to an outlet bore of the flow bore and a seat body comprising a downstream seat element to scalingly engage the flow control element. The seat land and the seat body have opposing lapped surfaces for sealing engagement, preferably wherein the seat land is press fit into the entry bore. The downstream seat element can comprise, for example, external notches to facilitate lapping.

In another preferred embodiment, the downstream seat comprises a seat body having a downstream seat element comprising a sealing surface sealingly engaging the flow control element, and a threaded element threadedly received in the entry bore and having an external polygonal cut profile, preferably a box cut profile, for installation with a socket inserted through the inlet bore. Preferably, the entry bore comprises a threaded section adjacent the main bore receiving the threaded element, a cylindrical section adjacent an ID of the outlet bore receiving a cylindrical element of the seat body, and a tapered section between the threaded section and the cylindrical section engaging a tapered element of the downstream seat. The annular seat body can be a single-piece body such as a high pressure flare fitting, or a multi-piece assembly comprising a nut threaded into the threaded section, a tubular member, and a tapered element such as in a lip seal or replaceable angle cut gasket.

In another preferred embodiment, the valve is bidirectional wherein the flow bore comprises a central bore and first and second end bores (normally outlet and inlet bores), wherein the central bore has an inside diameter (ID) larger than an ID of the first end bore and smaller than an ID of the second end bore. A first seat (typically the normally downstream seat) is provided for sealing engagement between the flow control element and the valve body adjacent the first end bore. The first seat comprises a first seat body having a first sealing surface for sealingly engaging the flow control element and an attachment end releasably secured to the valve body. A second seat (normally the upstream seat) comprises a second seat body having a second sealing surface for sealingly engaging the flow control element. A seat spring is provided to bias the second seat body against the flow control element, wherein the flow control element floats between the first seat and the second seat. An annular plug is provided in sealing engagement with the valve body.

The annular plug has an outer end threadedly engaged in the second end bore and an inner end in engagement with the seat spring. A seat land is provided between the second seat body and the inner end of the annular plug, preferably formed on the inner end of the annular plug, for sealingly engaging the second seat body and the inner end of the annular plug. The inner end loads the seat spring against the second seat body to sealingly engage the first element when a fluid pressure is higher in the second end bore relative to the first end bore. The seat land sealingly engages the second seat body and the inner end of the annular plug when a fluid pressure higher in the first end bore relative to the second end bore compresses the seat spring, e.g., where the seat spring is compressed to a height matching a height of the seat land. The seat land desirably has a height in excess of a solid height of the seat spring.

In any embodiment of the valve just described, clamping hubs and/or oversized flanges are preferably formed on the valve body at inlet and/or outlet ends of the flow bore. The clamping hubs allow the valve to be inserted or removed from a line without welding or cutting. allow for closer spacing to the valve body than flanges (shorter inlet/outlet ends), and also facilitate a larger inlet end bore for installation and removal of the trim.

The invention is also directed to a method of assembling the valve just described. The method comprises the steps of: installing the flow control element in the fluid flow passage; installing the shear bushing on the stem to engage the shoulder; passing the first end of the valve stem through the bracket bore and the stem bore and into engagement with the flow control element and aligning the one or more lobes of the shear bushing with the one or more laterally extending openings of the bracket bore to pass the shear bushing through the bracket bore; and rotating the shear bushing to position the one or more lobes in the radially offset position to stop the valve stem from passing back through the bracket bore.

Because the valve stem is independently removable, the flow control element can be installed in the fluid flow passage either prior to or after passing of the first end of the valve stem through the stem bore, preferably prior to.

If desired, the passage step can also comprise passing the first end of the valve stem through a packing gland in an open access area between the bracket and the valve body, positioning packing rings on the first end of the valve stem in a packing bore, and securing a gland flange to the valve body to bias the packing gland against the packing rings.

The invention is also directed to a method of servicing the valve just described. The method comprises the steps of: positioning the one or more lobes of the shear bushing into alignment with the one or more laterally extending openings in the bracket bore; passing the one or more lobes of the shear bushing through the bracket bore to disengage the first end of the stem from the flow control element; inspecting and/or replacing packing rings on the first end of the valve stem; passing the one or more lobes of the shear bushing through the bracket bore and passing the first end of the valve stem through the stem bore to engage the flow control element; and rotating the shear bushing to position the one or more lobes in the radially offset position. If desired, the servicing can be with the valve in line.

If desired, the servicing method can further comprise: disengaging a gland flange from the valve body prior to passing the one or more lobes of the shear bushing through the bracket bore to disengage the first end of the stem from the flow control element; and after inspecting and/or replacing the packing rings and engaging the first end of the stem with the flow control element, securing the gland flange to the valve body to bias a packing gland against the packing rings.

In any embodiment, clamping hubs can be formed on the valve body at inlet and outlet ends of the fluid flow bore. This allows the valve to be removed from service without cutting as would be required in the case of welded valves. Moreover, the clamping hubs can accommodate a larger inlet end to facilitate insertion of the flow control element and the other trim elements.

Repairable Valve Trim Embodiments

In another aspect, an embodiment of a valve disclosed herein has removable trim components including a downstream seat in which at least a downstream seat element is removable to allow servicing. This valve preferably has a removable stem, e.g., with the bushing/bracket arrangement as disclosed above, but other ways to provide stem removability, such as a bolted-on bracket (not integral), could also be employed.

This removable-trim valve comprises a valve body with an axial fluid flow bore therethrough, and a spherical flow control element disposed in the flow bore and rotatable between open and closed positions. A valve stem has a first end in engagement with the flow control element for rotation thereof, and removably passes through a stem bore formed through the valve body. The fluid flow bore comprises a main passage, an inlet end, and an outlet end The main passage has a diameter larger than a diameter of the flow control element to receive the flow control element, wherein one of the inlet and outlet ends has an innermost diameter equal to or larger than the diameter of the main passage.

Valve trim comprises a downstream seat and an upstream seat assembly. The downstream seat is disposed between the outlet end and the flow control element for sealing between the flow control element and the valve body. The downstream seat comprises a body seal to sealingly engage the valve body and a seat element having a sealing surface to sealingly engage the flow control element. The upstream seat assembly, the flow control element, and at least the downstream seat element are removable from the valve body through one end of the flow bore, preferably the inlet end.

The upstream seat assembly is disposed between the inlet end and the flow control element, the upstream seat assembly comprising a spring to bias an upstream seat element against the flow control element and the flow control element against the downstream seat element, wherein the flow control element floats between the upstream and downstream seat elements. A retainer is removably attached to the valve body about the fluid flow bore and has one or more projections into the flow bore to secure the downstream seat, the flow control element, and the upstream seat assembly in the flow bore and load the spring.

Preferably, the valve stem extends from the first end through the stem bore to a second end selectively retained by a bracket spaced laterally from the valve body on a support. More preferably, the valve has the stem-bushing-bracket arrangement described above, e.g., the valve further comprises a shoulder formed on the stem adjacent the bracket with an enlarged outer diameter relative to a main diameter of the stem, wherein the shoulder supports a first slide bearing surface; a shear bushing having a central bore receiving the stem, wherein the shear bushing is disposed between the stem shoulder and the bracket, wherein the shear bushing supports a second slide bearing surface opposing the first slide bearing surface, wherein the shear bushing comprises one or more minimum outside diameter portions alternated with one or more lobes; and a bore formed through the bracket, the bracket bore having one or more innermost diameter portions corresponding to the one or more minimum outside diameter portions of the shear bushing and one or more laterally extending openings corresponding to the one or more lobes of the shear bushing, wherein the outer diameter of the stem shoulder and the minimum outside diameter of the shear bushing are less than the innermost diameter of the bracket bore, wherein the one or more lobes extend radially beyond the innermost diameter of the bracket bore. The shear bushing is rotatable on the stem with respect to the bracket between an alignment position wherein the one or more lobes and minimum diameter portions of the shear bushing are radially aligned with the one or more laterally extending openings and minimum outside diameter portions of the bracket bore to pass the stem and shear bushing axially through the bracket bore, and a radially offset position wherein the one or more lobes and minimum diameter portions of the shear bushing are radially offset with respect to the one or more laterally extending openings and minimum outside diameter portions of the bracket bore wherein the shear bushing and stem are selectively retained by the bracket.

Preferably, as mentioned above, the innermost diameter of the inlet end is larger than the innermost diameter of the outlet end. Additionally, the innermost diameter of the outlet end is preferably smaller than the main flow passage, and the upstream seat assembly, flow control element, and the downstream seat element are removable through the inlet end.

If desired, the downstream seat can include a sealing element, which can be a gasket, to seal with the valve body. Alternatively, a metal-to-metal sealing surface can be used.

Preferably, at least a portion of the downstream seat can be secured to the valve body, preferably removably. For example, the downstream seat element can be secured directly to the valve body, e.g., by press-fitting or threading. Alternatively, the downstream seat can comprise an assembly comprising the downstream seat element and a seat land secured to the valve body, wherein the seat land and the downstream seat element are sealingly engaged and the downstream seat element is compressed between the seat land and the flow control element. The seat land can be removably or permanently secured to the valve body where the downstream seat element can be separately removed, e.g., through the inlet end.

Preferably, the at least a portion of the downstream seat (such as the seat land) is press-fit into an entry bore formed in the outlet end adjacent to the main passage. For example, the downstream seat can comprise a tapered press-fit cone in a correspondingly tapered entry bore in the outlet end. In any embodiment, the cone can comprise ridges to form a labyrinthine seal.

Alternatively, the at least a portion of the downstream seat can be threadedly received in an entry bore formed in the outlet end adjacent to the main passage. For example, the downstream seat can comprise trapezoidal screw threads to connect to the outlet end, e.g., Acme or trapezoidal metric power threads. If desired, the downstream seat can comprise a flare fitting threaded into the valve body, e.g., AN or JIC high pressure flare fittings. Preferably, the downstream seat comprises internal notching in the flow bore for threaded installation using a square bar.

Other possible threaded configurations for the downstream seat include a double ferrule tubing connection to seal the downstream seat assembly to the valve body using a replaceable angle cut gasket; a lip seal compressed by a threaded exterior. In any threaded downstream seat embodiment, the downstream seat can comprise an external hex cut profile, either 6 point or 12 point, for installation with a standard 6- or 12-point socket.

In any embodiment, the downstream seat preferably comprises external notches for installation, e.g. with a tool to rotate the downstream seat, and/or to hold the downstream seat for lapping to a downstream seat land and/or the flow control element.

In one embodiment of the repairable valve with the removable downstream seat element, the valve is bidirectional. The upstream seat element has a sealing surface to sealingly engage the flow control element, and the retainer comprises an annular plug having an enlarged end threadedly engaged in the inlet end of the valve body. Preferably, a gasket, such as, for example, a spiral wound gasket, is shouldered between the enlarged end of the plug and the valve body.

As for the upstream seat assembly used in the repairable valve with the removable downstream seat element (preferably with the removable stem), the upstream seat assembly can comprise a spacer between the spring and the retainer and/or a pre-loading spring between the spacer and the retainer.

Preferably, at least a portion of the downstream seat is secured to the valve body, and the downstream seat element has a taper on an outer surface adjacent to the sealing surface. A cartridge assembly comprises a sleeve around the flow control element and at least a portion of the upstream seat assembly. The sleeve has a cylindrical profile with an outside diameter matching or less than the main passage diameter and comprises radially spaced arms extending axially from a base at a first end adjacent the spacer to a second end engaging the downstream seat element.

Prior to installation of the cartridge, the arms are bendable to a small angle with respect to a longitudinal axis to hold the flow control element and the upstream seat assembly in an installation configuration, i.e, separate from the valve. Installation of the cartridge assembly in the installation configuration through the inlet end of the flow bore causes the second ends of the arms to contact the taper, spread the arms apart, and release the flow control element to float between the upstream and downstream seat elements.

Preferably, the spacer comprises a distal portion having an outside diameter matching the diameter of the main passage and a proximal portion having a smaller diameter, wherein the base comprises a ring tightly fitted around the proximal portion of the spacer. The sleeve can be conveniently formed from rolled metal and the arms are preferably radially spaced apart on either side of the recess in the flow control element. Alternatively, the base can comprise an annular disc engaging a distal end of the spacer with the arms radially spaced apart on either side of the recess in the flow control element.

A method of assembling the valve just described comprises the steps of: installing the downstream seat into the main passage adjacent the outlet end for sealing engagement with the valve body; installing the flow control element into the main passage against the downstream seat; installing the upstream seat assembly into the main passage against the flow control element; and installing the retainer and loading the spring to bias the upstream seat element against the flow control element and the flow control element against the downstream seat element. The downstream seat, the flow control element, and the upstream seat assembly can be sequentially installed through the inlet end of the flow bore.

The method preferably comprises securing the downstream seat to the valve body adjacent the outlet end, e.g., by press-fitting at least a portion of the downstream seat into an entry bore in the outlet end, threading at least a portion of the downstream seat into an entry bore in the outlet end, and so on. Where the downstream seat is threaded, the threading preferably comprises engaging internal notches with a square bar for rotation and/or engaging radially spaced external notches with a tool for rotation. Alternatively, the threading can comprise engaging an external hex profile with a socket (6- or 12-point) for rotation.

In a preferred embodiment of the method, the valve comprises a hub end connector on the valve body at the inlet end, and the installation of the retainer comprises clamping a tool to the inlet hub end connector, wherein the tool comprises a blind cover clamped to the inlet end with a threaded bore receiving a threaded member having a plate on one end and advancing the threaded member through the threaded bore to push the retainer with the plate into position in the inlet end.

In a cartridge version of the valve, the assembly method uses a valve wherein the upstream seat assembly further comprises a spacer between the spring and the retainer, wherein at least a portion of the downstream seat is secured to the valve body, and wherein the downstream seat element has a taper on an outer surface adjacent to the sealing surface. The assembly method further comprises providing a cartridge assembly comprising a sleeve around the flow control element and at least a portion of the upstream seat assembly. The sleeve has a cylindrical profile with an outside diameter matching or less than the main passage diameter and comprises radially spaced arms extending axially from a base at a first end adjacent the spacer to a second end extending beyond the flow control element. The arms are bent to a small angle with respect to a longitudinal axis to hold the flow control element and the upstream seat assembly in an installation configuration. The cartridge assembly in the installation configuration is installed through the inlet end of the flow bore to cause the second ends of the arms to contact the taper, spread the arms apart, and release the flow control element to float between the upstream and downstream seat elements.

A method of servicing the valve just described comprises the steps of: removing the retainer; removing the upstream seat assembly from the main passage; removing the flow control element from the main passage; and removing at least a seat element of the downstream seat from the main passage. Preferably, the upstream seat assembly, the flow control element, and the downstream seat are sequentially removed through the inlet end of the flow bore.

Removing at least the downstream seat element can comprise removing the downstream seat (in its entirety) or just the downstream seat element, for example, by unscrewing at least a portion of the downstream seat from a threaded entry bore in the outlet end. Unscrewing can be effected by engaging internal notches with a square bar, or engaging an external hex profile with a socket, for rotation. Alternatively, removing at least the downstream seat element can comprise hammering at least a press-fit portion of the downstream seat from an entry bore in the outlet end.

In another embodiment, the present invention provides a repairable valve assembly system, comprising components adapted to be assembled together into a repairable valve. The components comprise a valve body with an axial fluid flow bore therethrough, wherein the fluid flow bore comprises a main passage, an inlet end, and an outlet end.

A downstream seat is adapted to be inserted into the main passage through the inlet end and at least a portion of the downstream seat sealingly secured to the valve body adjacent the outlet end. The downstream seat comprises a seat element having a sealing surface to sealingly engage a flow control element and a tapered outer surface adjacent the sealing surface. At least the downstream seat element is removable from the valve body through the inlet end. A cartridge assembly is adapted to be inserted into the main passage through the inlet end.

The cartridge assembly comprises the flow control element, an upstream seat assembly, and a sleeve. The flow control element has a diameter less than the diameter of the main passage. The upstream seat assembly comprises an upstream seat element having a surface to engage the flow control element, an annular spacer having an outside diameter larger than the flow control element, and a spring disposed between the spacer and the upstream seat element. The sleeve receives the flow control element and at least a portion of the spacer, and comprises radially spaced arms extending axially from a base at a first end adjacent the spacer to a second end extending beyond the flow control element. The arms are positioned at a small angle with respect to a longitudinal axis to hold the flow control element in engagement with the upstream seat element, the upstream seat element in engagement with the spring, and the spring in engagement with the spacer in an installation configuration. The second ends of the arms are arranged to have a diameter at least as large as an inside diameter of the taper on the downstream seat element, but smaller than an outside diameter of the taper, so that installation of the cartridge assembly in the installation configuration through the inlet end of the flow bore causes the second ends of the arms to contact the taper, spread the arms apart, and release the flow control element to float between the upstream and downstream seat elements.

Finally, a retaining ring or other retainer is adapted to be removably attached to the valve body about the fluid flow bore and has one or more projections into the flow bore to secure the downstream seat, the flow control element, and the upstream seat assembly in the flow bore, and load the spring.

Preferably, in this system, the spacer comprises a distal portion having an outside diameter matching the diameter of the main passage and a proximal portion having a smaller diameter, wherein the base comprises a ring tightly fitted around the proximal portion of the spacer. The sleeve is conveniently formed from rolled metal and the arms are radially spaced apart on either side of the recess in the flow control element. Alternatively, the base comprises an annular disc engaging a distal end of the spacer and the arms are radially spaced apart on either side of the recess in the flow control element.

In any embodiment of the system, the downstream seat comprises an assembly comprising the downstream seat element and a seat land adapted to be secured to the valve body, wherein the seat land and the downstream seat element are adapted for sealing engagement and compression of the downstream seat element between the seat land and the flow control element. Preferably, an entry bore is formed in the outlet end of the valve body adjacent to the main passage, and the seat land is adapted to be press-fit into the entry bore.

In any embodiment of the system, a tapered entry bore is formed in the outlet end of the valve body adjacent to the main passage, wherein the downstream seat comprises a correspondingly tapered cone adapted to be press-fit in the entry bore, for example a machine taper such as a Morse taper. If desired, the cone comprises ridges adapted to form a labyrinthine seal.

Alternatively, a threaded entry bore formed in the outlet end of the valve body adjacent to the main passage, wherein at least a portion of the downstream seat is adapted to be threadedly received in the entry bore. For example, the downstream seat can comprise trapezoidal screw threads such as Acme or metric power threads. The downstream seat can comprise a flare fitting adapted to be threaded into the entry bore, e.g., AN or JIC high pressure flare fittings. Where the downstream seat comprises threads, it is desirably provided with internal notching for installation with a square bar.

The repairable valve assembly system preferably includes a valve stem having a first end adapted to engage the flow control element for rotation thereof, the stem adapted to extend from the first end through a stem bore in the valve body to a second end away from the valve body, wherein the valve stem is selectively retainable in or removable from the stem bore. For example, the valve stem can be selectively retainable by a bracket spaced laterally from the valve body on a support. The bracket can be removable from the valve body, e.g., by bolting, or the bracket can be integral with the valve body where a shear bushing rotatable on the stem can have a non-circular profile matching a profile of a bracket bore.

If desired, the system components can further include a removable valve stem having a first end adapted to engage the flow control element for rotation thereof, the stem adapted to extend from the first end through a stem bore in the valve body to a second end adjacent to the bracket, preferably wherein the bracket is integral with the valve body. A shoulder is formed on the stem adjacent the bracket with an enlarged outer diameter relative to a main diameter of the stem, wherein the shoulder supports a first slide bearing surface. A shear bushing has a central bore receiving the stem, wherein the shear bushing is adapted to be disposed between the stem shoulder and the bracket, wherein the shear bushing supports a second slide bearing surface opposing the first slide bearing surface.

The shear bushing has one or more minimum outside diameter portions alternated with one or more lobes. A bore formed through the bracket has one or more innermost diameter portions corresponding to the one or more minimum outside diameter portions of the shear bushing and one or more laterally extending openings corresponding to the one or more lobes of the shear bushing. The outer diameter of the stem shoulder and the minimum outside diameter of the shear bushing are less than the innermost diameter of the bracket bore, whereas the one or more lobes extend radially beyond the innermost diameter of the bracket bore. The shear bushing is rotatable on the stem with respect to the bracket between an alignment position wherein the one or more lobes and minimum diameter portions of the shear bushing are radially aligned with the one or more laterally extending openings and minimum outside diameter portions of the bracket bore adapted to pass the stem and shear bushing axially through the bracket bore, and a radially offset position wherein the one or more lobes and minimum diameter portions of the shear bushing are radially offset with respect to the one or more laterally extending openings and minimum outside diameter portions of the bracket bore wherein the shear bushing and stem are adapted to be selectively retained by the bracket.

The system preferably comprises diametrically opposed pairs of the minimum diameter portions and the lobes of the shear bushing, more preferably wherein the shear bushing and the bracket bore have matching profiles, e.g., butterfly, dogbone, square, rectangular, and so on. If desired, a threaded member is adapted to extend through a retention bore in the bracket into at least one of the one or more lobes of the shear bushing to retain the shear bushing in the radially offset position.

Preferably, the bracket and support define an open access area between the bracket and the valve body. The system preferably further comprises: a packing bore formed in the valve body coaxial with the stem bore; one or more packing rings adapted to be disposed about the stem in the packing bore to form a seal between the stem and the valve body; a packing gland adapted to be positioned around the stem to load the packing rings; a gland flange in the open access area adapted to be secured to the valve body around the stem to load the packing gland; and preferably one or more live loading springs adapted to be disposed between the gland flange and the packing gland.

Since the stem is removable in this system, the shear bushing and the packing rings can be contiguous, even when replaced during in line servicing.

Preferably, the valve body in this system comprises clamping hubs at the inlet and outlet ends of the fluid flow bore.

A method of assembling a repairable valve from the components of the system just described, can comprise the steps of: installing the downstream seat through the inlet end and securing at least a portion of the downstream seat in sealing engagement with the valve body; inserting the cartridge assembly through the inlet end and into the main passage until the arms contact the taper of the downstream seat element; advancing the cartridge assembly to spread the arms apart and release the flow control element and the upstream seat element; and installing the retainer through the inlet end to load the spring and bias the upstream seat element against the flow control element and the flow control element against the downstream seat element.

The spacer preferably comprises a distal portion having an outside diameter matching the diameter of the main passage and a proximal portion having a smaller diameter, and the base comprises a ring. The assembly method can further comprise tightly fitting the ring around the proximal portion of the spacer. If desired, the sleeve can be formed from rolled metal and the arms radially spaced apart on either side of the recess in the flow control element.

Alternatively, the base can comprise an annular disc, wherein the method comprises engaging a distal end of the spacer with the annular disc, and radially spacing the arms apart on either side of the recess in the flow control element.

In any embodiment, the downstream seat can comprise an assembly comprising the downstream seat element and a seat land. The method of assembly can further comprise securing the seat land to the valve body, sealingly engaging the seat land and the downstream seat element and compressing the downstream seat element between the seat land and the flow control element. This method can preferably further comprise forming an entry bore in the outlet end of the valve body adjacent to the main passage, and press-fitting the seat land into the entry bore.

Alternatively, a tapered entry bore can be formed in the outlet end of the valve body adjacent to the main passage, and the downstream seat comprises a correspondingly tapered cone that is press-fit in the entry bore. The cone preferably comprises ridges and the method involves forming a labyrinthine seal.

As a further alternative, the assembly method can comprise forming a threaded entry bore in the outlet end of the valve body adjacent to the main passage, and threadedly receiving at least a portion of the downstream seat in the entry bore. In an embodiment, the downstream seat preferably comprises trapezoidal screw threads.

In another embodiment, the downstream seat preferably comprises a flare fitting and the assembly method further comprises threading the flare fitting into the entry bore.

In any embodiment, the downstream seat comprises internal notching, and the method further comprises installing the downstream seat with a square bar.

In any embodiment of the assembly method for the system of components, the valve preferably comprises a valve stem having first and second ends, and the method further comprises forming a stem bore through the valve body, engaging the flow control element with the first end of the valve stem for rotation of the flow control element, extending the valve stem from the first end through the stem bore to a second end away from the valve body, and selectively retaining or removing the valve stem in or from the stem bore.

The valve stem is preferably selectively retainable by a bracket spaced laterally from the valve body on a support. The bracket is preferably integral with the valve body. The assembly method preferably further comprises: forming a shoulder on the stem adjacent the bracket with an enlarged outer diameter relative to a main diameter of the stem; supporting a first slide bearing surface on the shoulder; receiving the stem in a central bore of a shear bushing; disposing the shear bushing between the stem shoulder and the bracket; supporting a second slide bearing surface on the shear bushing opposing the first slide bearing surface; alternating one or more minimum outside diameter portions of the shear bushing with one or more lobes; and forming a bore through the bracket, wherein the bracket bore has one or more innermost diameter portions corresponding to the one or more minimum outside diameter portions of the shear bushing and one or more laterally extending openings corresponding to the one or more lobes of the shear bushing.

Preferably, the outer diameter of the stem shoulder and the minimum outside diameter of the shear bushing are less than the innermost diameter of the bracket bore, and the one or more lobes extend radially beyond the innermost diameter of the bracket bore. The method can further comprise rotating the shear bushing on the stem with respect to the bracket to an alignment position wherein the one or more lobes and minimum diameter portions of the shear bushing are radially aligned with the one or more laterally extending openings and minimum outside diameter portions of the bracket bore, and passing the stem and shear bushing axially through the bracket bore. The method can also comprise rotating the shear bushing on the stem with respect to the bracket to a radially offset position wherein the one or more lobes and minimum diameter portions of the shear bushing are radially offset with respect to the one or more laterally extending openings and minimum outside diameter portions of the bracket bore, and retaining the shear bushing and stem with the bracket.

The valve preferably comprises diametrically opposed pairs of the minimum diameter portions and the lobes of the shear bushing. For example, the shear bushing and the bracket bore can have matching profiles, e.g., butterfly, dogbone, square, rectangular, and so on. Preferably, a threaded member is extended through a retention bore in the bracket into at least one of the one or more lobes of the shear bushing to retain the shear bushing in the radially offset position.

In any embodiment of the assembly method, the bracket and support can define an open access area between the bracket and the valve body, and the method can further comprise forming a packing bore in the valve body coaxial with the stem bore; disposing one or more packing rings about the stem in the packing bore to form a seal between the stem and the valve body; positioning a packing gland around the stem to load the packing rings; securing a gland flange in the open access area to the valve body around the stem to load the packing gland; and preferably disposing one or more live loading springs between the gland flange and the packing gland. In this embodiment, the shear bushing and the packing rings are preferably contiguous, even where the bracket and valve body are integral and/or where they are replaced in-line.

In any embodiment of the assembly method, the valve body can comprise clamping hubs at the inlet and outlet ends of the fluid flow bore, e.g., to facilitate insertion and/or removal of the valve in the piping without welding or cutting.

A further method can comprise disassembling the repairable valve assembled from the components of the system just described. The disassembly method can comprise the steps of removing the retainer through the inlet end; removing the sleeve, spacer, upstream seat element and flow control element through the inlet end; and removing the downstream seat element through the inlet end.

With reference to the drawing figures in which like parts are designated by like numerals, FIG. 1 is a cross-sectional elevation of a repairable valve 100 according to an embodiment of the invention. The valve 100 has a preferably single piece valve body 102, a flow bore 104, that is generally axially oriented for the passage of fluid, receiving a flow control element 106, and a valve stem 108 engaging the flow control element for rotation of a flow control bore 107 therethrough between open and closed positions aligned with the flow bore 104 and transverse to the flow bore, respectively.

An upper portion 148 of the valve 100 comprises a bracket 150 fixedly supported, and spaced laterally, from the valve body 102, e.g., on a support 152, which often defines an open access area 154 between the bracket and the valve body. Often, bracket 150 is provided with bores 155 and/or bolts 155A for attaching an actuator (not shown) to operate the valve stem 108 (see FIG. 2). Preferably, the bracket 150 including support 152 with legs 152A, 152B is formed integral with the valve body 102, e.g., by forging the bracket 150 and valve body 102 together as or into a single piece.

The valve stem 108 has a first end 160 received in a central bore 193 of a shear bushing 186 adjacent the bracket 150. The central bore 193 is aligned with the stem opening 162 formed in the bracket 150 and stem bore 158 formed in the valve body 102 coaxially receiving the valve stem 108. The valve stem 108 is rotatably received in the stem bore 158 and extends to a lower second end 156 with a tang 157 engaging the flow control element 106. For example, the tang 157 can have a non-circular cross-section, e.g., rectangular, that is received in a matching slot or recess 164 formed in the flow control element 106.

A packing gland 166 is often positioned around the valve stem 108 in the open access area 154 to load a plurality of packing rings 168 in a packing bore 170 in the valve body 102 coaxial with the stem bore 158, which may include metal anti-extrusion rings 172 above and below the packing rings. A gland flange 174 is often secured in the open access area 154 to the valve body 102 with studs 176 and nuts 178 around the stem 108 to load the packing rings 168 via one or more live loading springs 180, which may comprise disc springs 180A, 180B stacked in series. The packing rings 168 are preferably contiguous since the valve stem 108 can be removed for their installation as discussed below.

The valve stem 108 has a stem shoulder 182, with an enlarged outer diameter relative to a main stem diameter 183, in the open access area 154 adjacent to the bracket 150 which often supports a first bearing surface 184. The outer diameter of the stem shoulder 182 is less than a minor inside diameter (ID) 194*a* (FIG. 3) of the stem opening 162 in bracket 150 so that the valve stem 108 can be passed axially through stem opening 162.

Figure 2:
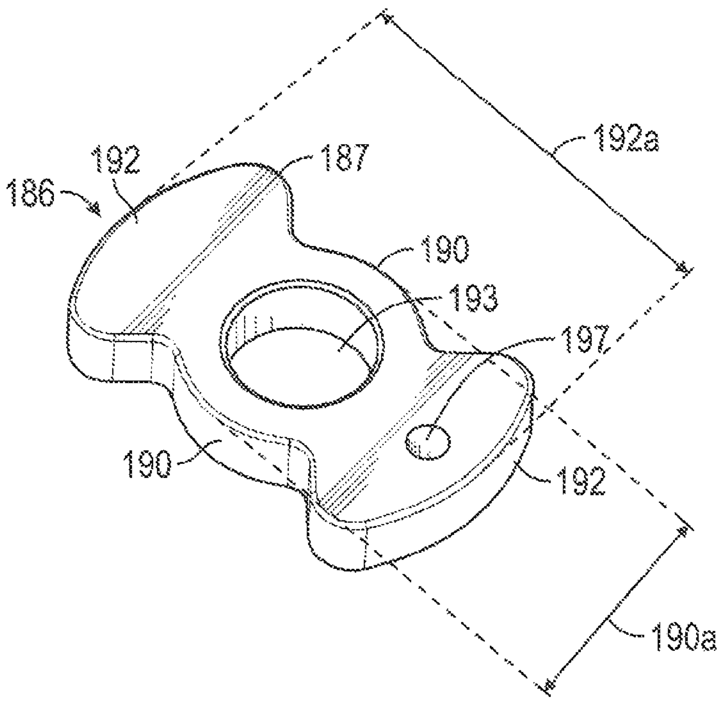
FIG. 2 is a perspective view of the shear bushing in FIG. 1.

Referring back to FIG. 1, the shear bushing 186 is preferably contiguous and is disposed between the stem shoulder 182 and the bracket 150. Shear bushing 186 often supports a second slide bearing surface 188 opposing the first slide bearing surface 184. As best seen in FIG. 2, the shear bushing 186 has a bushing profile 187 with a minor outside diameter (OD) 190*a* and one or more minor OD portions 190 alternated with one or more lobes 192 extending laterally to a major OD 192*a*, preferably a pair of diametrically opposed minor OD portions 190 and a pair of diametrically opposed lobes 192. The minor OD portions 190 correspond with minor ID portions 191 of the stem opening 162 (see FIG. 3), and match or are smaller than the minor ID portions 191 to allow axial passage. The major OD of the lobes 192 are larger to be selectively retained by the bracket 150. Similarly, the shear bushing 186 has a central bore 193 that matches the stem diameter 183 to slidably, rotatably receive the first end 160 of the stem 108, but smaller than the shoulder 182 so as to be retained thereon.

Figure 3:
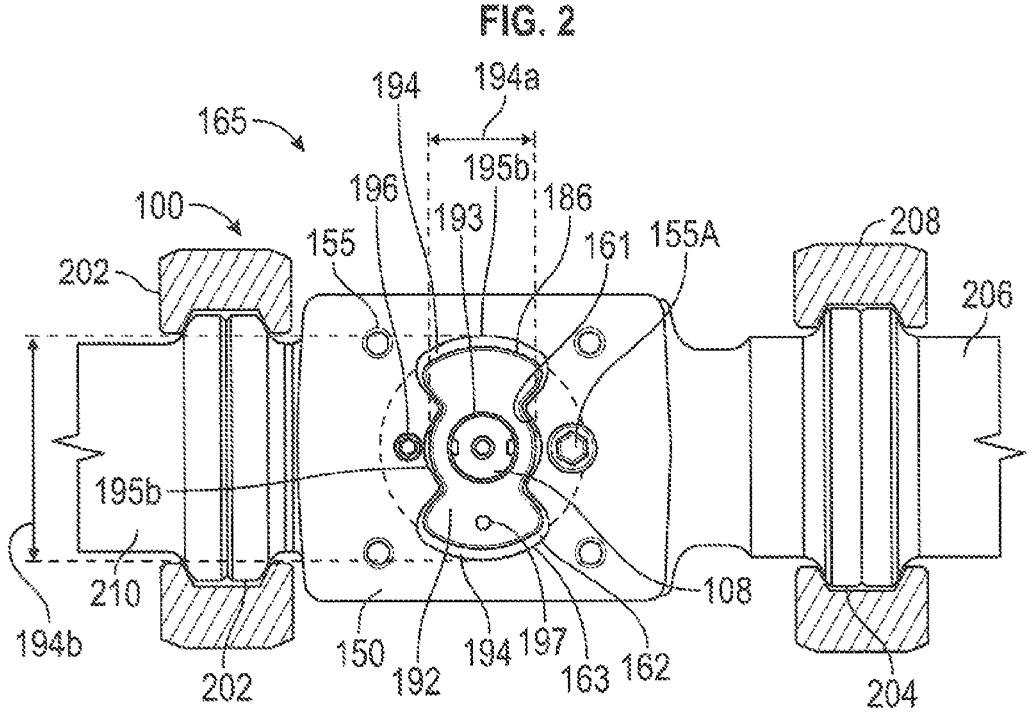
FIG. 3 is a plan view of the valve of FIG. 1 as seen along the lines 3-3 showing the shear bushing aligned for stem insertion/removal, and showing user end connections, partly in section.

As best seen in FIG. 3, the stem opening 162 has an opening profile 163 shown in alignment with bushing profile 187 in a stem release position 165, with a minor inside diameter (ID) 194*a* larger than the minor OD, a major ID 194*b* larger than the major OD, one or more minor ID portions 195*a* along the minor ID alternated with one or more major ID portions 195*b* along the major ID, and one or more opening passages 194 extending radially i.e., laterally or outwardly, from the minor ID to the major ID or more opening passages 194 extending laterally, i.e., radially outwardly, from minor ID 194*a* to a major ID 194*b* and matching the lobes 192 to pass the shear bushing 186 and the valve stem 108 axially through when the lobes 192 of the shear bushing 186 are radially aligned with the opening passages 194 of the stem opening 162, e.g., for installation and removal of the valve stem 108.

Figure 4:
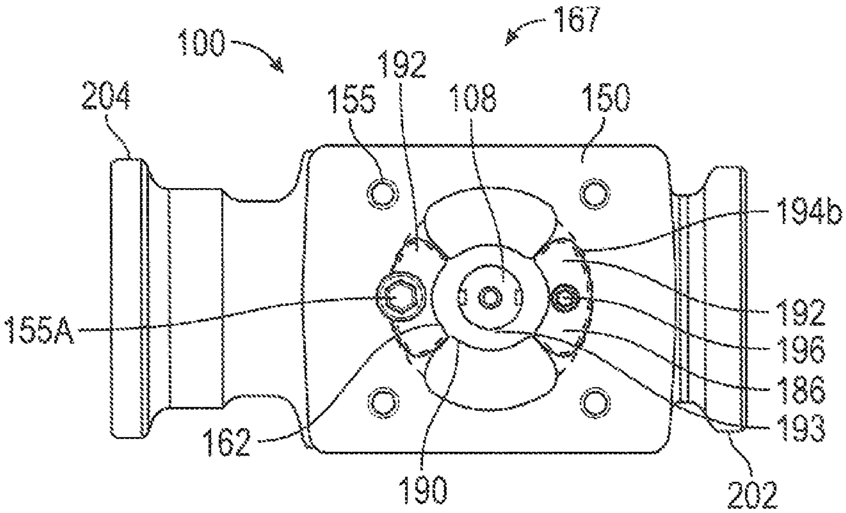
FIG. 4 is another plan view of the valve of FIG. 3 showing the shear bushing radially offset for stem retention and operation.

For example, the bushing profile 187 and the opening profile 163 may often comprise diametrically opposed pairs of the minor OD portions 190, the lobes 192, the minor ID portions 195*a*, and the opening passages 194, wherein the lobes are smaller than the opening passages, such as the matching butterfly profiles shown in FIGS. 2-4.

However, the valve stem 108 is retained by the bracket 150 when the bushing profile 187 is offset from the opening profile 163 such that lobes 192 of the shear bushing 186 are radially offset from the matching opening passages 194 of the stem opening 162, in a stem retention position 167, as best seen in FIGS. 1 and 4, wherein the bushing 186 is engaged between the bracket 150 and the stem shoulder 182. The bushing 186 is rotatable through 360 degrees in a countersunk bore 189 on the underside of the bracket 150, which often has the ID of major ID 194*b*.

Further, a bushing retention member 196, which may be an elongated screw, bolt, pin, padlock, etc., preferably extends through first retaining bore 197A formed in the bracket 150 and preferably into a corresponding second retaining bore 197B formed in one of the lobes 192 of the shear bushing 186 to retain the shear bushing in the radially offset position 167, as best seen in FIGS. 1 and 4. The first retaining bore 197A is preferably countersunk to receive any head of the bushing retention member 196, and the bushing retention member and retaining bore 197A and/or 197B may be threaded. Thus, the valve stem 108 can be removed while the valve 100 is in line, but is prevented from blowing out in service by radially offsetting the shear bushing 186 in the stem retention position 167, and the shear bushing 186 is preferably prevented from inadvertent rotation to the stem release position by engaging the bushing retention member 196.

As best seen in FIG. 1, if desired, the valve body 102 can be provided with end connections 198, 200 adapted for welding (not shown), but preferably comprising flanges adapted for bolting (not shown) or more preferably clamping hubs 202, 204 for clamping to similar adjoining clamping hubs of a pipe or fitting, which allow the valve 100 to be removed from process piping without cutting. Connections to upstream pipe 206 with clamp 208 and downstream pipe 210 with clamp 212 are shown in FIG. 3.

With the arrangement of FIGS. 1-4, it is not necessary to install valve stem 108 before installing the flow control element 106 and other trim 117. This provides flexibility in the manner of installation of the flow control element 106 and the trim 117, for example, as discussed in more detail below. Moreover, since valve stem 108 can be removed while the valve 100 remains in line, the packing rings 168 and/or shear bushing 186 can be replaced, e.g., with contiguous packing rings and a contiguous shear bushing.

The arrangement of valve stem 108 and shear bushing 186 for selective retention and release of the valve stem 108 is illustrated in FIGS. 1-4 and in the following figures in a preferred embodiment wherein the flow control element 106 floats between downstream seat 110 and spring-driven upstream seat 112, and wherein the valve trim 117 is inserted through one end of the flow bore 104, preferably an inlet bore 116 in a preferably single piece valve body 102, by way of example and not limitation. While the following discussion herein is directed to floating ball valve embodiments in a single piece valve, the skilled artisan will appreciate the valve stem 108 and shear bushing 186 arrangement of FIGS. 1-4 can be suitably used with any of the other valves shown in FIGS. 5-20, and any combination and permutation of the parts and components thereof, as well as any other rotary valve.

The flow bore 104 shown in FIG. 1 preferably comprises a main bore 114 located centrally in the valve body 102 between an inlet end or bore 116 and an outlet end or bore 118. The main bore 114 has an ID larger than an OD of the flow control element 106 or is otherwise sufficiently large to receive the flow control element. The outlet bore 118 has an ID less than the main bore 114 and preferably less than an OD of the downstream seat 110 and less than the OD of the flow control element 106 to facilitate retention in the flow bore; and the inlet bore 116 preferably has an ID equal to or larger than the main bore 114. This arrangement allows the elements 106, 110, 112 of the valve trim 117 to be inserted into the main bore 114 from the inlet bore 116 and to be retained by the valve body 102 against the outlet bore 118.

The downstream seat 110 is disposed in the main bore 114 between the outlet bore 118 and the flow control element 106 to form a primary body seal between the flow control element and the valve body 102. For example, the downstream seat 110 can comprise an assembly of a removable, annular downstream seat body 120 and a downstream sealing element 122 illustrated as a gasket, as shown in FIG. 1. The seat body 120 has a spherical sealing surface 124 lapped to sealingly engage the flow control element 106, an attachment end 126 received in cylindrical entry bore 128 formed in the valve body 102 adjacent to the outlet bore 118, and a seat shoulder 128 loading the gasket 122 against an annular surface 130 of the valve body 102.

Figure 12:
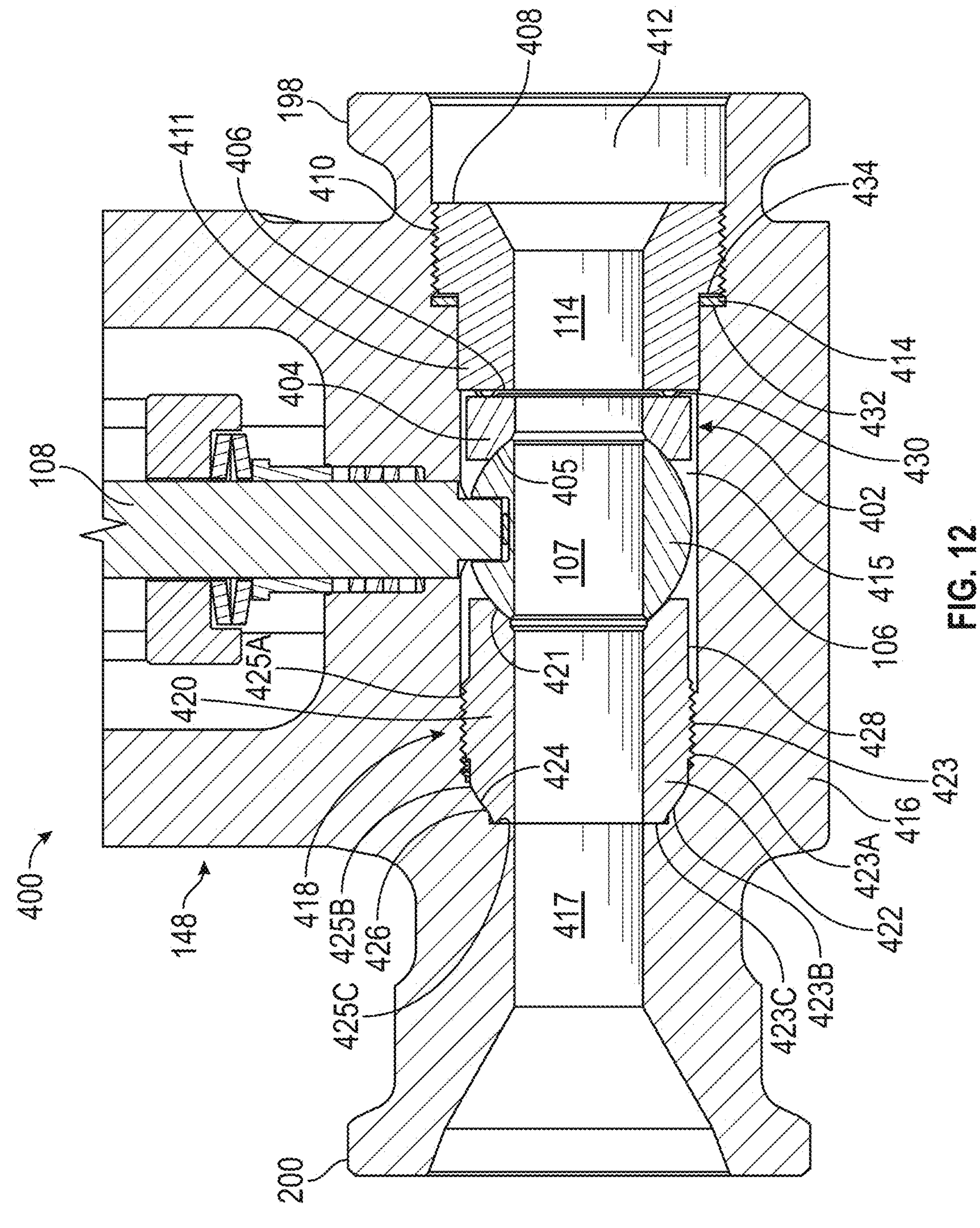
FIG. 12 is a cross-sectional view of a bidirectional valve according to another embodiment of the invention.

The upstream seat assembly 112 is preferably a pusher seat disposed in the main bore 114 between the flow control element 106 and a retainer 132 having an annular structure, which may be a retaining ring received in groove 134 as shown, or a threaded member 408 (FIG. 12). For example, the upstream seat assembly 112 can comprise a seat spring 136, annular spacer 138, and an upstream seat element 140.

The seat spring 136 is often disposed between the annular spacer 138 and the seat element 140. The seat spring 136 is preferably a disc spring or may be a plurality of disc spring elements 136A, 136B that are alternatingly stacked for the desired spring constant and amount of deflection.

The seat element 140 has an inner upstream spherical engagement surface 142 to contact the flow control element 106 and an outer annular upstream engagement surface 144 in contact with the seat spring 136.

The annular spacer 138 is in turn disposed between the retainer 132 and the seat spring 136. The annular spacer 138 can have an entry taper 138A for fluid flow transition from the inlet flow bore 116 to a flow bore 140 through the flow control element 106, and an acute exit taper 138B to facilitate centering of the spring element 136B, which can have a diameter less than an OD of the upstream seat assembly 112.

The retainer 132 thus urges the annular spacer 138 against the seat spring 136, which loads the seat element 140 against the flow control element 106, the flow control element 106 against the seat body 120, and the seat body 120 against the gasket 122, to form the seal between the flow control element 106 and the valve body 102.

Figure 5:
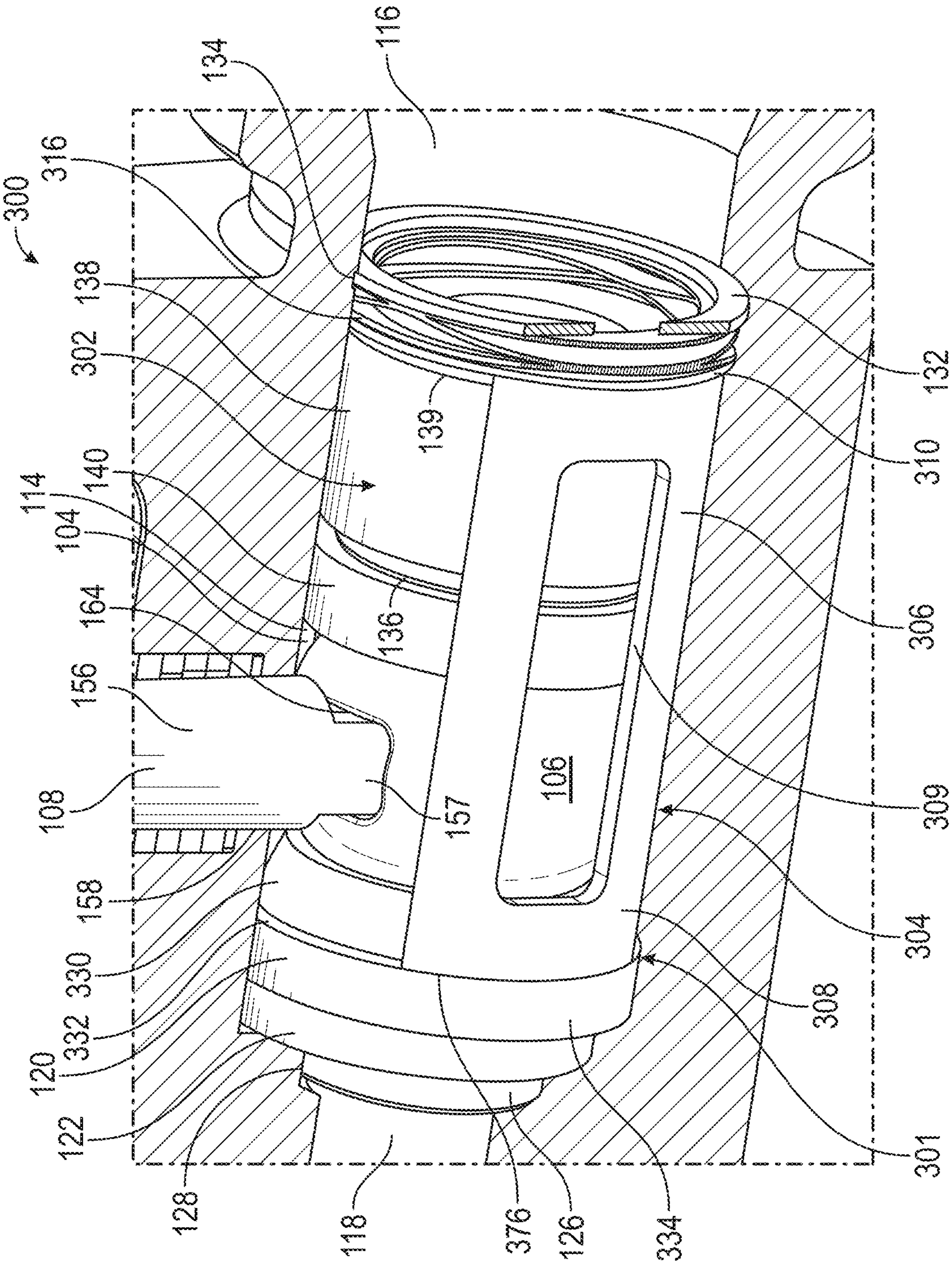
FIG. 5 is a partially cutaway perspective view of the valve trim of another embodiment of the present invention using a cartridge.
Figure 6:
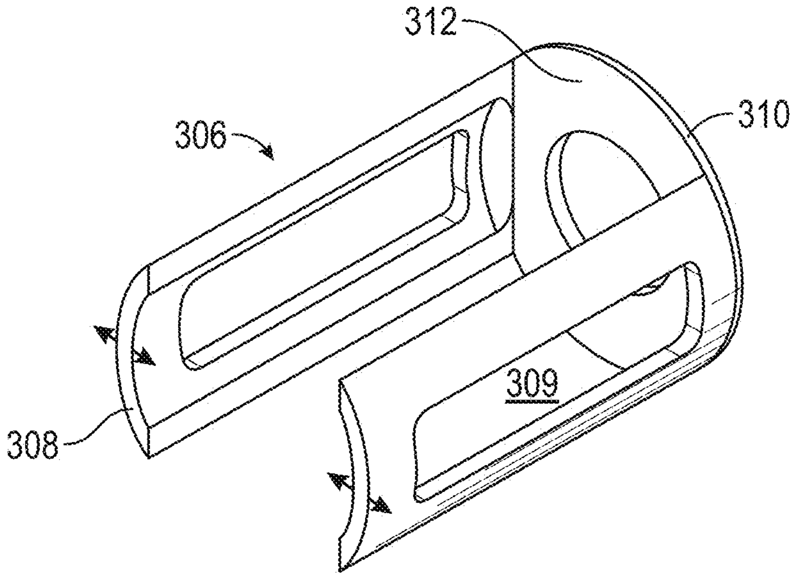
FIG. 6 is a perspective view of the sleeve of the cartridge from FIG. 5.

FIGS. 5-6 show an embodiment of a repairable valve 300, preferably comprising the upper valve portion 148 from FIG. 1, wherein the flow control element 106 and upstream seat assembly 302 can be installed as a cartridge assembly 304. The valve comprises a spherical flow control element 106 with a flow control bore 107 therethrough (see FIGS. 1 and 8), a valve stem (108) to engage the flow control element, and a valve body 102 comprising a flow bore 104 to rotatably receive the flow control element and a stem bore 158 to rotatably receive the valve stem. The flow bore comprises a main bore (114), an inlet bore (116), and an outlet bore (118).

A downstream seat (110) comprises a seat body (120) for sealing engagement with the valve body 102 adjacent the outlet bore 118. The seat body has a sealing surface 124 (FIG. 1) to sealingly engage the flow control element 106 and an outwardly tapered surface (330) adjacent the downstream seat element 106. An upstream seat assembly (302) comprises an upstream seat element (140) to engage the flow control element, a seat spring (136) to bias the upstream seat element, and an annular spacer (138) following the seat spring 136.

The cartridge assembly 304 is insertable into the inlet bore 116 and comprises a sleeve 306, best seen in FIG. 6, engaging the annular spacer 138 and the flow control element 106 to hold the upstream seat element 140 and the seat spring 136 between the annular spacer and the flow control element for insertion into the flow bore 104. The sleeve 306 has a leading end 376 to engage the outwardly tapered surface 330 to expand the sleeve 306 and release the flow control element 104 to float between the upstream seat element 140 and the downstream seat body 120.

A retainer 132 having an annular structure is provided for removable attachment in the inlet bore to secure the cartridge 304 in the flow bore 104 and load the seat spring 136.

As installed, the sleeve 306 has a cylindrical profile with an OD adjacent an ID of the main bore 114, i.e., matching the ID so that it has the same or slightly smaller diameter. The sleeve 306 comprises a plurality of arms 308, preferably opposing arms 308 (e.g., diametrically opposed), extending axially from a base 310, which may comprise an annular disc 312 engaging a trailing end 139 of the spacer 138. In the embodiment seen in FIGS. 5-6, the disc 312 and arms 308 have an OD larger than, and the arms have an ID matching OD's of the spacer 138 and seat element 140. Preferably, the arms 308 are radially spaced apart to permit the lower end 156 of the valve stem 108 and tang 157 to access and engage the recess 164 of the flow control element 106. If desired, the arms 308 may be provided with central cutout portions 309.

If desired, the cartridge assembly 304 may be used with a pre-loading spring 316, preferably between the cartridge 304 and the retainer 132, as shown in FIG. 5. The cartridge assembly 304 and the pre-loading spring 316, if present, can be retained in the flow bore 104 by retainer (retaining ring) 132 in groove 134.

The cartridge assembly 304 can be installed by spreading apart the arms 308 as shown in FIG. 6, inserting the annular spacer 138, seat spring 136, upstream seat element 140, and flow control element 104, and squeezing them together, as described below in more detail in connection with FIGS. 7-10. To assemble the cartridge assembly 304 prior to installation, the arms 308 are spread outward if needed in a neutral position with a generally cylindrical profile to receive the upstream seat assembly 302 and flow control element 106, and then squeezed together in a small-angle frustoconical profile to hold the upstream seat assembly 302 and flow control element 106, which preferably has a smaller diameter than the main flow bore 114, for installation.

The downstream seat body 120 has an outwardly tapered surface 330 tapering outwardly, from a proximal end of the seat body 120 adjacent to the sealing surface 124 (cf. FIG. 1), to a shoulder 332 formed at an enlarged diameter portion 334. After assembly of the cartridge assembly 304, it is inserted in the inlet flow bore 116 until the ends of the arms 308 engage the outwardly tapered surface 330. Further advancement of the cartridge assembly 304 on the outwardly tapered surface 330 spreads the arms 308 apart until the flow control element 106 engages the downstream seat body 120 and now floats between the upstream seat element 140 and downstream seat body 120. If desired, the arms 308 can abut shoulder 332 for proper axial alignment of the sleeve 306, or there can be a space between the arms 308 and shoulder 332 to account for differential thermal expansion.

Figure 8:
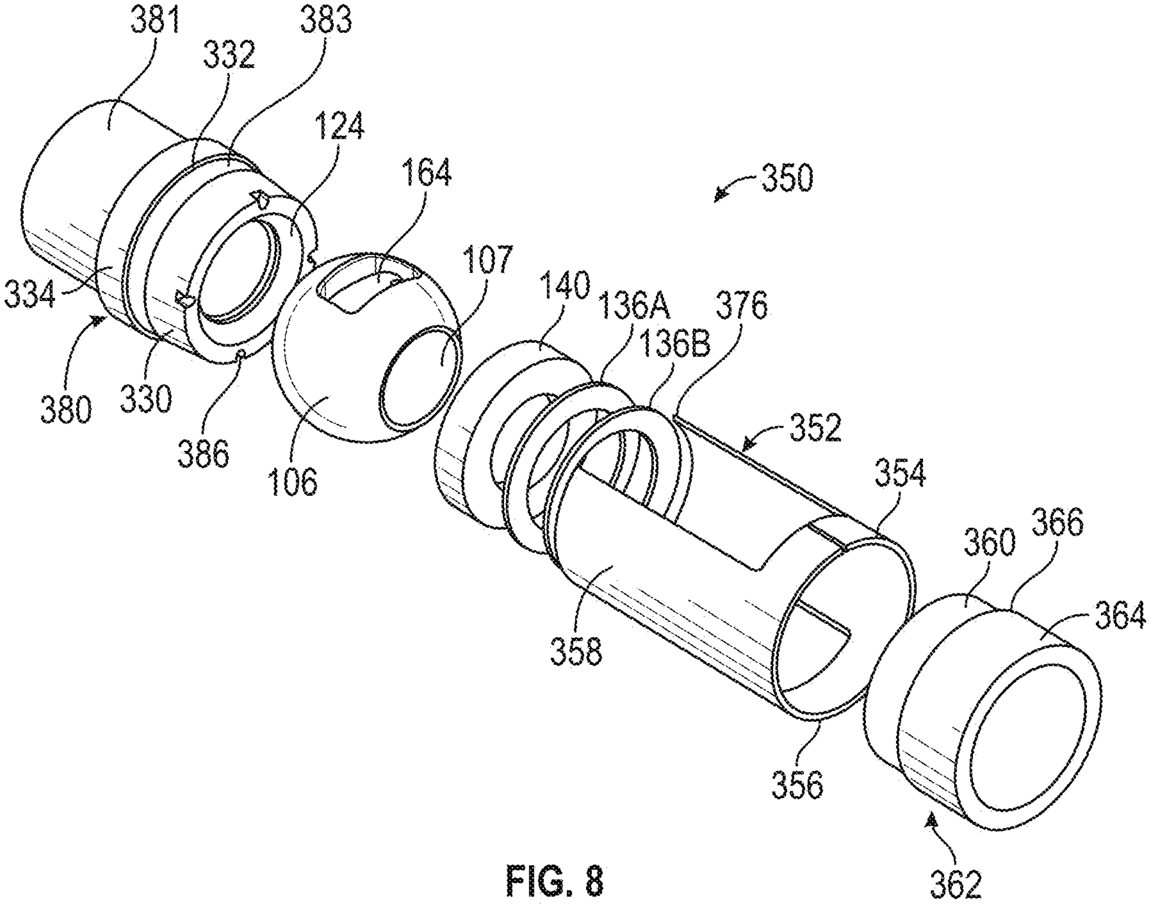
FIG. 8 is an exploded view of the valve trim of FIG. 7.

In an embodiment seen in FIGS. 7-11, the repairable valve 340 uses trim 350 that is similar to trim 301 in the valve 300 of FIGS. 5-6 except that the sleeve 352 in the cartridge assembly 353 has a base 354 comprising a ring 356, as best seen in FIG. 8, that tightly engages leading end 360 of spacer 362; and except that downstream seat body 380 has a an attachment end 381 comprising a machine tapered cone for forming an interference fit in a correspondingly machine tapered entry bore 384 for releasably securing the downstream seat body 334 to the valve body 382.

The sleeve 352 can be conveniently formed from rolled sheet metal such that arms 358 are spaced radially apart to accommodate engagement of the tang 157 of valve stem 108 in the recess 164 on the flow control element 106. A distal end of the spacer 362 has an enlarged outside diameter relative to proximal end 360 that is at least equal to an outside diameter of sleeve 352, or preferably slightly larger, forming a shoulder 366. Preferably, the distal end 364 of the sleeve 352 abuts shoulder 366.

The downstream seat element 380 has a proximal spherical sealing surface 124 (see FIG. 8) lapped to sealingly engage the flow control element 106, an outwardly tapered surface 330, and a cylindrical surface 383 between the distal end of outwardly tapered surface 330 and shoulder 332 at enlarged diameter portion 334. If desired, the downstream seat element 380 can be provided with external notches 386 to facilitate lapping to the flow control element 106.

The downstream seat element 380 comprises tapered press-fit cone 381 in correspondingly tapered entry bore 384 to the outlet end 118 of the valve body 382. Press-fit cone 381 and entry bore 384 preferably comprise a Morse taper for sealing engagement. The downstream seat element 380 is inserted by driving the cone 381 into the entry bore 384. Where the downstream seat element 380 has a smaller inside diameter than the outlet flow bore 118, the seat element 380 can be removed (after removal of the other trim 370 components) by hammering the press-fit cone 381 through the outlet end 118.

Figure 9:
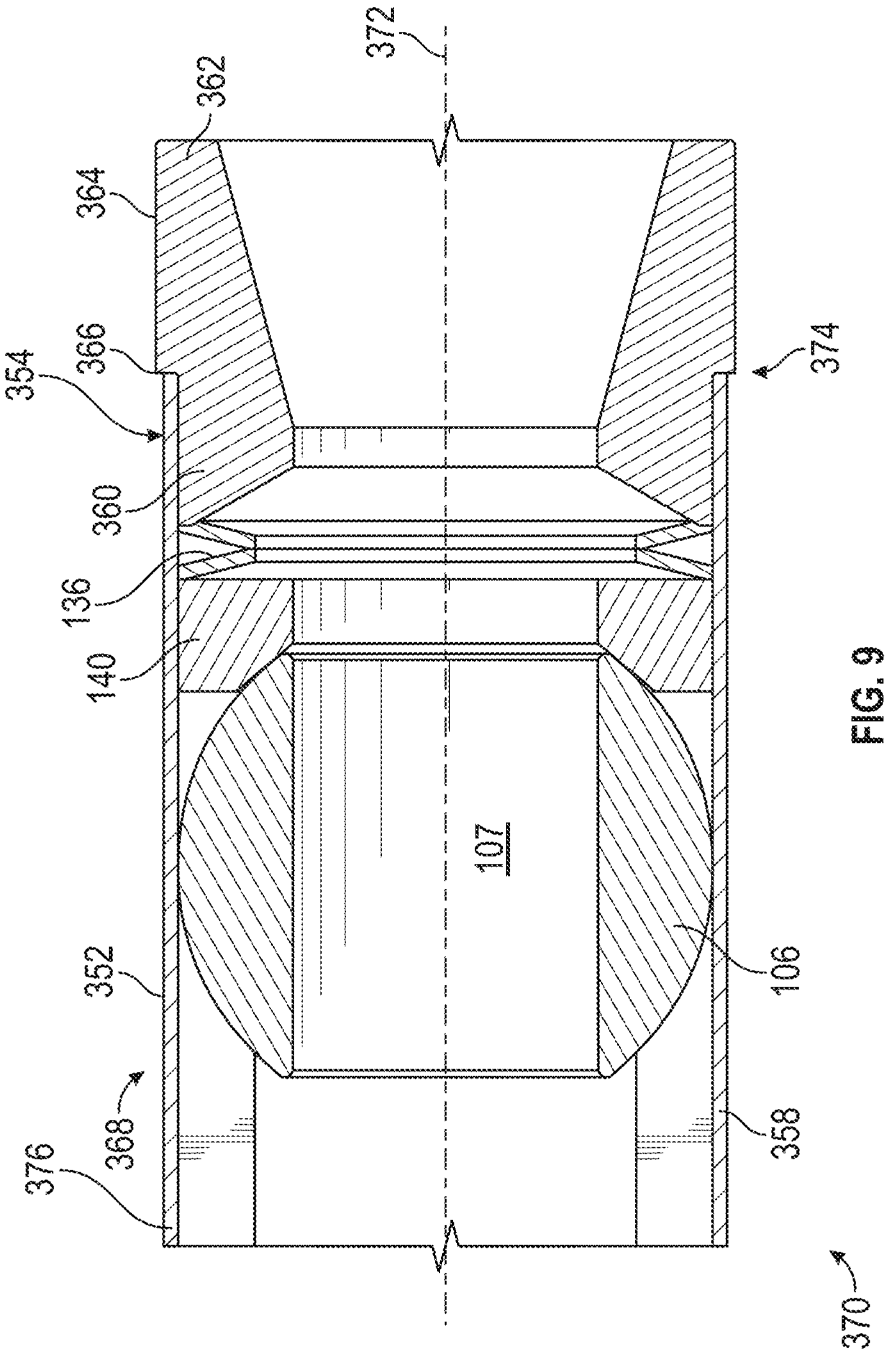
FIG. 9 is a cross-sectional view in plan of a portion of the valve trim of FIGS. 7-8 in installation mode as seen along the lines 8-8.
Figure 10:
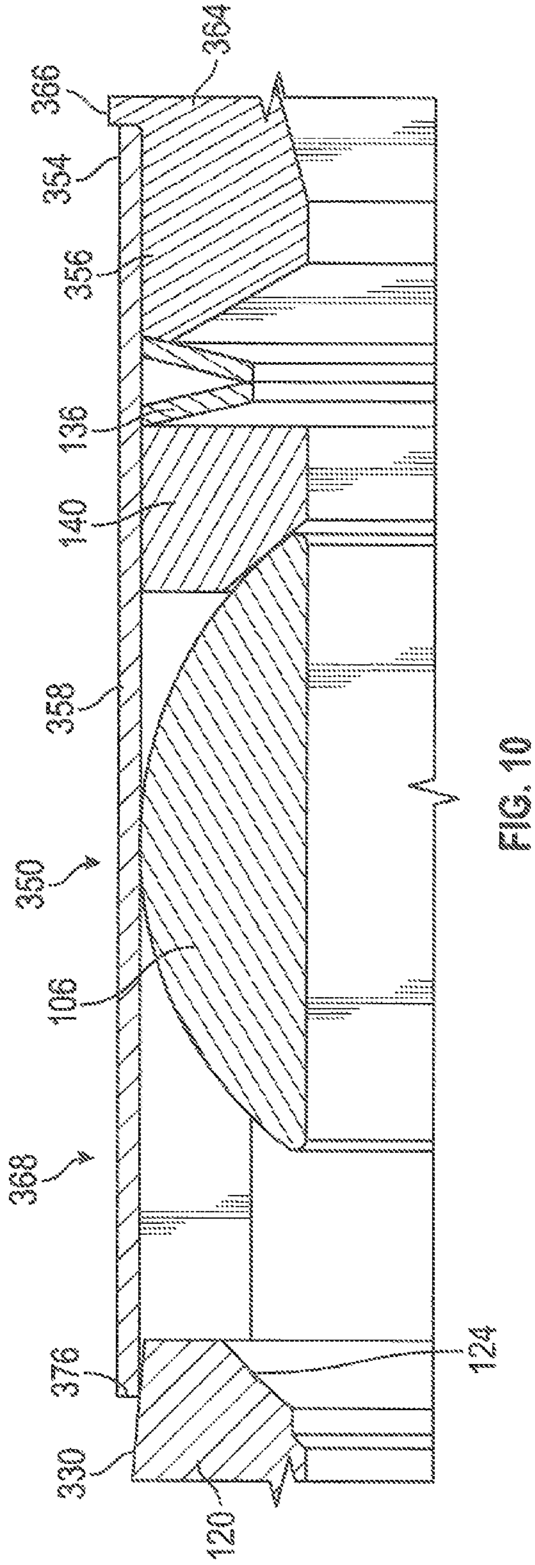
FIG. 10 is an enlarged cross-sectional view of one side of the cartridge assembly of FIGS. 7-9 in installation mode just as the cartridge arms contact the taper of the downstream seat during installation.
Figure 11:
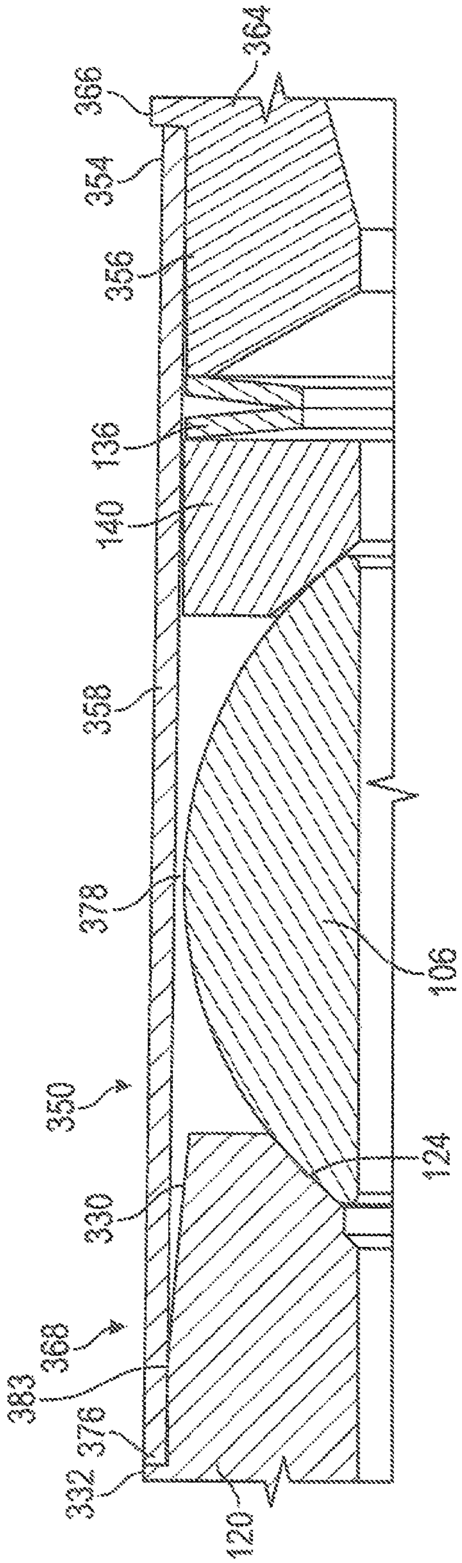
FIG. 11 is an enlarged cross-sectional view of the side of the cartridge assembly of FIG. 10 after the cartridge has been fully advanced.

With reference to the embodiment of FIGS. 7-11, prior to installation, the cartridge assembly 368 has an installation configuration 370 as shown in FIG. 9 in which the arms 358 are at a small angle with respect to a longitudinal axis 372 to engage and hold the flow control element 106, which has a relatively smaller outside diameter than the spacer 362, and the upstream seat assembly 374, in which the upstream seat element 140 and spring 136 have a profile with a gradually increasing outside diameter complementing the small angle of the arms. The arms 358 thus serve to hold the flow control element 106, the seat element 140, the spring 136 comprising spring elements 136A, 136B, and the spacer 362 in relative position and aligned for insertion through the inlet flow bore 116 until the leading ends 376 of the arms 358 engage the outwardly tapered surface 330 of the downstream seat body 120, as best seen in FIG. 10.

Then, with continued advancement of the cartridge assembly 368 against the outwardly tapered surface 330, the arms 358 are spread apart to form a gap 378, release the flow control element 106 and allow it to float between the downstream and upstream seat elements 120, 140, as seen in FIG. 9. Preferably, the downstream seat body 120 has an enlarged outer diameter 380 at a distal end of the outwardly tapered surface 330 against which the arms 358 can shoulder as the flow control element 106 engages the sealing surface 124.

Finally, following insertion of the cartridge assembly 368, the pre-loading spring 316 and retainer 134 are installed in the inlet bore 116. Then the stem 108 and topworks 148 can be assembled as described above.

The embodiment shown in FIG. 12 is a bidirectional valve 400 in which the upper valve portion 148 and end connections 198, 200 are preferably identical or similar to those in FIG. 1. Flow control element 106 is spherical with a flow control bore 107 formed therethrough. Valve body 416 is a single piece valve body comprising a flow bore 104 rotatably receiving the flow control element 106. The flow bore 114 comprises a central flow bore 415 and first and second end bores 417, 412. The central bore 415 has an inside diameter (ID) larger than an ID of the first end bore 417 and smaller than an ID of the second end bore 419.

A first (normally downstream) seat 418 is provided adjacent the first end bore 417 for sealing engagement between the flow control element 106 and the valve body 416. The first seat 418 comprises a first seat body 420 comprising a first sealing surface 421 for sealingly engaging the flow control element 106 and an attachment end 422 releasably secured to the valve body 416, e.g., via threaded engagement in the entry bore 423. The first seat body 420 can be provided with an external polygonal cut (e.g., 6 point or 12 point hex cut) profile 428 for threading the seat element into the valve body 416 using a socket wrench.

The attachment end 422 can be formed, e.g., as a flare fitting such as a 37-degree fitting conforming to AN (Air Force—Navy Aeronautical Design Standards) or JIC (Joint Industries Council) such as SAE J514/ISO-8434-2.

Figure 13:
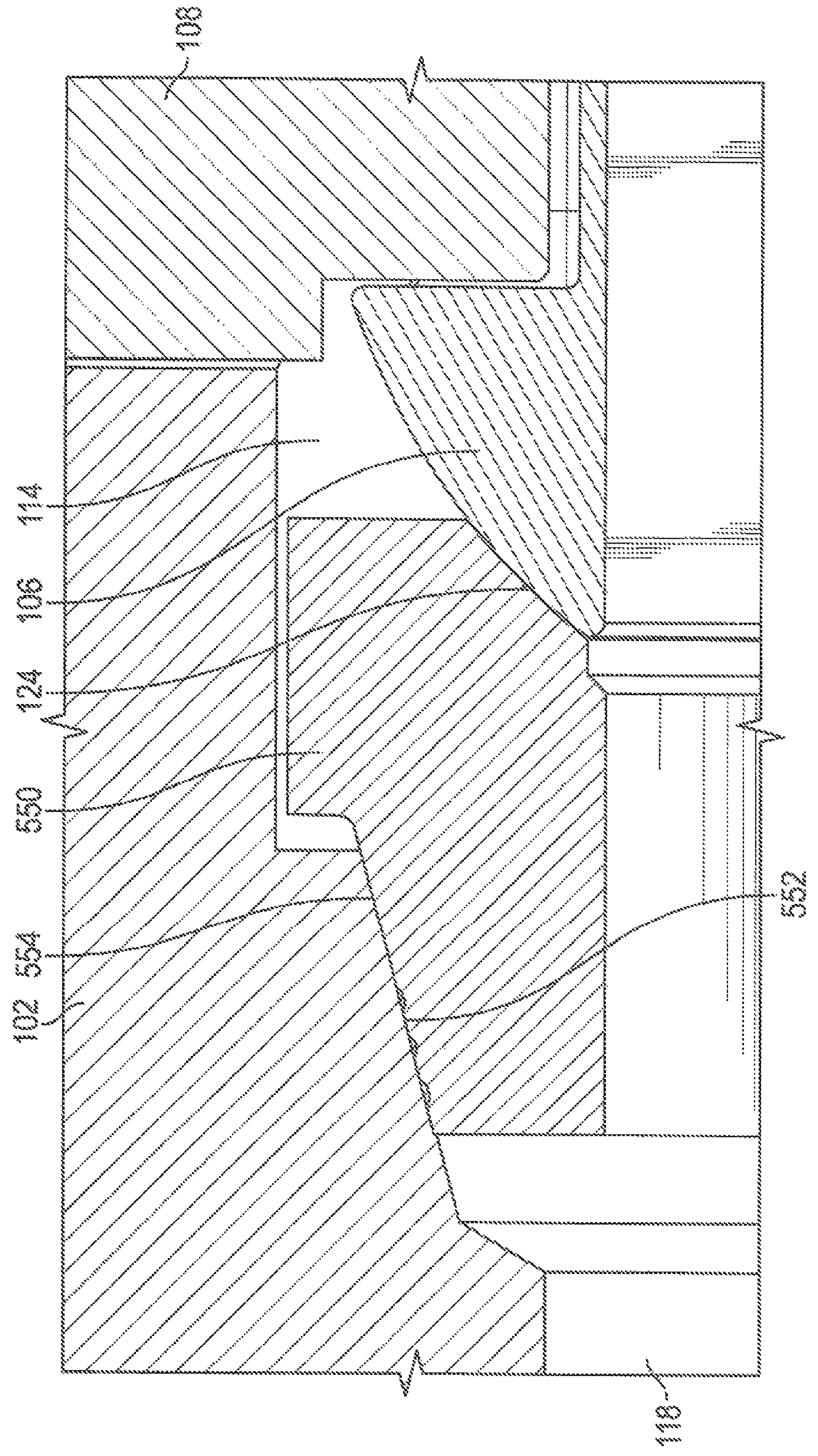
FIG. 13 is a cross-sectional detail of a downstream seat wherein the cone comprises ridges to form a labyrinthine seal according to another embodiment of the invention.
Figure 14:
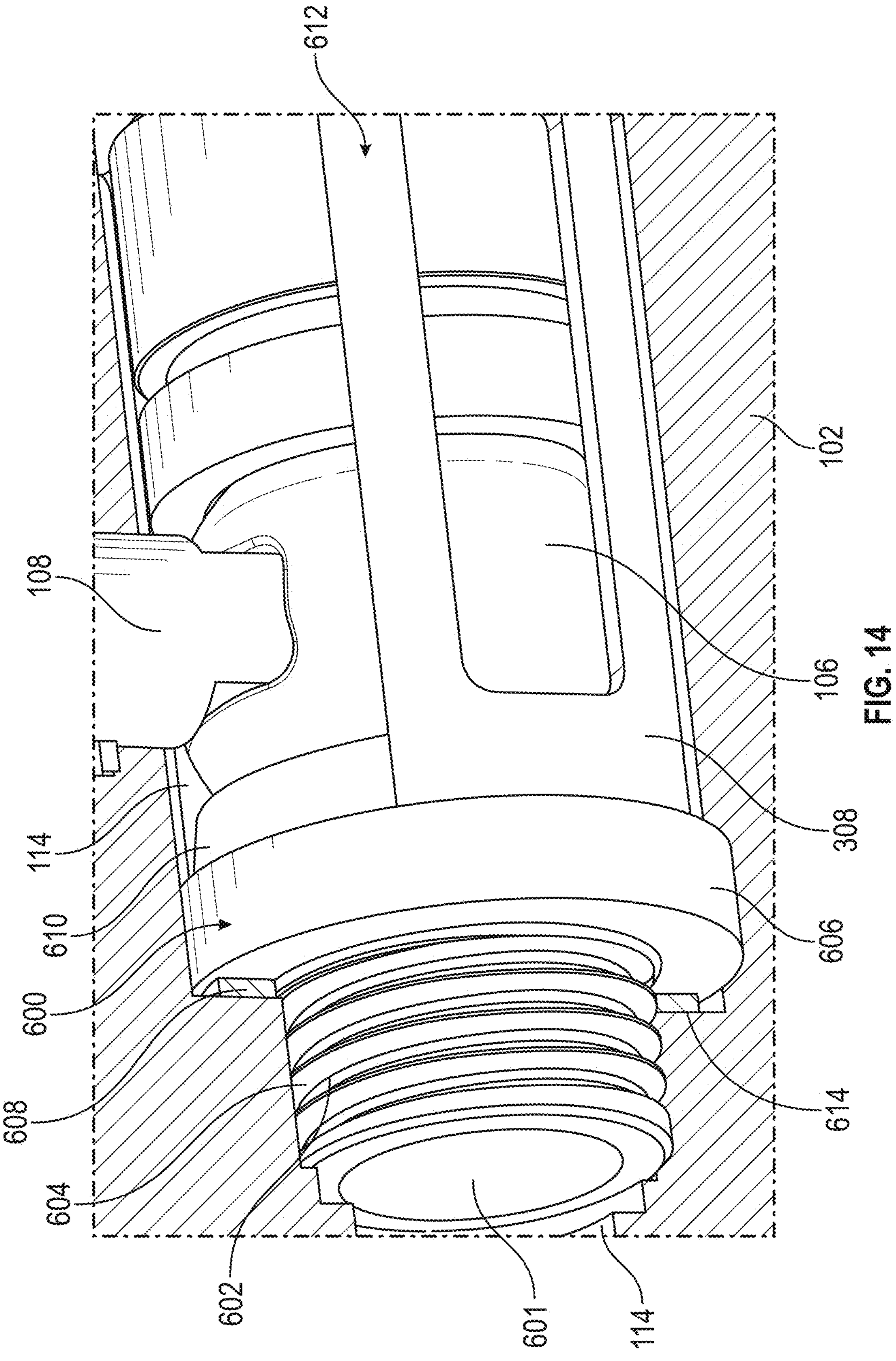
FIG. 14 is a partially cutaway view of a portion of a valve wherein the downstream seat assembly comprises trapezoidal screw threads according to another embodiment of the invention.
Figure 15:
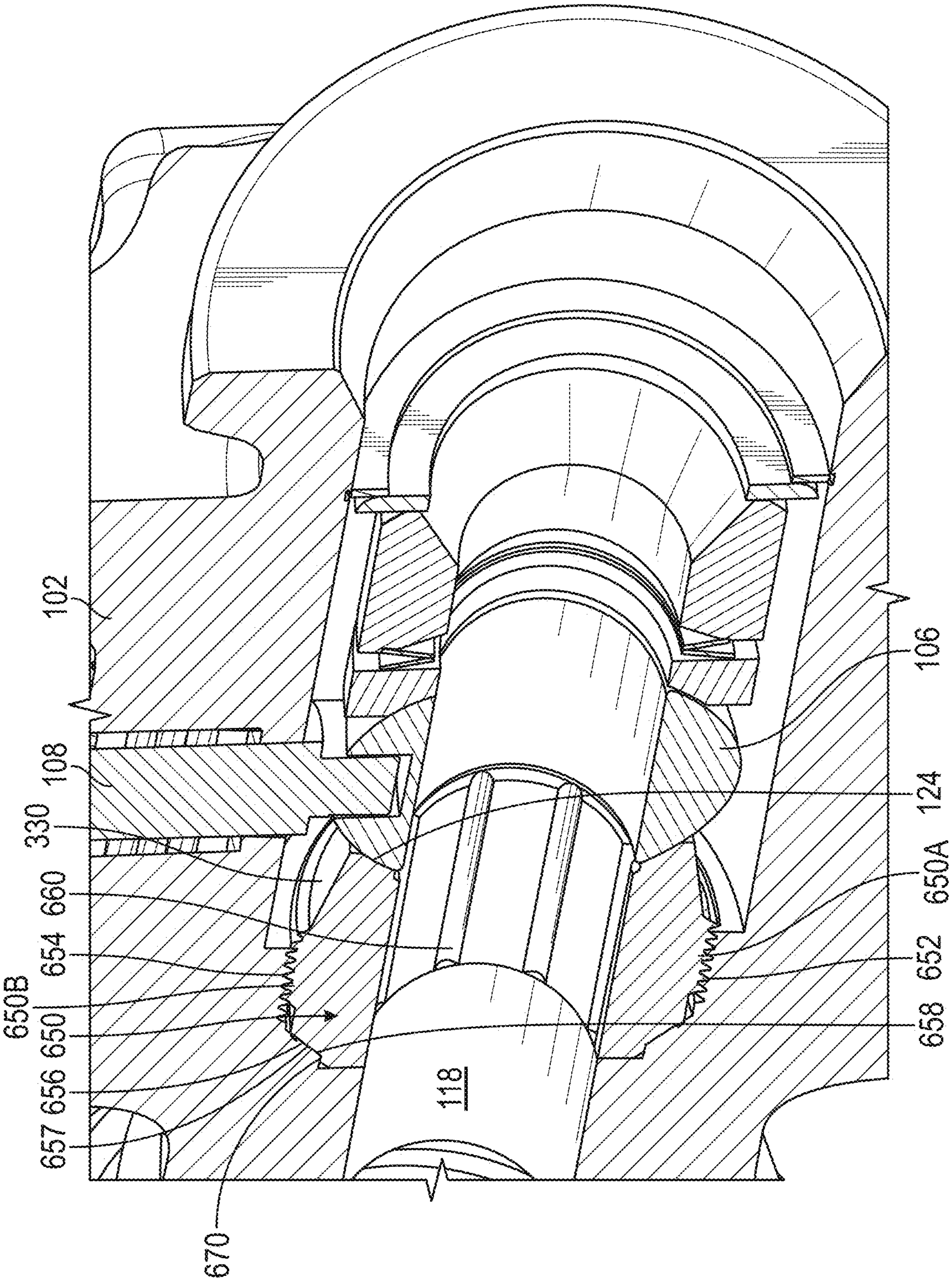
FIG. 15 is a perspective cross-sectional view of a portion of a valve showing a downstream seat having a flare fitting threaded into the valve body, and internal notching for installation with a square bar according to another embodiment of the invention.

Alternatively, the first seat 418 could comprise any of the downstream seat elements and/or assemblies described herein in connection with FIG. 1, 7, or 13-19. For example, the first seat body 420 can comprise internal notching 660 (FIG. 14) for installation with a square bar inserted into the second end bore 412, preferably (A) wherein the attachment end 422 comprises trapezoidal screw threads 602, wherein the first seat body 420 comprises a flanged section 606 adjacent the attachment end 420 and a gasket 608 compressed between the flanged section and an annular surface 614 of the valve body 416 adjacent the first end bore, or (B) wherein the attachment end section and the valve body comprise a flare fitting profile 650 (FIG. 15).

The first seat body 420 preferably comprises a threaded element 425A threadedly received in entry bore 423 and having an external polygonal cut profile 428, preferably a hex cut profile, for installation with a socket inserted through the second end bore 412. More preferably, the entry bore comprises a threaded section 423A adjacent the central bore 415 receiving the threaded element 425A, a cylindrical section 423C adjacent an ID of the first end bore 417 receiving a cylindrical element 425° C. of the first seat body, and a tapered section 423B between the threaded section and the cylindrical section engaging a tapered element 425B of the first seat, the first seat body is preferably a single piece comprising the threaded element 425A, the external polygonal cut profile 428, and the tapered element 425B between the cylindrical element 425C and the threaded element, more preferably wherein the seat body 420 and the entry bore 423 comprise respective male and female flare fitting profiles 650A, 650B (FIG. 15).

A second (normally upstream) seat 402 has a second seat body 404 having an upstream sealing surface 405 lapped to sealingly engage the flow control element 106. A seat spring 406 biases the upstream seat element against the flow control element 106, and the flow control element 106 floats between the first seat 418 and the second seat 402.

The valve 400 further comprises an annular plug 408 in sealing engagement with the valve body 416. The annular plug 408 has an outer end 410 opposite the seat spring 406 with a relatively enlarged OD that is threadedly engaged in similarly enlarged second end 412. A relatively reduced OD end 411 of the plug 408 extends into the central flow bore 415 to engage and load the seat spring 406 and secure the upstream seat assembly 402, the flow control element 106, and the downstream seat 418, in the main flow bore 114. A gasket 414, preferably spiral wound, is shouldered between the enlarged end 410 of the plug 408 and the valve body 416, e.g., between opposing shoulders 432, 434 between the second end and central bores 412, 415 of the flow bore 114 and between outside diameters of the inner and outer ends 411, 410 of the annular plug 408.

A seat land 430 is provided between the second seat body 404 and the inner end 411 of the annular plug 408 for sealingly engaging the second seat body 404 and the inner end 411 of the plug 408. For normal direction seating, when a fluid pressure is higher in the second end bore 412 relative to the first end bore 417, the inner end 411 loads the seat spring 406 against the second seat body 404 to urge the flow control element 106 to sealingly engage the first sealing surface 421. However, for reverse direction seating, when fluid pressure is higher in the first end bore 417 relative to the second end bore 412, the seat spring 406 is compressed, and the seat land 430 is sealingly engaged to form a seal between the second seat body 404 and the inner end 411 of the annular plug 408. The seat land 430 is preferably formed on the inner end 411 of the plug 408 around the spring 406 with a seat land height that exceeds the solid height (fully compressed) of the seat spring 406.

Figure 7:
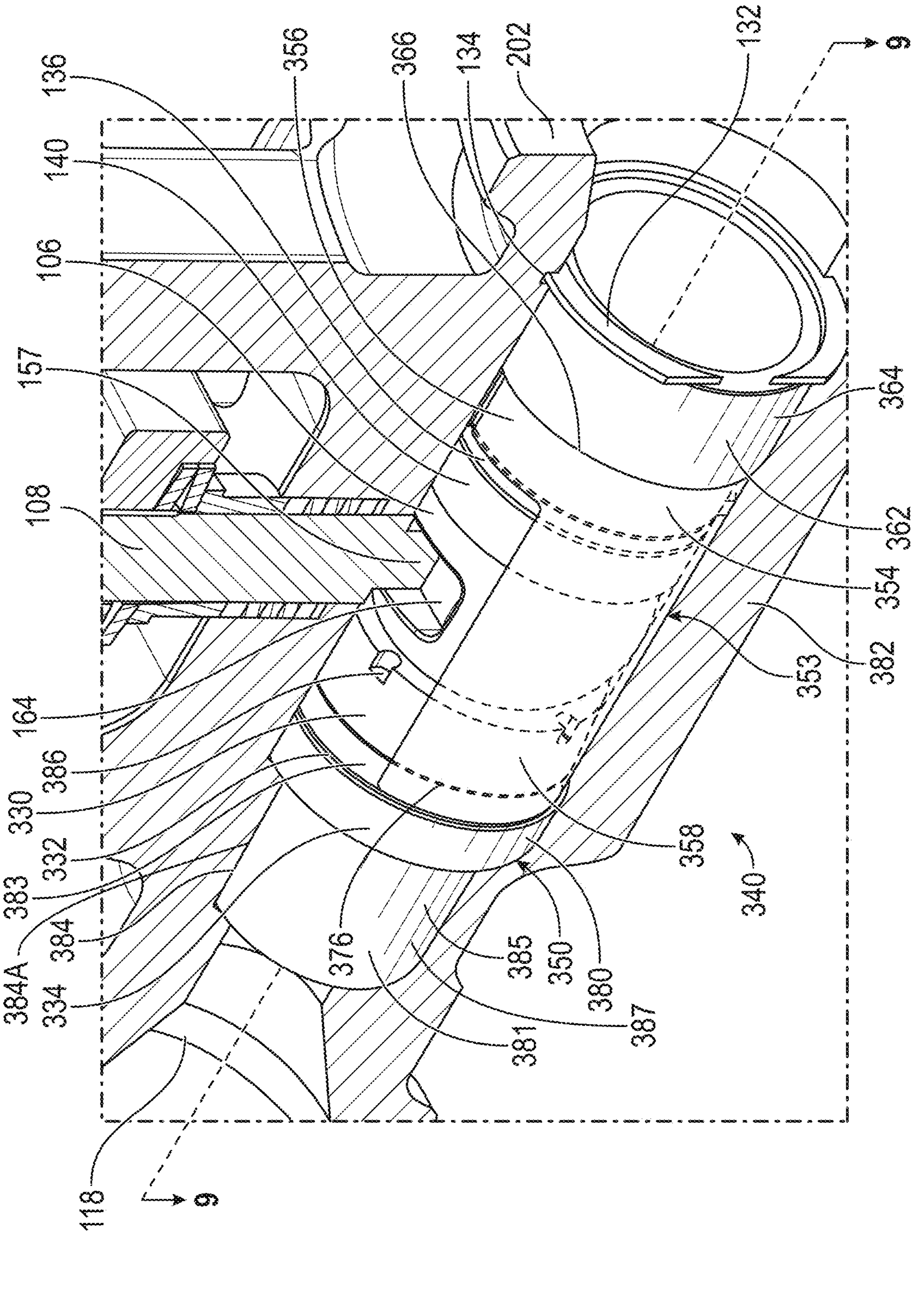
FIG. 7 is a partially cut away view of a valve showing the valve trim of another cartridge embodiment of the present invention.

FIG. 13 shows a downstream seat body 550 similar to the downstream seat body 380 of FIG. 7 except that the seat body 550 is provided with ridges 552 on the cone 554 to form a labyrinthine seal. Where the seat element 550 is provided with a taper adjacent the sealing surface 124 (cf. FIG. 1), the optional cartridge assembly (not shown) can then be inserted as described above in connection with FIGS. 5-11. The downstream seat element 550 can be removed (after removal of the other trim components) by hammering the press-fit cone 554 through the outlet bore 118.

FIG. 14 shows a downstream seat body 600 with an attachment end 601 comprising a threaded element 602 with trapezoidal screw threads such as ACME power screw threads engaged with similar threads formed in an entry bore 604. The assembly 600 has a flanged section 606 adjacent the outlet flow bore 114 that compresses a gasket 608 to form a body seal. The assembly 600 can be inserted and removed by rotation using a square bar inserted through the inlet bore 116 (FIG. 1) where the assembly 600 is provided with internal notching 660 (see FIG. 14 below). Where the seat assembly 600 is provided with a taper 610 adjacent the sealing surface 124 (cf. FIG. 1), the optional cartridge assembly 612 can then be inserted as described above in connection with FIGS. 5-11. The downstream seat assembly 600 can be removed (after removal of the components of the cartridge assembly) by hammering the press-fit cone 502 through the outlet end 506.

FIG. 15 shows a downstream seat body 650 comprising a male flare fitting profile 650A with external threads 652 at an attachment end 653 engaged in a similarly threaded section 654A of an entry bore 654. A cylindrical section 670 of the entry bore 654 adjacent an ID of the outlet end bore 118 receives a cylindrical element 672 of the seat body 650. A body seal is formed at the opposing sealing surfaces of tapered element 656 of seat 650 and tapered section 658 at the bottom of the entry bore 654. The seat body 650 can be provided with either an external 6- or 12-point hex profile (not shown) for installation with a standard sized socket wrench, or preferably internal notching 660 for installation and removal using a square bar inserted through the inlet bore 116 (cf. FIG. 1). The internal notching 660 allows the seat assembly to have the outwardly tapered surface 330 adjacent the sealing surface 124, which enables the use of the optional cartridge assembly 612.

Figure 16:
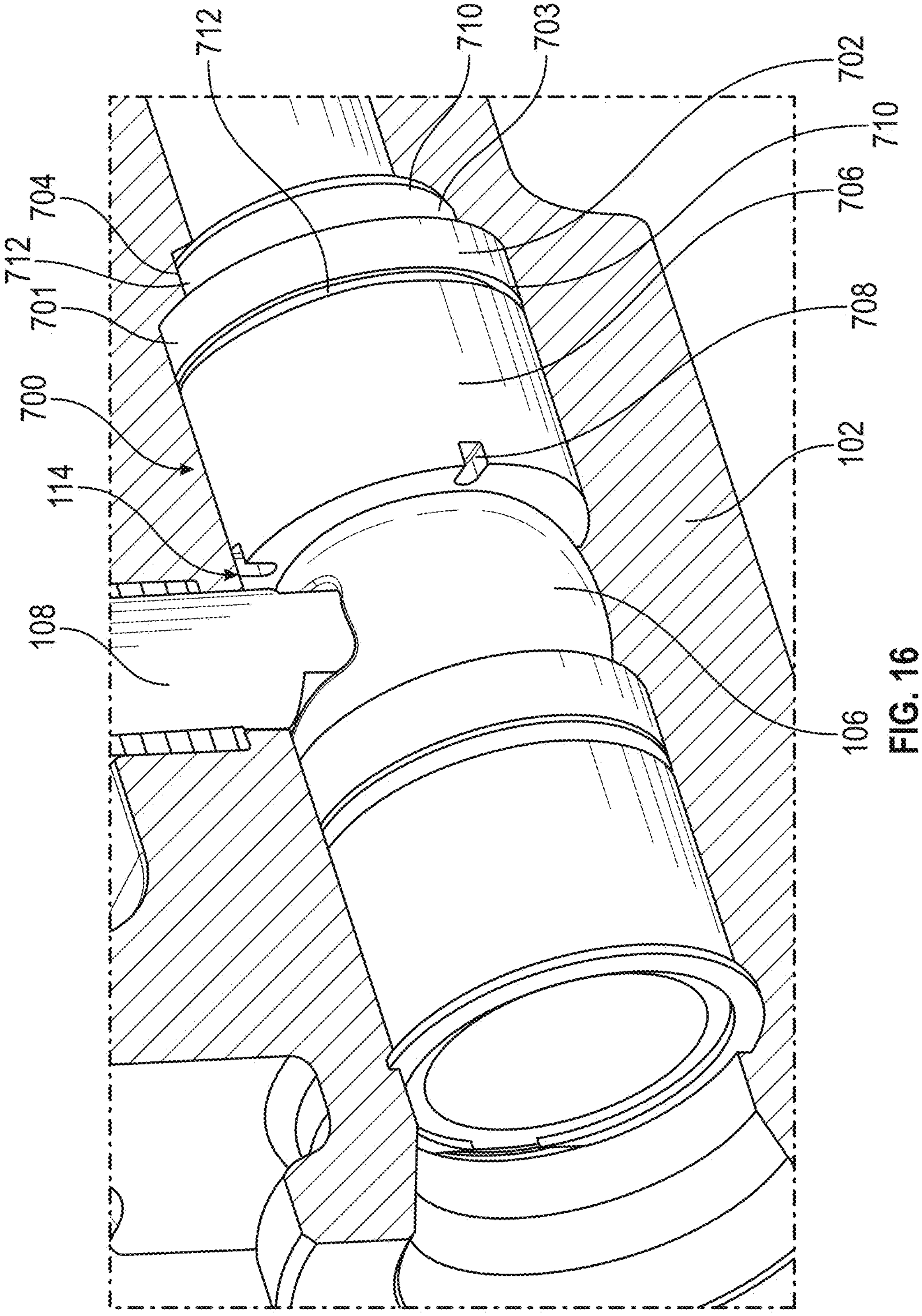
FIG. 16 is a partially cutaway view of a valve wherein the downstream seat assembly has a pressed in seat land according to another embodiment of the present invention.

FIG. 16 shows a downstream seat 700 comprising an assembly of a seat body 706 and a secured portion 701 of the downstream seat 700 secured to the valve body 102. The secured portion 701 preferably comprises seat land 702 press-fit in the entry bore 704. The seat land 702 and the seat body 706 have opposing lapped surfaces 710, 712 for sealing engagement. The seat land 702 is not removable without damage, however, the downstream seat body 706 is removable. The downstream seat body 706 is provided with notches 708 used in manufacturing to facilitate lapping the surface 710 to opposing surface 712 of the seat land 702. The seat body 706 preferably has an OD adjacent an ID of the main bore 114 for stability, and is compressed between the flow control element 106 and the seat land 702 to maintain the surfaces 124, 710, 712 in sealing engagement.

Figure 17:
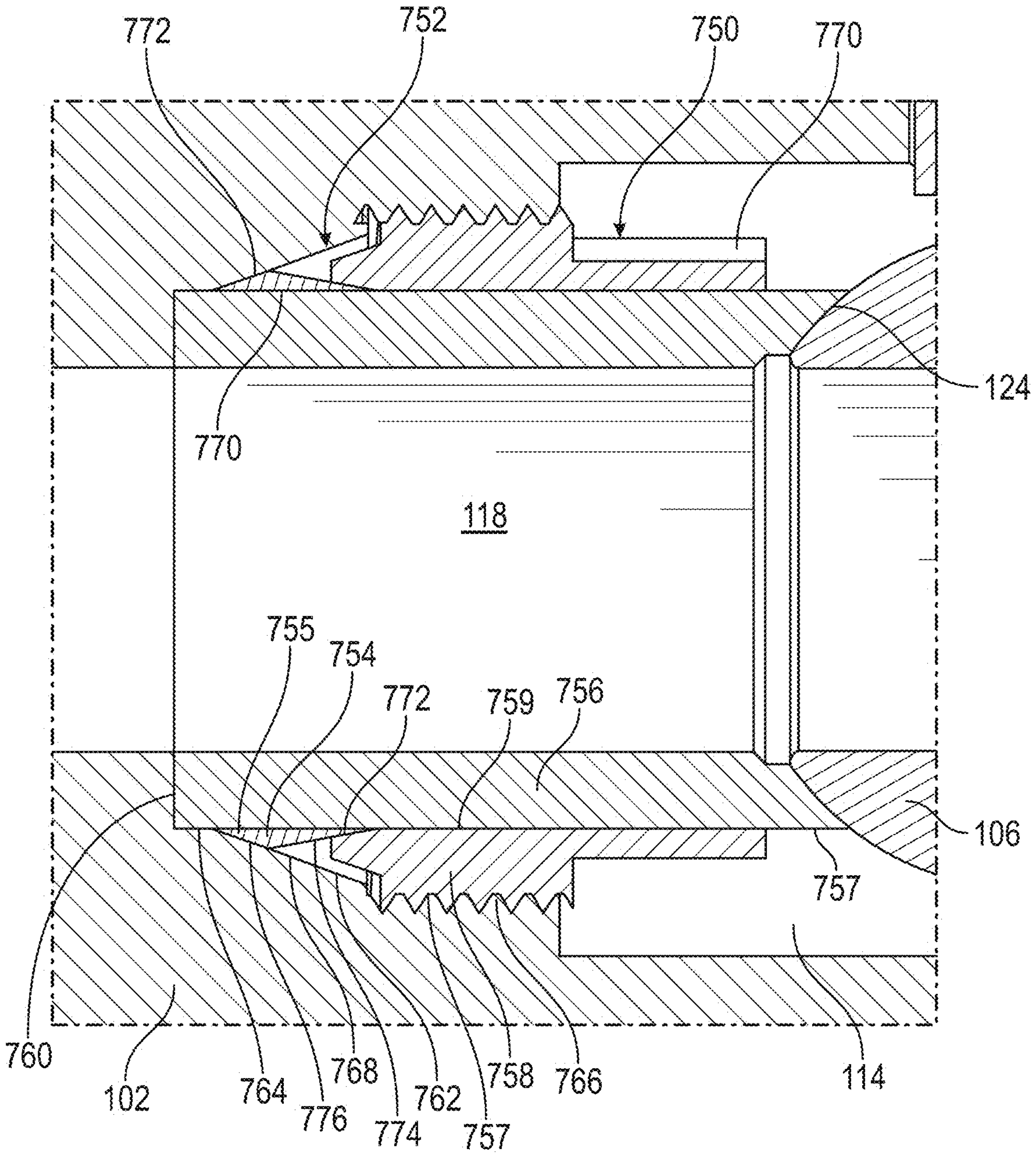
FIG. 17 is a cross-sectional detail of the downstream seat in the valve comprising a double ferrule tubing connection according to another embodiment of the invention.

FIG. 17 shows a downstream seat assembly 750 comprising a double ferrule tubing connection 752 using a replaceable angle cut gasket 754 and a threaded element 757 comprising an exteriorly threaded nut 758. The seat assembly 750 has a central tubular member 756 received in a nut 758, in the gasket 754, and shouldered against an annular surface 760 at a bottom of the entry bore 762 adjacent to outlet bore 118. The entry bore 762 has a cylindrical section 764 adjacent to the annular surface 760, a threaded section 766 to receive the nut 758, and a tapered section 768 receiving the gasket 754. The nut 758 has a 6- or 12-point hex cut profile 770 for use with a standard sized socket for installation and removal. As the nut 758 is threaded into the valve body 102, a trailing exterior tapered surface 774 of the gasket 754 is engaged by a leading interior tapered surface 772 of the nut and a leading tapered surface 776 of the gasket 754 is pressed into the tapered section 768. At the same time, an ID surface 770 of the gasket 754 is pressed into an OD surface 772 of the tubing 756, creating the seal. The downstream sealing surface 124 is formed in the inner end of the tube 756 by lapping to the flow control element 106.

Figure 18:
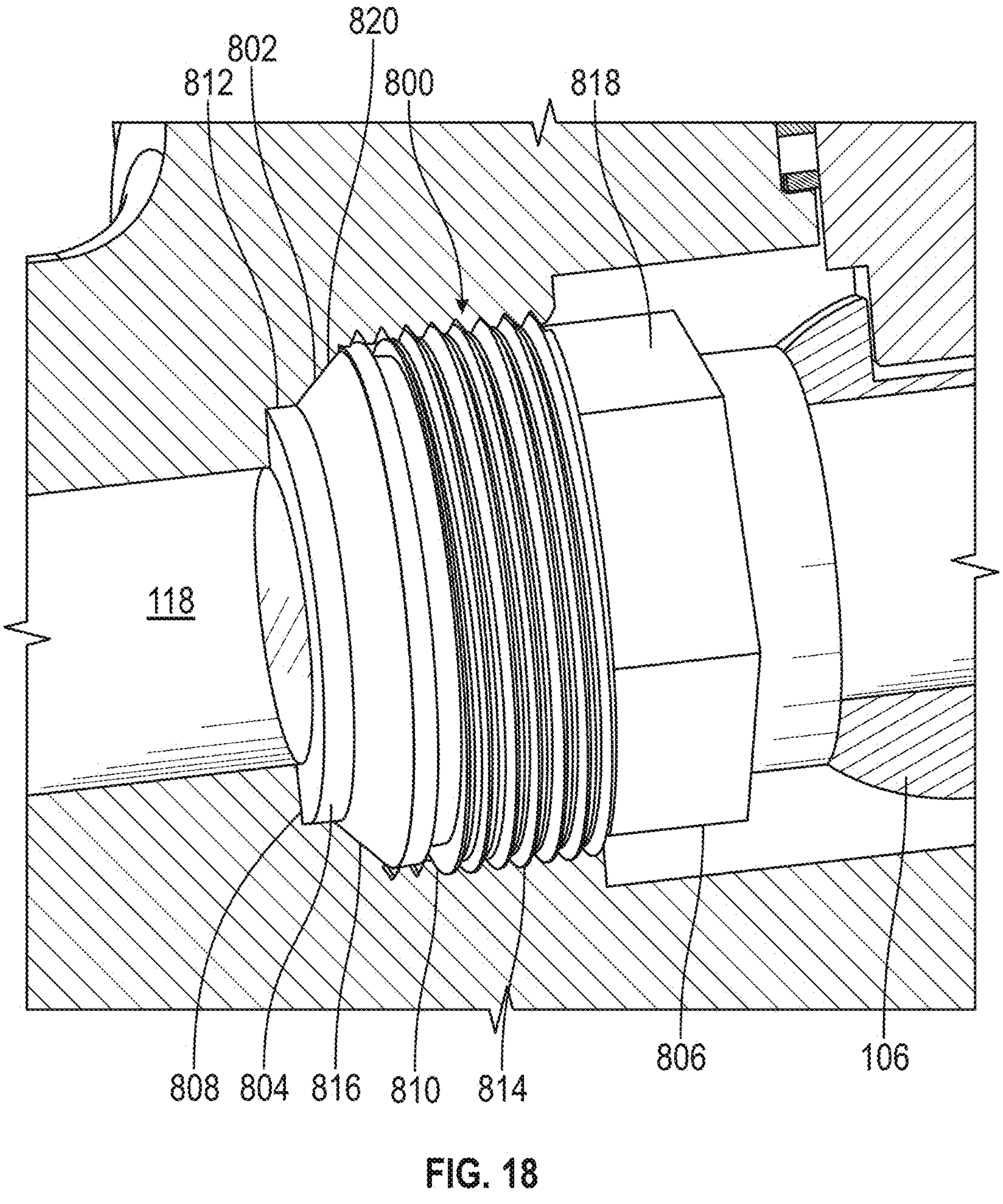
FIG. 18 is a partially cutaway view of a portion of the valve showing the downstream seat detail comprising a lip seal according to another embodiment of the invention.

FIG. 18 shows a downstream seat assembly 800 comprising a lip seal 802 having a leading tapered surface 803 and a threaded element or section 814 comprising an exteriorly threaded nut 806. The seat assembly 800 has a central tubular member 804 received in a nut 806 and shouldered against an annular surface 808 at a bottom of the entry bore 810 adjacent to outlet bore 118. The entry bore 810 has a cylindrical section 812 adjacent to the annular surface 808, a threaded section 814 to receive the nut 806, and a tapered section 816 between the portions 812, 814. The nut 806 has an external polygonal cut profile preferably a 6- or 12-point hex cut profile 818 for use with a standard sized socket for installation and removal. As the nut 806 is threaded into the valve body 102, the nut loads the lip seal 802 and squeezes it against the tubing 804, thereby sealing between the valve body 102 and the seat assembly 800. The sealing surface 124 (cf. FIG. 1) is formed in the proximal end of the tube 804 by lapping to the flow control element 106.

Figure 19:
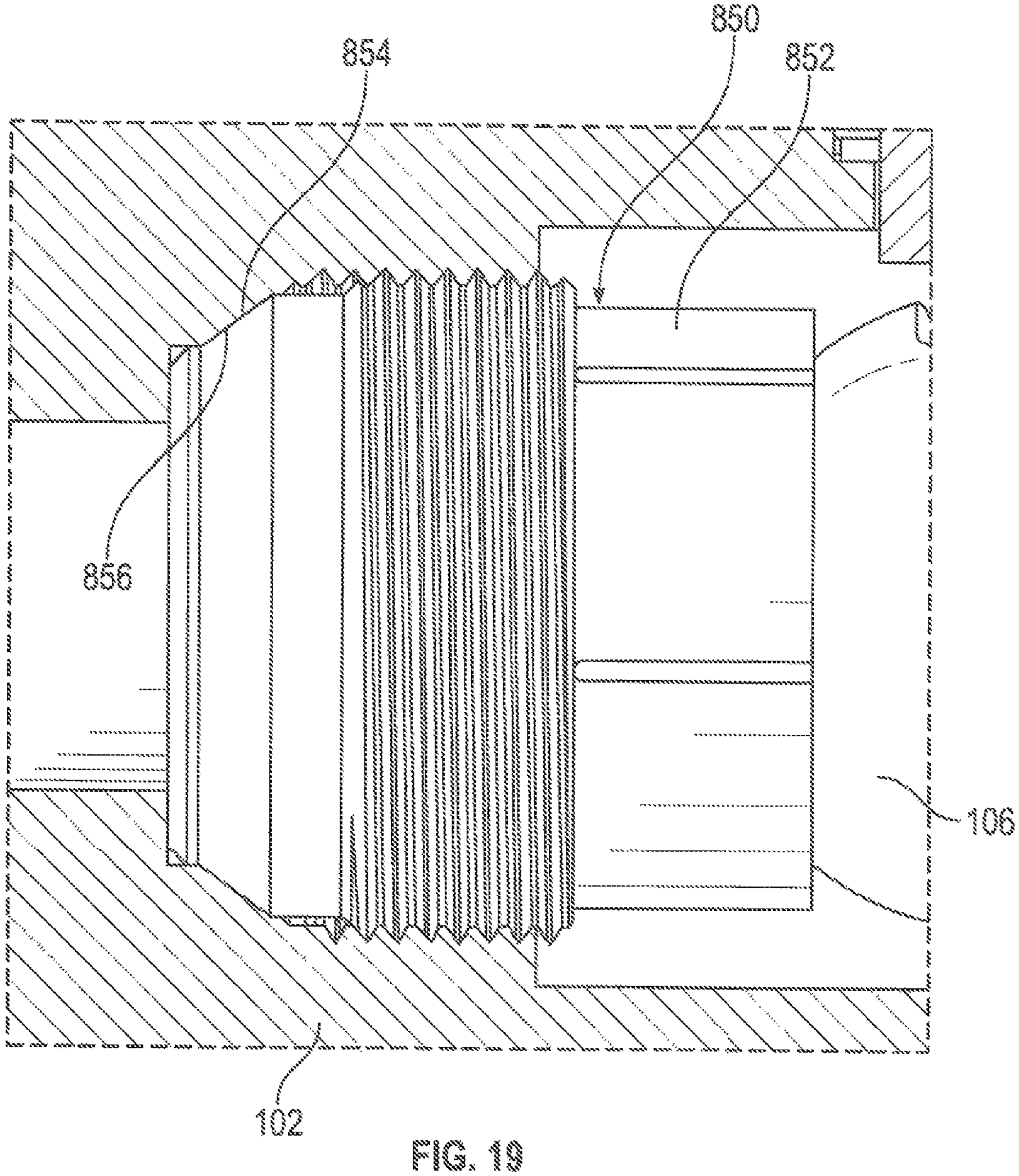
FIG. 19 is a partially cutaway view of a portion of the valve showing the downstream seat detail having a flare fitting threaded into the valve body and external hex cut according to another embodiment of the invention.

FIG. 19 shows a downstream seat 850 having a flare fitting 852 threaded into the valve body 102 and an external polygonal profile 852, such as a 6- or 12-point hex cut, for use with a standard sized socket for installation and removal. As the flare fitting 852 is threaded into the valve body 102, a metal-to-metal sealing surface 854 is pressed against taper 856, thereby sealing between the valve body 102 and the seat 850.

Figure 20:
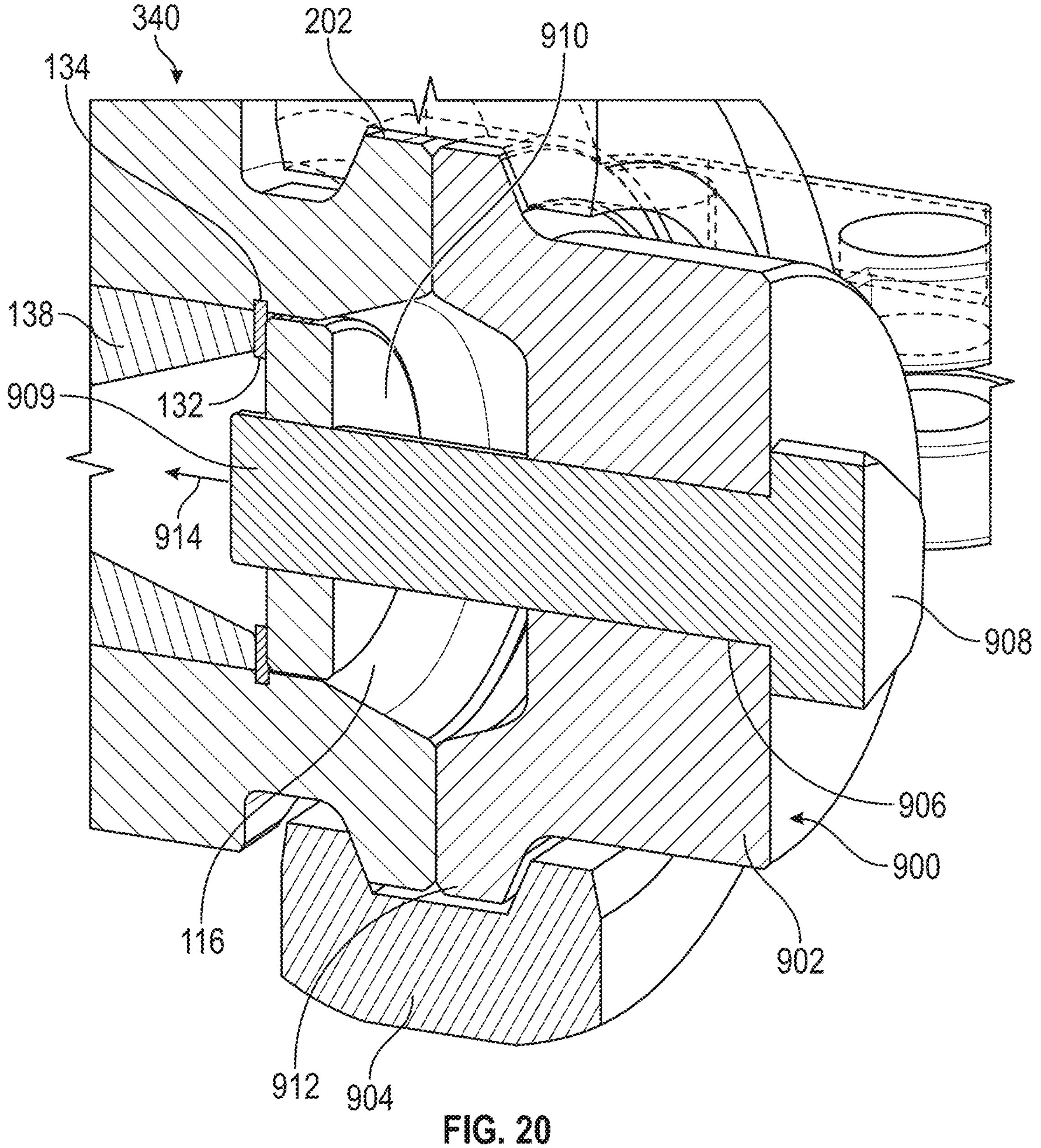
FIG. 20 is a perspective sectional view of an installation tool connected to the valve according to another embodiment of the invention.

FIG. 20 shows a preferred embodiment of an installation tool 900 that can be used for installing the cartridge assemblies 304, 353 described above, especially in field applications. The tool 900 comprises a blank hub end 902 with hub 912 that is clamped using clamp 904 to hub 202 at the inlet bore 116 of the valve 340. The hub end 902 is drilled and tapped to form an axial bore 906 to threadedly receive bolt 908. A circular flat plate 910 having an OD adjacent to an ID of the inlet bore 116 is axially fixed on a forward. As the bolt 908 is threaded into the bore 906, it drives flat plate 910 in direction 914 into the inlet to press the cartridge assembly 304, 353, any pre-loading spring 316 and snap ring 132 into place inside the valve 340, i.e., until the retaining ring 132 expands into place in groove 134.

Embodiments Listing

Accordingly, the present disclosure provides the following embodiments:

Embodiment 1. A valve (100) comprising:

a valve body (102) comprising a flow bore (104) and a stem bore (158);

a flow control element (106) rotatably disposed in the flow bore, preferably wherein the flow control element floats between a downstream seat (110) and an upstream seat (112);

a bracket (150) fixedly supported from the valve body and comprising a stem opening (162) is aligned with the stem bore;

a valve stem (108) rotatably disposed in the stem bore and comprising a first end disposed in a central bore of a shear bushing adjacent the bracket, a stem shoulder to engage the shear bushing adjacent the first end, and a second end engaging the flow control element; and a bushing profile of the shear bushing cooperating with an opening profile of the stem opening for selective retention and release of the valve stem, wherein the shear bushing is rotatable between a stem release position, wherein the bushing profile is aligned with the opening profile and the shear bushing can pass through the stem opening, and a stem retention position, wherein the bushing profile is offset with respect to the opening profile and the bracket and stem shoulder engage opposite sides of the shear bushing to retain the valve stem in the stem bore.

Embodiment 2. The valve of Embodiment 1, wherein:

the bushing profile comprises a minor outside diameter (OD), a major OD, and one or more minor OD portions along the minor OD alternated with one or more lobes extending radially from the minor OD to the major OD;

the opening profile comprises a minor inside diameter (ID) larger than the minor OD, a major ID larger than the major OD, one or more minor ID portions along the minor ID alternated with one or more major ID portions along the major ID, and one or more opening passages extending radially from the minor ID to the major ID;

preferably wherein the bushing profile and the opening profile comprise diametrically opposed pairs of the minor OD portions, the lobes, the minor ID portions, and the opening passages, wherein the lobes are smaller than the opening passages;

more preferably wherein the bushing profile and the opening profile comprise matching butterfly profiles.

Embodiment 3. The valve of Embodiment 1 or Embodiment 2, comprising a bushing retention member securing the shear bushing in the stem retention position, preferably wherein the bushing retention member is elongated to extend through a retaining bore in the bracket into or adjacent to the shear bushing (preferably a lobe of the shear bushing), more preferably wherein the elongated bushing retention member is threaded and extends into the shear bushing (preferably a lobe of the shear bushing).

Embodiment 4. The valve of any one of Embodiments 1 to 3, comprising:

a packing bore formed in the valve body coaxial with the stem bore;

one or more contiguous packing rings disposed around the valve stem in the packing bore to form a seal between the valve stem and the valve body;

a packing gland positioned around the valve stem;

a gland flange in an open access area between the bracket and the valve body secured to the valve body around the valve stem; and one or more live loading springs disposed between the gland flange and the packing gland to load the packing gland and the packing rings.

Embodiment 5. The valve of one of Embodiments 1 to 4, wherein the valve body is a single piece body, the bracket is integrally forged with the valve body, and the shear bushing is contiguous.

Embodiment 6. The valve of one of Embodiments 1 to 5, comprising:

valve trim comprising the flow control element, a downstream seat to form a seal between the valve body and the flow control element, and a spring-driven upstream seat to bias the flow control element against the downstream seat, wherein the flow control element floats between the upstream seat and the downstream seat;

wherein the valve trim is insertable into the flow bore through one end of the flow bore;

wherein the upstream seat and the flow control element are removable through the one end; and a retainer having an annular structure in the one end to secure the valve trim in the flow bore, preferably a retaining ring in a groove in the one end or a threaded member threadedly engaged in the one end.

Embodiment 7. The valve of Embodiment 6, wherein the valve trim comprises a cartridge assembly comprising the flow control element, the upstream seat, and a sleeve to hold the flow control element and the upstream seat together in relative position for insertion through an inlet bore of the flow bore into a main bore of the flow bore, wherein the sleeve is expandable to release the flow control element to float between the upstream seat and the downstream seat.

Embodiment 8. The valve of Embodiment 7, comprising:

an entry bore to an outlet bore of the flow bore;

wherein the downstream seat comprises an annular seat body having a downstream seat element to sealingly engage the flow control element and an attachment end for removably securing the annular seat body in the entry bore;

wherein the attachment end and the entry bore are threaded for threaded engagement; and wherein the annular seat body comprises internal notching for installation with a square bar inserted through the inlet bore;

preferably (A) wherein the annular seat body comprises a seat body flange between the attachment end and the downstream seat element, and comprising a gasket for compression between the seat body flange and an annular surface of the valve body adjacent the outlet bore, more preferably wherein the attachment end comprises trapezoidal screw threads; or (B) wherein the entry bore comprises a threaded section adjacent the main bore receiving a threaded portion of the attachment end, a cylindrical section adjacent an ID of the outlet bore receiving a cylindrical portion of the attachment end, and a tapered section between the threaded section and the cylindrical section engaging a tapered portion of the attachment end, more preferably wherein the attachment end and the entry bore comprise a flare fitting profile.

Embodiment 9. The valve of Embodiment 7, comprising:

an entry bore to an outlet bore of the flow bore;

wherein the downstream seat comprises an annular seat body comprising a downstream seat element to sealingly engage the flow control element and an attachment end for removably securing the annular seat body in the entry bore;

wherein the entry bore comprises a female machine tapered cone and the attachment end comprises a male machine tapered cone, wherein the attachment end is received in the entry bore in an interference fit;

preferably wherein the machine tapered cone comprises ridges to form a labyrinthine seal.

Embodiment 10. The valve of Embodiment 6, wherein the downstream seat comprises a seat land secured in an entry bore to an outlet bore of the flow bore and a seat body comprising a downstream seat element to sealingly engage the flow control element, wherein the seat land and the seat body have opposing lapped surfaces for sealing engagement, preferably wherein the seat land is press fit into the entry bore, preferably wherein the downstream seat element comprises external notches to facilitate lapping.

Embodiment 11. The valve of Embodiment 6, wherein:

the downstream seat comprises a threaded element threadedly received in an entry bore to an outlet bore of the flow bore, and an external polygonal cut profile, preferably a hex cut profile, for installation with a socket inserted through the inlet bore;

preferably wherein the entry bore comprises a threaded section adjacent the main bore receiving the threaded element, a cylindrical section adjacent an ID of the outlet bore receiving a cylindrical element of the seat body, and a tapered section between the threaded section and the cylindrical section engaging a tapered element of the downstream seat; more preferably wherein:

(A) the seat body is a single piece comprising the threaded element, the external polygonal cut profile, and the tapered element between the cylindrical element and the threaded element, preferably wherein the seat body and the entry bore comprise respective male and female flare fitting profiles; or (B) the seat body is a tubular member comprising the cylindrical element shouldered in the cylindrical section of the entry bore; wherein the threaded element comprises a nut having the external polygonal cut profile and an ID surface to receive an OD surface of the tubular member; the tapered element has an ID surface to receive the OD surface of the tubular member ahead of the nut and has a leading tapered surface; and wherein threading the nut into the threaded section of the entry bore presses the leading tapered surface into engagement with the tapered section of the of the entry bore and the ID surface of the tapered element into engagement with the OD surface of the tubular member; preferably wherein the tapered element of the downstream seat comprises (1) a lip seal, or (2) a replaceable angle cut gasket, preferably wherein the replaceable angle cut gasket has a trailing exterior tapered surface engaged by a leading interior tapered surface of the nut.

Embodiment 12. The valve of any one of Embodiments 1 to 5, comprising:

wherein the flow bore comprises a central bore and first and second end bores, wherein the central bore has an inside diameter (ID) larger than an ID of the first end bore and smaller than an ID of the second end bore;

a first seat for sealing engagement between the flow control element and the valve body adjacent the first end bore comprising a first seat body having a first sealing surface for sealingly engaging the flow control element and an attachment end releasably secured to the valve body;

a second seat comprising a second seat body having a second sealing surface for sealingly engaging the flow control element;

a seat spring to bias the second seat body against the flow control element, wherein the flow control element floats between the first seat and the second seat;

an annular plug in sealing engagement with the valve body, the annular plug having an outer end threadedly engaged in the second end bore and an inner end in engagement with the seat spring; and a seat land between the second seat body and the inner end of the annular plug for sealingly engaging the second seat body and the inner end of the plug, wherein the inner end loads the seat spring against the second seat body to sealingly engage the first element when a fluid pressure is higher in the second end bore relative to the first end bore, and wherein the seat land sealingly engages the second seat body and the inner end of the annular plug when a fluid pressure higher in the first end bore relative to the second end bore compresses the seat spring (preferably wherein the seat land has a height in excess of a solid height of the seat spring).

Embodiment 13. The valve according to any one of Embodiments 1 to 12, comprising clamping hubs formed on the valve body at inlet and outlet ends of the flow bore.

Embodiment 14. A method of inserting a valve stem in a valve, preferably the valve of any one of Embodiments 1 to 13, comprising:

installing a flow control element in a flow bore through a valve body;

inserting a first end of a valve stem into a central bore of a shear bushing;

inserting the valve stem into a stem opening through a bracket fixedly supported from the valve body;

radially aligning the shear bushing with respect to the bracket in a stem release position wherein a bushing profile of the shear bushing cooperates with an opening profile of the stem opening for axial passage of the shear bushing through the stem opening;

axially positioning the shear bushing between the bracket and a stem shoulder on the valve stem;

inserting a second end of the valve stem into a stem bore through the valve body to engage the flow control element; and rotating the shear bushing into a stem retention position wherein the bushing profile is offset from the opening profile and the bracket and a stem shoulder on the valve stem engage opposite surfaces of the shear bushing to retain the valve stem in the stem bore.

Embodiment 15. The method of inserting a valve stem in a valve of Embodiment 14, wherein the flow control element is installed in the flow bore prior to the engaging of the flow control element with the second end of the valve stem.

Embodiment 16. The method of inserting a valve stem in a valve of Embodiment 14 or Embodiment 15, comprising securing the shear bushing from rotation to retain the shear bushing in the stem retention position.

Embodiment 17. The method of inserting a valve stem in a valve of any one of Embodiments 14 to 16, comprising:

passing the second end of the valve stem through a packing gland in an open access area between the bracket and the valve body;

positioning one or more contiguous packing rings on the second end of the valve stem in a packing bore; and securing a gland flange to the valve body and positioning live loading springs between the gland flange and the packing gland to bias the packing gland against the one or more packing rings.

Embodiment 18. The method of inserting a valve stem in a valve of any one of Embodiments 14 to 17, comprising integrally forging the bracket with the valve body. forming the stem opening through the bracket, and forming the stem bore through the valve body in alignment with the stem opening.

Embodiment 19. The method of inserting a valve stem in a valve of any one of Embodiments 14 to 17, comprising removing the valve stem from the valve, comprising:

rotating the shear bushing with respect to the bracket from the stem retention position into the stem release position;

passing the shear bushing axially through the stem opening away from the valve body;

disengaging the second end of the valve stem from the flow control element; and removing the valve stem from the stem bore.

Embodiment 20. The method of inserting and removing a valve stem from a valve of Embodiment 19, comprising:

after removing the valve stem from the valve bore, inspecting, replacing, or inspecting and replacing, one or more contiguous packing rings on the second end of the valve stem;

positioning the shear bushing in the stem release position and passing the shear bushing through the stem opening toward the valve body, positioning the shear bushing between the bracket and the stem shoulder, inserting the valve stem through the stem bore, engaging the flow control element with the second end of the valve stem, and positioning the one or more packing rings in the packing bore, and rotating the shear bushing into the stem retention position.

Embodiment 21. The method of inserting and removing a valve stem from a valve of Embodiment 20, comprising:

disengaging a gland flange from the valve body, prior to removing the valve stem from the stem bore; and after inspecting, replacing, or inspecting and replacing one or more contiguous packing rings, inserting the valve stem through the stem bore and positioning the one or more packing rings in the packing bore, positioning live loading springs between the gland flange and a packing gland, and securing the gland flange to the valve body to bias the packing gland against the one or more packing rings.

Embodiment 22. A method of assembling and disassembling a valve, preferably the valve of any one of Embodiments 1 to 13, comprising:

integrally forging a valve body with a bracket supported from the valve body;

forming a flow bore through the valve body;

forming a stem opening through the bracket;

forming a stem bore in the valve body to the flow bore in alignment with the stem opening;

inserting valve trim through one end of the flow bore, wherein the valve trim comprises a flow control element, a downstream seat to form a seal between the valve body and the flow control element, and an upstream seat to bias the flow control element against the downstream seat, wherein the flow control element floats between the upstream seat and the downstream seat;

installing a retainer having an annular structure (preferably a retaining ring in a groove or a threaded member threadedly engaged in the one end);

inserting a first end of a valve stem into a central bore of a shear bushing;

inserting the valve stem into the stem opening;

radially aligning the shear bushing with respect to the bracket in a stem release position wherein a bushing profile of the shear bushing cooperates with an opening profile of the stem opening for axial passage of the shear bushing through the stem opening;

axially positioning the shear bushing between the bracket and a stem shoulder on the valve stem;

inserting a second end of the valve stem into the stem bore to engage the flow control element;

rotating the shear bushing into a stem retention position wherein the bushing profile is offset from the opening profile and the bracket and the stem shoulder engage opposite surfaces of the shear bushing to retain the valve stem in the stem bore;

engaging a bushing retention member to secure the shear bushing in the stem retention position;

turning the valve stem to rotate the flow control element between open and closed positions;

disengaging the bushing retention member;

rotating the shear busing into the stem release position;

passing the shear bushing through the stem opening away from the valve body to disengage the second end of the valve stem from the flow control element and remove the valve stem from the stem bore; and removing the retainer from the one end; and removing the upstream seat assembly and the flow control element through the one end; and preferably removing at least a portion of the downstream seat through the one end.

Embodiment 23. The method of assembling and disassembling a valve of Embodiment 22, comprising:

(A) wherein inserting the valve trim through the one end comprises inserting a cartridge assembly comprising the flow control element, the upstream seat, and a sleeve to hold the flow control element and the upstream seat together in relative position for the insertion into the flow bore, and expanding the sleeve to release the flow control element to float between the upstream seat and the downstream seat; or (B) securing a seat land in an entry bore to an outlet bore of the flow bore, disposing a downstream seat element between the flow control element and the seat land to sealingly engage the flow control element and sealingly engage opposing lapped surfaces formed on the seat land and the flow control element, preferably comprising press-fitting the seat land into the entry bore; or (C) threadedly receiving a threaded element of the downstream seat in an entry bore to an outlet bore of the flow bore, and engaging an external polygonal cut profile of the downstream seat, preferably a hex cut profile, with a socket inserted through the inlet bore to rotate the threaded element; or (D) forming a seal between with the upstream seat and the flow control element, and threadedly engaging the retainer in the one end of the flow bore.

Embodiment 24. A repairable valve assembly system, comprising components for assembly together into a repairable valve, the components comprising:

a spherical flow control element with a flow control bore therethrough;

a valve stem to engage the flow control element;

a (preferably single piece) valve body comprising a flow bore to rotatably receive the flow control element and a stem bore to rotatably receive the valve stem, the flow bore comprising a main bore, an inlet bore, and an outlet bore;

a downstream seat comprising a seat body for sealing engagement with the valve body adjacent the outlet bore (preferably in an entry bore to the outlet bore), a downstream seat element having a sealing surface to sealingly engage the flow control element, and an outwardly tapered surface adjacent the downstream seat element;

an upstream seat assembly comprising an upstream seat element to engage the flow control element, a seat spring to bias the upstream seat element, and an annular spacer following the spring;

a cartridge assembly insertable into the inlet bore comprising a sleeve supported from the annular spacer engaging the flow control element and holding the upstream seat element and the seat spring between the annular spacer and the flow control element for insertion into the flow bore;

wherein the sleeve has a leading sleeve end to engage the outwardly tapered surface to expand the sleeve and release the flow control element to float between the upstream seat element and the downstream seat element; and a retainer having an annular structure for removable attachment in the inlet bore to secure the cartridge in the flow bore and load the seat spring (preferably a retaining ring in a groove).

Embodiment 25. The repairable valve assembly system of Embodiment 24 comprising a pre-loading spring between the retainer and the annular spacer.

Embodiment 26. The repairable valve assembly system of Embodiment 24 or Embodiment 25 wherein the retainer comprises a retaining ring and the inlet bore comprises a groove to receive the retaining ring.

Embodiment 27. The repairable valve assembly system of any one of Embodiments 24 to 26 wherein the inlet bore and the main bore comprise an inside diameter (ID) larger than an outside diameter (OD) of the flow control element, wherein the annular spacer comprises an OD adjacent the ID of the inlet bore, and wherein the annular spacer comprises an ID matching an ID of the flow control bore.

Embodiment 28. The repairable valve assembly system of any one of Embodiments 24 to 27 wherein the annular spacer comprises an inwardly tapered entry section for fluid flow transition between the inlet end and an ID of the annular spacer and preferably an acutely outwardly tapered exit section, preferably wherein the seat spring comprises a spring element adjacent the annular spacer having an OD less than an OD of the annular spacer, and wherein the acutely outwardly tapered exit section of the annular spacer centers the spring element.

Embodiment 29. The repairable valve assembly system of any one of Embodiments 24 to 28, wherein the sleeve comprises a plurality of retention arms extending forward from the annular spacer to respective leading arm ends and bending inwardly to a small angle to engage the flow control element, wherein the retention arms are spread apart by engagement of the leading arm ends with the outwardly tapered surface; preferably comprising a tang on an end of the valve stem, and a tang recess in the flow control element to receive the tang, wherein the retention arms are radially spaced apart on either side of the tang recess.

Embodiment 30. The repairable valve assembly system of Embodiment 29, wherein the sleeve comprises a sleeve base engaging the annular spacer and the retention arms extend from the base.

Embodiment 31. The repairable valve assembly system of Embodiment 30, wherein the annular spacer comprises a trailing portion comprising the OD adjacent the ID of the inlet bore and a leading portion with a recessed OD, wherein the sleeve base comprises a ring engaging the leading portion and has an OD adjacent the ID of the inlet end.

Embodiment 32. The repairable valve assembly system of Embodiment 30 or Embodiment 31, wherein the sleeve is formed from rolled metal.

Embodiment 33. The repairable valve assembly system of Embodiment 30, wherein the sleeve base comprises an annular disc (312) engaging a trailing end (139) of the annular spacer.

Embodiment 34. The repairable valve assembly system of any one of Embodiments 24 to 33, comprising an entry bore to an outlet bore of the flow bore, wherein the downstream seat comprises an annular seat body having an attachment end for removably securing the annular seat body in an entry bore into the outlet bore and a downstream seat element to sealingly engage the flow control element.

Embodiment 35. The repairable valve assembly system of Embodiment 33, wherein the attachment end and the entry bore are threaded for threaded engagement and wherein the annular seat body comprises internal notching for installation with a square bar inserted through the inlet bore.

Embodiment 36. The repairable valve assembly system of Embodiment 34, wherein the annular seat body comprises a seat body flange between the attachment end and the downstream seat element, and comprising a gasket for compression between the flange and an annular surface of the valve body adjacent the outlet bore, preferably wherein the attachment end comprises trapezoidal screw threads.

Embodiment 37. The repairable valve assembly system of Embodiment 35, wherein:

the entry bore comprises:

a threaded section adjacent the main bore receiving a threaded portion of the seat body;

a cylindrical section adjacent an ID of the outlet bore receiving a cylindrical portion of the seat body, and a tapered section between the threaded section and the cylindrical section engaging a tapered portion of the seat body; and the seat body is a single piece comprising the threaded portion, the cylindrical portion, and the tapered portion, preferably wherein the seat body and the entry bore comprise respective male and female flare fitting profiles.

Embodiment 38. The repairable valve assembly system of Embodiment 33, wherein the entry bore is tapered, and wherein the attachment end of the annular seat body is tapered for forming an interference fit in the tapered entry bore, preferably wherein the attachment end comprises a machine tapered cone, more preferably wherein the machine tapered cone comprises ridges to form a labyrinthine seal in the entry bore.

Embodiment 39. The repairable valve assembly system of any one of Embodiments 24 to 38, comprising:

a bracket fixedly supported from the valve body, preferably wherein the valve body is a single piece body and the bracket is integrally forged with the valve body;

a stem opening in the bracket aligned with the stem bore;

a shear bushing with a central bore to slidably receive a first end of the valve stem, preferably wherein the shear bushing is contiguous, wherein the valve stem has a second end comprising a tang to engage the flow control element, and wherein the sleeve comprises a space to receive the tang;

wherein the shear bushing is rotatably disposable between the bracket and a stem shoulder formed on the valve stem, wherein the shear bushing has a bushing profile to cooperate with an opening profile of the stem opening for selective retention of the valve stem by the bracket or release of the shear bushing and valve stem for axial passage through the stem opening.

Embodiment 40. The repairable valve assembly system of any one of Embodiments 24 to 39, wherein the valve body comprises clamping hubs at the inlet and outlet bores.

Embodiment 41. A repairable valve assembled from the repairable valve assembly system of any one of Embodiments 24 to 40.

Embodiment 42. A repairable valve comprising:

a spherical flow control element with a flow control bore therethrough;

a valve stem engaging the flow control element;

a valve body, preferably a single piece valve body, comprising a flow bore rotatably receiving the flow control element and a stem bore rotatably receiving the valve stem, the flow bore comprising a main bore, an inlet bore, an outlet bore, and an entry bore from the main bore into the outlet bore;

a downstream seat comprising a seat land and a seat body having opposed lapped surfaces in sealing engagement between the seat land and the seat body, wherein the seat land has an attachment end sealingly received in the entry bore, wherein the seat body has a downstream seat element comprising a sealing surface sealingly engaging the flow control element;

an upstream seat assembly comprising an upstream seat element engaging the flow control element, a seat spring to bias the upstream seat element, and an annular spacer following the seat spring; and a retainer having an annular structure securing the upstream seat assembly in the flow bore and loading the seat spring, preferably wherein the retainer comprises a retaining ring disposed in a groove in the inlet bore, wherein the flow control element floats between the seat body and the upstream seat element.

Embodiment 43. The repairable valve of Embodiment 42 wherein the seat body comprises external notches to facilitate lapping.

Embodiment 44. The repairable valve of Embodiment 42 or Embodiment 43 wherein the seat land is press-fit in the entry bore.

Embodiment 45 The repairable valve of any one of Embodiments 42 to 44 wherein the retainer comprises a retaining ring disposed in a groove in the inlet bore.

Embodiment 46. The repairable valve assembly system of any one of Embodiments 42 to 45 wherein the inlet bore and the main bore comprise an inside diameter (ID) larger than an outside diameter (OD) of the flow control element, wherein the annular spacer comprises an OD adjacent the ID of the inlet bore, and wherein the annular spacer comprises an ID matching an ID of the flow control bore.

Embodiment 47. The repairable valve assembly system of Embodiment 46 wherein the annular spacer comprises an inwardly tapered entry section for fluid flow transition between the inlet end and the ID of the annular spacer and preferably an acutely outwardly tapered exit section.

Embodiment 48. The repairable valve assembly system of Embodiment 47 wherein the seat spring comprises a spring element adjacent the annular spacer having an OD less than an OD of the annular spacer, and wherein the acutely outwardly tapered exit section centers the spring element.

Embodiment 49. The repairable valve assembly system of any one of Embodiments 24 to 48, comprising:

a bracket fixedly supported from the valve body, preferably wherein the valve body is a single piece body and the bracket is integrally forged with the valve body;

a stem opening in the bracket aligned with the stem bore;

a shear bushing with a central bore to slidably receive a first end of the valve stem (preferably wherein the shear bushing is contiguous), wherein the valve stem has a second end comprising a tang to engage the flow control element;

wherein the shear bushing is rotatably disposable between the bracket and a stem shoulder formed on the valve stem, wherein the shear bushing has a bushing profile to cooperate with an opening profile of the stem opening for selective retention of the valve stem by the bracket or release of the shear bushing and valve stem for axial passage through the stem opening.

Embodiment 50. The repairable valve assembly system of Embodiment 49, wherein the valve body is a single piece body, the bracket is integrally forged with the valve body, and the shear bushing is contiguous.

Embodiment 51 The repairable valve assembly system of any one of Embodiments 24 to 50, wherein the valve body comprises clamping hubs at the inlet and outlet bores.

Embodiment 52. A repairable valve comprising:

a spherical flow control element with a flow control bore therethrough;

a valve stem engaging the flow control element;

a (preferably single piece) valve body comprising a flow bore rotatably receiving the flow control element and a stem bore rotatably receiving the valve stem, the flow bore comprising a main bore, an inlet bore, an outlet bore, and an entry bore from the main bore into the outlet bore;

a downstream seat comprising:

- a seat body having a downstream seat element comprising a sealing surface sealingly engaging the flow control element, and
- a threaded element threadedly received in the entry bore and having an external polygonal cut profile, preferably a hex cut profile, for installation with a socket inserted through the inlet bore;

an upstream seat assembly comprising an upstream seat element engaging the flow control element, a seat spring to bias the upstream seat element, and an annular spacer following the seat spring, wherein the flow control element floats between the seat body and the upstream seat element; and a retainer having an annular structure in the inlet bore securing the upstream seat assembly in the flow bore and loading the seat spring (preferably wherein the retainer comprises a retaining ring disposed in a groove in the inlet bore).

Embodiment 53. The repairable valve assembly system of Embodiment 52, wherein the entry bore comprises:

a threaded section adjacent the main bore receiving the threaded element;

a cylindrical section adjacent an ID of the outlet bore receiving a cylindrical element of the seat body, and a tapered section between the threaded section and the cylindrical section engaging a tapered element of the downstream seat.

Embodiment 54. The repairable valve assembly system of Embodiment 52 or Embodiment 53, wherein the seat body is a single piece comprising the threaded element, the external polygonal cut profile, and the tapered element between the cylindrical element and the threaded element, preferably wherein the seat body and the entry bore comprise respective male and female flare fitting profiles).

Embodiment 55. The repairable valve assembly system of Embodiment 53 or 54, wherein the seat body and the entry bore comprise respective male and female flare fitting profiles the seat body and the entry bore comprise a flare fitting profile.

Embodiment 56. The repairable valve assembly system of any one of Embodiments 52 to 55, wherein:

the seat body is a tubular member comprising the cylindrical element shouldered in the cylindrical section of the entry bore;

the threaded element comprises a nut having the external polygonal cut profile and an ID surface to receive an OD surface of the tubular member;

the tapered element has an ID surface to receive the OD surface of the tubular member ahead of the nut and has a leading tapered surface; and threading the nut into the threaded section of the entry bore presses the leading tapered surface into engagement with the tapered section of the of the entry bore and the ID surface of the tapered element into engagement with the OD surface of the tubular member (;

preferably wherein the tapered element of the downstream seat comprises (1) a replaceable angle cut gasket, more preferably wherein the replaceable angle cut gasket has a trailing exterior tapered surface engaged by a leading interior tapered surface of the nut, or (2) a lip seal.

Embodiment 57. the repairable valve assembly system of Embodiment 56 wherein the tapered element of the downstream seat comprises a replaceable angle cut gasket, preferably wherein the replaceable angle cut gasket has a trailing exterior tapered surface engaged by a leading interior tapered surface of the nut.

Embodiment 58. the repairable valve assembly system of Embodiment 56 wherein the tapered element of the downstream seat comprises a lip seal.

Embodiment 59. The repairable valve of any one of Embodiments 52 to 58 wherein the retainer comprises a retaining ring disposed in a groove in the inlet bore.

Embodiment 60. The repairable valve of any one of Embodiments 52 to 59 wherein the inlet bore and the main bore comprise an inside diameter (ID) larger than an outside diameter (OD) of the flow control element, wherein the annular spacer comprises an OD adjacent the ID of the inlet bore, and wherein the annular spacer comprises an ID matching an ID of the flow control bore.

Embodiment 61. The repairable valve of any one of Embodiments 52 to 60 wherein the annular spacer comprises an inwardly tapered entry section for fluid flow transition between the inlet end and the ID of the annular spacer and preferably an acutely outwardly tapered exit section.

Embodiment 62. The repairable valve of Embodiment 61 wherein the seat spring comprises a spring element adjacent the annular spacer having an OD less than an OD of the annular spacer, and wherein the acutely outwardly tapered exit section centers the spring element.

Embodiment 63. The repairable valve of any one of Embodiments 52 to 62, comprising:

a bracket fixedly supported from the valve body, preferably wherein the valve body is a single piece body and the bracket is integrally forged with the valve body;

a stem opening in the bracket aligned with the stem bore;

a shear bushing with a central bore to slidably receive a first end of the valve stem (preferably wherein the shear bushing is contiguous), and wherein the valve stem has a second end comprising a tang to engage the flow control element;

wherein the shear bushing is rotatably disposable between the bracket and a stem shoulder formed on the valve stem, wherein the shear bushing has a bushing profile to cooperate with an opening profile of the stem opening for selective retention of the valve stem by the bracket or release of the shear bushing and valve stem for axial passage through the stem opening.

Embodiment 64 The repairable valve of Embodiment 63, wherein the valve body is a single piece body, the bracket is integrally forged with the valve body, and the shear bushing is contiguous.

Embodiment 65. The repairable valve of any one of Embodiments 52 to 64 wherein the valve body comprises clamping hubs at the inlet and outlet bores.

Embodiment 66. A repairable, bidirectional valve (400) comprising:

a spherical flow control element (106) with a flow control bore (107) therethrough;

a single piece valve body (416) comprising a flow bore (104) rotatably receiving the flow control element (106), the flow bore comprising a central flow bore (415) and first and second end bores (417, 419), wherein the central bore has an inside diameter (ID) larger than an ID of the first end bore and smaller than an ID of the second end bore;

a first seat (418) for sealing engagement between the flow control element and the valve body adjacent the first end bore comprising a first seat body (420) having a first sealing surface (421) for scalingly engaging the flow control element and an attachment end (422) releasably secured to the valve body;

a second seat comprising a second seat body having a second sealing surface for sealingly engaging the flow control element;

a seat spring to bias the second seat body against the flow control element, wherein the flow control element floats between the first seat and the second seat;

an annular plug in sealing engagement with the valve body, the annular plug having an outer end threadedly engaged in the second end bore and an inner end in engagement with the seat spring; and a seat land between the second seat body and the inner end of the annular plug for sealingly engaging the second seat body and the inner end of the plug, wherein the inner end loads the seat spring against the second seat body to sealingly engage the first element when a fluid pressure is higher in the second end bore relative to the first end bore, and wherein the seat land sealingly engages the second seat body and the inner end of the annular plug when a fluid pressure higher in the first end bore relative to the second end bore compresses the seat spring, preferably wherein the seat land has a height in excess of a solid height of the seat spring.

Embodiment 67. The repairable, bidirectional valve of Embodiment 66 wherein the seat land is formed on the inner end of the annular plug around the seat spring.

Embodiment 68. The repairable, bidirectional valve of Embodiment 66 or 67 wherein the seat land has a height in excess of a solid height of the seat spring.

Embodiment 69. The repairable, bidirectional valve of any one of Embodiments 66 to 68 wherein the outer end of the annular plug compresses a gasket (preferably a spiral wound gasket) against the valve body (preferably against a shoulder between the second end bore and the central bore) (preferably between opposing shoulders between the second end and central bores of the flow bore and between OD's of the inner and outer ends of the annular plug).

Embodiment 70. The repairable, bidirectional valve of any one of Embodiments 66 to 69 wherein the first seat, the flow control element, and the second seat are removable through the second outlet bore.

Embodiment 71. The repairable, bidirectional valve of any one of Embodiments 66 to 70 comprising an entry bore into the first end bore receiving the attachment end of the first seat body.

Embodiment 72. The repairable, bidirectional valve of any one of Embodiments 66 to 70 wherein the attachment end of the first seat body is threadedly engaged with the valve body (preferably in an entry bore into the first end bore).

Embodiment 73. The repairable, bidirectional valve of Embodiment 72 wherein the first seat body comprises internal notching for installation with a square bar inserted into the second end bore (, preferably (A) wherein the attachment end comprises trapezoidal screw threads, wherein the first seat body comprises a flanged section (606) adjacent the attachment end and a gasket compressed between the flanged section and an annular surface of the valve body adjacent the first end bore, or (B) wherein the attachment end section and the valve body comprise a flare fitting profile).

Embodiment 74. The repairable, bidirectional valve of Embodiment 72 wherein the first seat body comprises a threaded element threadedly received in an entry bore to the first end bore and having an external polygonal cut profile, preferably a hex cut profile, for installation with a socket inserted through the second end bore.

Embodiment 75. The repairable, bidirectional valve of Embodiment 74 wherein the entry bore comprises:

a threaded section adjacent the main bore receiving the threaded element;

a cylindrical section adjacent an ID of the first end bore receiving a cylindrical element of the first seat body, and a tapered section between the threaded section and the cylindrical section engaging a tapered element of the first seat.

Embodiment 76. The repairable, bidirectional valve of Embodiment 75 wherein the first seat body is a single piece comprising the threaded element, the external polygonal cut profile, and the tapered element between the cylindrical element and the threaded element (, preferably wherein the seat body and the entry bore comprise respective male and female flare fitting profiles).

Embodiment 77. The repairable, bidirectional valve of Embodiment 75 or 76, wherein:

the seat body is a tubular member comprising the cylindrical element shouldered in the cylindrical section of the entry bore;

the threaded element comprises a nut having the external polygonal cut profile and an ID surface to receive an od surface of the tubular member;

the tapered element has an ID surface to receive the OD surface of the tubular member ahead of the nut and has a leading tapered surface; and threading the nut into the threaded section of the entry bore presses the leading tapered surface into engagement with the tapered section of the of the entry bore and the ID surface of the tapered element into engagement with the OD surface of the tubular member (:

preferably wherein the tapered element of the downstream seat comprises (1) a replaceable angle cut gasket (, more preferably wherein the replaceable angle cut gasket has a trailing exterior tapered surface engaged by a leading interior tapered surface of the nut), or (2) a lip seal).

Embodiment 78. The repairable, bidirectional valve of any one of Embodiments 66 to 77, comprising:

a bracket fixedly supported from the valve body, [preferably wherein the bracket is integrally forged with the valve body];

a stem opening in the bracket aligned with the stem bore;

a shear bushing with a central bore receiving a first end of the valve stem (preferably wherein the shear bushing is contiguous), wherein the valve stem has a second end comprising a tang to engage the flow control element;

wherein the shear bushing is rotatably disposable between the bracket and a stem shoulder formed on the valve stem, wherein the shear bushing has a bushing profile to cooperate with an opening profile of the stem opening for selective retention of the valve stem by the bracket or release of the shear bushing and valve stem for axial passage through the stem opening.

Embodiment 79. The repairable, bidirectional valve of any one of Embodiments 66 to 78 wherein the valve body comprises clamping hubs at the inlet and outlet bores.

Embodiment 80. A valve, comprising:

a valve body with an axial fluid flow bore therethrough;

a spherical flow control element disposed in the flow bore and rotatable between open and closed positions;

a bracket spaced laterally from the valve body on a support;

a valve stem having a first end engaging the flow control element for rotation thereof, the stem extending from the first end through a stem bore in the valve body to a second end adjacent to the bracket;

a shoulder formed on the stem adjacent the bracket with an enlarged outer diameter relative to a main diameter of the stem, wherein the shoulder supports a first slide bearing surface;

a shear bushing having a central bore receiving the stem, wherein the shear bushing is disposed between the stem shoulder and the bracket, wherein the shear bushing supports a second slide bearing surface opposing the first slide bearing surface, wherein the shear bushing comprises one or more minimum outside diameter portions alternated with one or more lobes;

a bore formed through the bracket, the bracket bore having one or more innermost diameter portions corresponding to the one or more minimum outside diameter portions of the shear bushing and one or more laterally extending openings corresponding to the one or more lobes of the shear bushing, wherein the outer diameter of the stem shoulder and the minimum outside diameter of the shear bushing are less than the innermost diameter of the bracket bore, wherein the one or more lobes extend radially beyond the innermost diameter of the bracket bore; and wherein the shear bushing is rotatable on the stem with respect to the bracket between an alignment position wherein the one or more lobes and minimum diameter portions of the shear bushing are radially aligned with the one or more laterally extending openings and minimum outside diameter portions of the bracket bore to pass the stem and shear bushing axially through the bracket bore, and a radially offset position wherein the one or more lobes and minimum diameter portions of the shear bushing are radially offset with respect to the one or more laterally extending openings and minimum outside diameter portions of the bracket bore wherein the shear bushing and stem are selectively retained by the bracket.

Embodiment 81. The valve of Embodiment 80, comprising diametrically opposed pairs of the minimum diameter portions of the shear bushing alternated with the lobes.

Embodiment 82. The valve of Embodiment 81, wherein the shear bushing and the bracket bore have matching butterfly profiles.

Embodiment 83. The valve of any of Embodiments 80-82, further comprising a threaded member extending through a retention bore in the bracket into at least one of the one or more lobes of the shear bushing to retain the shear bushing in the radially offset position.

Embodiment 84. The valve of any of Embodiments 80-83, wherein the bracket and support are integral with the valve body.

Embodiment 85. The valve of any of Embodiments 80-84, wherein the shear bushing is contiguous.

Embodiment 86. The valve of any of Embodiments 80-85, wherein the bracket and support define an open access area between the bracket and the valve body, and wherein the valve further comprises:

a packing bore formed in the valve body coaxial with the stem bore;

one or more packing rings disposed about the stem in the packing bore to form a seal between the stem and the valve body;

a packing gland positioned around the stem to load the packing rings;

a gland flange in the open access area secured to the valve body around the stem to load the packing gland; and preferably one or more live loading springs disposed between the gland flange and the packing gland.

Embodiment 87. The valve of Embodiment 86, wherein the packing rings are contiguous.

Embodiment 88 The valve of any of Embodiments 80-87, further comprising:

wherein the fluid flow bore comprises a main passage, an inlet end, and an outlet end, wherein the main passage has a diameter larger than a diameter of the flow control element, wherein one of the inlet end and the outlet end has an innermost diameter less than a diameter of the flow control element, and wherein the other one of the inlet end and the outlet end has an innermost diameter equal to or larger than the diameter of the main passage;

valve trim comprising a downstream seat and an upstream seat assembly, the downstream seat disposed between the outlet end and the flow control element for sealing between the flow control element and the valve body, wherein the downstream seat comprises a body seal to sealingly engage the valve body and a seat element having a sealing surface to sealingly engage the flow control element, wherein at least the downstream seat element is removable from the valve body through one end of the flow bore; and the upstream seat assembly disposed in the main passage between the inlet end and the flow control element, the upstream seat assembly comprising a spring to bias an upstream seat element against the flow control element and the flow control element against the downstream seat element, wherein the flow control element floats between the upstream and downstream seat elements; and a retainer removably attached to the valve body about the fluid flow bore and having one or more projections into the flow bore to secure the downstream seat, the flow control element, and the upstream seat assembly in the flow bore and load the spring.

Embodiment 89. The valve of Embodiment 88, wherein at least a portion of the downstream seat is secured to the valve body, and wherein the downstream seat element has a taper on an outer surface adjacent to the sealing surface, the valve trim further comprising:

a cartridge assembly comprising a sleeve around the flow control element and at least a portion of the upstream seat assembly, wherein the sleeve has a cylindrical profile with an outside diameter matching or less than the main passage diameter and comprises radially spaced arms extending axially from a base at a first end adjacent the spacer to a second end engaging the downstream seat element;

wherein the arms are bendable to a small angle with respect to a longitudinal axis to hold the flow control element and the upstream seat assembly in an installation configuration, and wherein installation of the cartridge assembly in the installation configuration through the inlet end of the flow bore causes the second ends of the arms to contact the taper, spread the arms apart, and release the flow control element to float between the upstream and downstream seat elements.

Embodiment 90. The valve of any of Embodiments 80-89, further comprising clamping hubs formed on the valve body at inlet and outlet ends of the fluid flow bore.

Embodiment 91. A method of assembling the valve of any of Embodiments 80-90, comprising the steps of:

installing the flow control element in the fluid flow passage;

installing the shear bushing on the stem to engage the shoulder;

passing the first end of the valve stem through the bracket bore and the stem bore and into engagement with the flow control element and aligning the one or more lobes of the shear bushing with the one or more laterally extending openings of the bracket bore to pass the shear bushing through the bracket bore; and positioning the one or more lobes in the radially offset position to stop the valve stem from passing back through the bracket bore.

Embodiment 92. The method of Embodiment 91, wherein the flow control element is installed in the fluid flow passage prior to the passing of the first end of the valve stem through the stem bore.

Embodiment 93. The method of Embodiment 91 or Embodiment 92, wherein the passage step comprises:

passing the first end of the valve stem through a packing gland in an open access area between the bracket and the valve body;

positioning packing rings on the first end of the valve stem in a packing bore; and securing a gland flange to the valve body to bias the packing gland against the packing rings.

Embodiment 94. A method of (preferably in-line) servicing the valve of any of Embodiments 80-90, comprising the steps of:

positioning the one or more lobes of the shear bushing into alignment with the one or more laterally extending openings in the bracket bore;

passing the one or more lobes of the shear bushing through the bracket bore to disengage the first end of the stem from the flow control element;

inspecting and/or replacing packing rings on the first end of the valve stem;

passing the one or more lobes of the shear bushing through the bracket bore and passing the first end of the valve stem through the stem bore to engage the flow control element; and positioning the one or more lobes of the shear bushing into the radially offset position.

Embodiment 95. The method of Embodiment 84, further comprising:

disengaging a gland flange from the valve body prior to passing the one or more lobes of the shear bushing through the bracket bore; and after engaging the first end of the stem with the flow control element, securing the gland flange to the valve body to bias a packing gland against the packing rings.

Embodiment 96. A valve comprising:

a valve body with an axial fluid flow bore therethrough;

a spherical flow control element disposed in the flow bore and rotatable between open and closed positions;

a valve stem having a first end in engagement with the flow control element for rotation thereof, the valve stem removably passing through a stem bore formed through the valve body;

wherein the fluid flow bore comprises a main passage, an inlet end, and an outlet end, wherein the main passage has a diameter larger than a diameter of the flow control element, wherein one of the inlet and outlet ends has an innermost diameter equal to or larger than the diameter of the main passage;

valve trim comprising a downstream seat and an upstream seat assembly, the downstream seat disposed between the outlet end and the flow control element for sealing between the flow control element and the valve body, wherein the downstream seat comprises a body seal to scalingly engage the valve body and a seat element having a sealing surface to sealingly engage the flow control element, wherein the upstream seat assembly, the flow control element, and at least the downstream seat element are removable from the valve body through one end of the flow bore; and the upstream seat assembly disposed in the main passage between the inlet end and the flow control element, the upstream seat assembly comprising a spring to bias an upstream seat element against the flow control element and the flow control element against the downstream seat element, wherein the flow control element floats between the upstream and downstream seat elements; and a retainer removably attached to the valve body about the fluid flow bore and having one or more projections into the flow bore to secure the downstream seat, the flow control element, and the upstream seat assembly in the flow bore and load the spring.

Embodiment 97. The valve of Embodiment 96, wherein the valve stem extends from the first end through the stem bore to a second end selectively retained by a bracket spaced laterally from the valve body on a support.

Embodiment 98. The valve of Embodiment 97, further comprising:

a shoulder formed on the stem adjacent the bracket with an enlarged outer diameter relative to a main diameter of the stem, wherein the shoulder supports a first slide bearing surface;

a shear bushing having a central bore receiving the stem, wherein the shear bushing is disposed between the stem shoulder and the bracket, wherein the shear bushing supports a second slide bearing surface opposing the first slide bearing surface, wherein the shear bushing comprises one or more minimum outside diameter portions alternated with one or more lobes;

a bore formed through the bracket, the bracket bore having one or more innermost diameter portions corresponding to the one or more minimum outside diameter portions of the shear bushing and one or more laterally extending openings corresponding to the one or more lobes of the shear bushing, wherein the outer diameter of the stem shoulder and the minimum outside diameter of the shear bushing are less than the innermost diameter of the bracket bore, wherein the one or more lobes extend radially beyond the innermost diameter of the bracket bore; and wherein the shear bushing is rotatable on the stem with respect to the bracket between an alignment position wherein the one or more lobes and minimum diameter portions of the shear bushing are radially aligned with the one or more laterally extending openings and minimum outside diameter portions of the bracket bore to pass the stem and shear bushing axially through the bracket bore, and a radially offset position wherein the one or more lobes and minimum diameter portions of the shear bushing are radially offset with respect to the one or more laterally extending openings and minimum outside diameter portions of the bracket bore wherein the shear bushing and stem are selectively retained by the bracket.

Embodiment 99. The valve of any of Embodiments 96-98, wherein the innermost diameter of the inlet end is larger than the innermost diameter of the outlet end, wherein the innermost diameter of the outlet end is smaller than the main flow passage, and wherein the upstream seat assembly, flow control element, and the downstream seat element are removable through the inlet end.

Embodiment 100. The valve of Embodiment 99, wherein the downstream seat comprises a sealing element to seal with the valve body Embodiment 101. The valve of Embodiment 100, wherein the downstream seat sealing element comprises a gasket.

Embodiment 102. The valve of Embodiment 100, wherein the downstream seat sealing element comprises a metal-to-metal sealing surface.

Embodiment 103. The valve of any of Embodiments 99-102, wherein at least a portion of the downstream seat is secured to the valve body.

Embodiment 104. The valve of Embodiment 103, wherein the downstream seat comprises an assembly comprising the downstream seat element and a seat land secured to the valve body, wherein the seat land and the downstream seat element are sealingly engaged and the downstream seat element is compressed between the seat land and the flow control element.

Embodiment 105. The valve of Embodiment 103 or Embodiment 104, wherein the at least a portion of the downstream seat (preferably the seat land) is press-fit into an entry bore formed in the outlet end adjacent to the main passage.

Embodiment 106. The valve of Embodiment 105, wherein the downstream seat comprises a tapered press-fit cone in a correspondingly tapered entry bore in the outlet end.

Embodiment 107. The valve of Embodiment 106, wherein the cone comprises ridges to form a labyrinthine seal Embodiment 108. The valve of Embodiment 103 or Embodiment 104, wherein the at least a portion of the downstream seat is threadedly received in an entry bore formed in the outlet end adjacent to the main passage.

Embodiment 109. The valve of Embodiment 108, wherein the downstream seat comprises trapezoidal screw threads to connect to the outlet end.

Embodiment 110. The valve of Embodiment 108, wherein the downstream seat comprises a flare fitting threaded into the valve body.

Embodiment 111. The valve of any of Embodiments 108-110, wherein the downstream seat comprises internal notching for installation with a square bar.

Embodiment 112. The valve of Embodiment 108, wherein the downstream seat comprises a double ferrule tubing connection to seal the downstream seat assembly to the valve body using a replaceable angle cut gasket.

Embodiment 113. The valve of Embodiment 108, wherein the downstream seat comprises a lip seal compressed by a threaded exterior.

Embodiment 114. The valve of any of Embodiments 108 to 113, wherein the downstream seat comprises an external hex cut profile (6 point or 12 point) for installation with a socket Embodiment 115. The valve of any of Embodiments 103 to 114, wherein the downstream seat comprises external notches.

Embodiment 116. The valve of any of Embodiments 103-115, wherein the valve is bidirectional, wherein the upstream seat element has a scaling surface to sealingly engage the flow control element, wherein the retainer comprises an annular plug having an enlarged end threadedly engaged in the inlet end, and wherein a gasket is shouldered between the enlarged end of the plug and the valve body.

Embodiment 117. The valve of any of Embodiments 103-115, wherein the upstream seat assembly further comprises a spacer between the spring and the retainer.

Embodiment 118. The valve of Embodiment 117, further comprising a pre-loading spring between the spacer and the retainer Embodiment 119. The valve of Embodiment 117 or Embodiment 118, wherein at least a portion of the downstream seat is secured to the valve body, and wherein the downstream seat element has a taper on an outer surface adjacent to the sealing surface, the valve further comprising:

a cartridge assembly comprising a sleeve around the flow control element and at least a portion of the upstream seat assembly, wherein the sleeve has a cylindrical profile with an outside diameter matching or less than the main passage diameter and comprises radially spaced arms extending axially from a base at a first end adjacent the spacer to a second end engaging the downstream seat element;

wherein the arms are bendable to a small angle with respect to a longitudinal axis to hold the flow control element and the upstream seat assembly in an installation configuration, and wherein installation of the cartridge assembly in the installation configuration through the inlet end of the flow bore causes the second ends of the arms to contact the taper, spread the arms apart, and release the flow control element to float between the upstream and downstream seat elements.

Embodiment 120. The valve of Embodiment 119, wherein the spacer comprises a distal portion having an outside diameter matching the diameter of the main passage and a proximal portion having a smaller diameter, wherein the base comprises a ring tightly fitted around the proximal portion of the spacer.

Embodiment 121. The valve of Embodiment 123, wherein the sleeve is formed from rolled metal and the arms are radially spaced apart on either side of the recess in the flow control element.

Embodiment 122. The valve of Embodiment 120, wherein the base comprises an annular disc engaging a distal end of the spacer and the arms are radially spaced apart on either side of the recess in the flow control element.

Embodiment 123. A method of assembling the valve of any of Embodiments 99 to 122, comprising the steps of:

installing the downstream seat into the main passage adjacent the outlet end for sealing engagement with the valve body;

installing the flow control element into the main passage against the downstream seat;

installing the upstream seat assembly into the main passage against the flow control element; and installing the retainer and loading the spring to bias the upstream seat element against the flow control element and the flow control element against the downstream seat element.

Embodiment 124. The method of Embodiment 123, wherein the downstream seat, the flow control element, and the upstream seat assembly are sequentially installed through the inlet end of the flow bore.

Embodiment 125. The method of Embodiment 123 or Embodiment 124, wherein installing the downstream seat comprises securing the downstream seat to the valve body adjacent the outlet end.

Embodiment 126. The method of Embodiment 125, comprising press-fitting at least a portion of the downstream seat into an entry bore in the outlet end.

Embodiment 127. The method of Embodiment 125, comprising threading at least a portion of the downstream seat into an entry bore in the outlet end.

Embodiment 128. The method of Embodiment 127, wherein the threading comprises engaging internal notches with a square bar for rotation.

Embodiment 129. The method of Embodiment 127, wherein the threading comprises engaging an external hex profile with a socket for rotation.

Embodiment 130. The method of Embodiment 127, wherein the threading comprises engaging radially spaced external notches with a tool for rotation.

Embodiment 131. The method of any of Embodiments 123 to 130, wherein the valve comprises a hub end connector on the valve body at the inlet end, and the installation of the retainer comprises clamping a tool to the inlet hub end connector, wherein the tool comprises a blind cover clamped to the inlet end with a threaded bore receiving a threaded member having a plate on one end and advancing the threaded member through the threaded bore to push the retainer with the plate into position in the inlet end.

Embodiment 132. The method of any of Embodiments 123 to 131, wherein the upstream seat assembly further comprises a spacer between the spring and the retainer, wherein at least a portion of the downstream seat is secured to the valve body, and wherein the downstream seat element has a taper on an outer surface adjacent to the sealing surface; the method further comprising:

providing a cartridge assembly comprising a sleeve around the flow control element and at least a portion of the upstream seat assembly, wherein the sleeve has a cylindrical profile with an outside diameter matching or less than the main passage diameter and comprises radially spaced arms extending axially from a base at a first end adjacent the spacer to a second end extending beyond the flow control element, wherein the arms are bent to a small angle with respect to a longitudinal axis to hold the flow control element and the upstream seat assembly in an installation configuration; and installing the cartridge assembly in the installation configuration through the inlet end of the flow bore to cause the second ends of the arms to contact the taper, spread the arms apart, and release the flow control element to float between the upstream and downstream seat elements.

Embodiment 133. A method of servicing the valve of any of Embodiments 99 to 122, comprising the steps of:

removing the retainer;

removing the upstream seat assembly from the main passage;

removing the flow control element from the main passage; and removing at least a seat element of the downstream seat from the main passage.

Embodiment 134. The method of Embodiment 133, wherein the upstream seat assembly, the flow control element, and the downstream seat are sequentially removed through the inlet end of the flow bore.

Embodiment 135. The method of Embodiment 133 or Embodiment 134, wherein removing at least the downstream seat element comprises removing the downstream seat.

Embodiment 136. The method of Embodiment 133 or Embodiment 134, wherein removing at least the downstream seat element comprises removing the downstream seat element separately from a portion of the downstream seat secured to the valve body.

Embodiment 137. The method of Embodiment 136, wherein removing at least the downstream seat element further comprises unscrewing the secured portion of the downstream seat from an entry bore in the outlet end.

Embodiment 138. The method of Embodiment 137, wherein the unscrewing comprises engaging internal notches with a square bar for rotation.

Embodiment 139 The method of Embodiment 137, wherein the unscrewing comprises engaging an external hex profile (6 point or 12 point, e.g.) with a socket for rotation.

Embodiment 140. The method of Embodiment 137, wherein the unscrewing comprises engaging radially spaced external notches with a tool for rotation.

Embodiment 141. The method of Embodiment 136, wherein removing at least the downstream seat element further comprises hammering at least a press-fit portion of the downstream seat from an entry bore in the outlet end.

Embodiment 142. A repairable valve assembly system, comprising components adapted to be assembled together into a repairable valve, the components comprising:

a valve body with an axial fluid flow bore therethrough, wherein the fluid flow bore comprises a main passage, an inlet end, and an outlet end;

a downstream seat adapted to be inserted into the main passage through the inlet end and at least a portion of the downstream seat sealingly secured to the valve body adjacent the outlet end, wherein the downstream seat comprises a seat element having a sealing surface to sealingly engage a flow control element and a tapered outer surface adjacent the sealing surface, wherein at least the downstream seat element is removable from the valve body through the inlet end;

a cartridge assembly adapted to be inserted into the main passage through the inlet end, the cartridge assembly comprising:

the flow control element, wherein the flow control element has a diameter less than the diameter of the main passage;

an upstream seat assembly comprising an upstream seat element having a surface to engage the flow control element, an annular spacer having an outside diameter larger than the flow control element, and a spring disposed between the spacer and the upstream seat element; and a sleeve receiving the flow control element and at least a portion of the spacer, wherein the sleeve comprises radially spaced arms extending axially from a base at a first end adjacent the spacer to a second end extending beyond the flow control element;

wherein the arms are positioned at a small angle with respect to a longitudinal axis to hold the flow control element in engagement with the upstream seat element, the upstream seat element in engagement with the spring, and the spring in engagement with the spacer in an installation configuration, and wherein installation of the cartridge assembly in the installation configuration through the inlet end of the flow bore causes the second ends of the arms to contact the taper, spread the arms apart, and release the flow control element to float between the upstream and downstream seat elements; and a retainer adapted to be removably attached to the valve body about the fluid flow bore and having one or more projections into the flow bore to secure the downstream seat, the flow control element, and the upstream seat assembly in the flow bore and load the spring.

Embodiment 143. The repairable valve assembly system of Embodiment 142, wherein the spacer comprises a distal portion having an outside diameter matching the diameter of the main passage and a proximal portion having a smaller diameter, wherein the base comprises a ring tightly fitted around the proximal portion of the spacer.

Embodiment 144. The repairable valve assembly system of Embodiment 143, wherein the sleeve is formed from rolled metal and the arms are radially spaced apart on either side of the recess in the flow control element.

Embodiment 145. The repairable valve assembly system of Embodiment 142, wherein the base comprises an annular disc engaging a distal end of the spacer and the arms are radially spaced apart on either side of the recess in the flow control element.

Embodiment 146. The repairable valve assembly system of any of Embodiments 142 to 145, wherein the downstream seat comprises an assembly comprising the downstream seat element and a seat land adapted to be secured to the valve body, wherein the seat land and the downstream seat element are adapted for sealing engagement and compression of the downstream seat element between the seat land and the flow control element.

Embodiment 147. The repairable valve assembly system of Embodiment 146, comprising an entry bore formed in the outlet end of the valve body adjacent to the main passage, wherein the seat land is adapted to be press-fit into the entry bore.

Embodiment 148. The repairable valve assembly system of any of Embodiments 142 to 145, comprising a tapered entry bore formed in the outlet end of the valve body adjacent to the main passage, wherein the downstream seat comprises a correspondingly tapered cone adapted to be press-fit in the entry bore.

Embodiment 149. The repairable valve assembly system of Embodiment 148, wherein the cone comprises ridges adapted to form a labyrinthine seal.

Embodiment 150. The repairable valve assembly system of any of Embodiments 142 to 145, comprising a threaded entry bore formed in the outlet end of the valve body adjacent to the main passage, wherein at least a portion of the downstream seat is adapted to be threadedly received in the entry bore.

Embodiment 151. The repairable valve assembly system of Embodiment 150, wherein the downstream seat comprises trapezoidal screw threads.

Embodiment 152. The repairable valve assembly system of Embodiment 151, wherein the downstream seat comprises a flare fitting adapted to be threaded into the entry bore.

Embodiment 153. The repairable valve assembly system of any of Embodiments 150 to 152, wherein the downstream seat comprises internal notching for installation with a square bar.

Embodiment 154. The repairable valve assembly system of any of Embodiments 142 to 153, further comprising:

a valve stem having a first end adapted to engage the flow control element for rotation thereof, the stem adapted to extend from the first end through a stem bore in the valve body to a second end away from the valve body;

wherein the valve stem is selectively retainable in or removable from the stem bore.

Embodiment 155. The repairable valve assembly system of Embodiment 154, wherein the valve stem is selectively retainable by a bracket spaced laterally from the valve body on a support.

Embodiment 156. The repairable valve assembly system of Embodiment 155, wherein the bracket is preferably integral with the valve body; wherein the repairable valve assembly system further comprises:

a shoulder formed on the stem adjacent the bracket with an enlarged outer diameter relative to a main diameter of the stem, wherein the shoulder supports a first slide bearing surface;

a shear bushing having a central bore receiving the stem, wherein the shear bushing is adapted to be disposed between the stem shoulder and the bracket, wherein the shear bushing supports a second slide bearing surface opposing the first slide bearing surface, wherein the shear bushing comprises one or more minimum outside diameter portions alternated with one or more lobes;

a bore formed through the bracket, the bracket bore having one or more innermost diameter portions corresponding to the one or more minimum outside diameter portions of the shear bushing and one or more laterally extending openings corresponding to the one or more lobes of the shear bushing, wherein the outer diameter of the stem shoulder and the minimum outside diameter of the shear bushing are less than the innermost diameter of the bracket bore, wherein the one or more lobes extend radially beyond the innermost diameter of the bracket bore; and wherein the shear bushing is rotatable on the stem with respect to the bracket between an alignment position wherein the one or more lobes and minimum diameter portions of the shear bushing are radially aligned with the one or more laterally extending openings and minimum outside diameter portions of the bracket bore adapted to pass the stem and shear bushing axially through the bracket bore, and a radially offset position wherein the one or more lobes and minimum diameter portions of the shear bushing are radially offset with respect to the one or more laterally extending openings and minimum outside diameter portions of the bracket bore wherein the shear bushing and stem are adapted to be selectively retained by the bracket.

Embodiment 157. The repairable valve assembly system of Embodiment 156, comprising diametrically opposed pairs of the minimum diameter portions and the lobes of the shear bushing, preferably wherein the shear bushing and the bracket bore have a butterfly profile.

Embodiment 158. The repairable valve assembly system of Embodiment 156 or Embodiment 157, further comprising a threaded member adapted to extend through a retention bore in the bracket into at least one of the one or more lobes of the shear bushing to retain the shear bushing in the radially offset position.

Embodiment 159. The repairable valve assembly system of any of Embodiments 156 to 158, wherein the bracket and support define an open access area between the bracket and the valve body, and wherein the system further comprises:

a packing bore formed in the valve body coaxial with the stem bore;

one or more packing rings adapted to be disposed about the stem in the packing bore to form a seal between the stem and the valve body;

a packing gland adapted to be positioned around the stem to load the packing rings;

a gland flange in the open access area adapted to be secured to the valve body around the stern to load the packing gland; and preferably one or more live loading springs adapted to be disposed between the gland flange and the packing gland.

Embodiment 160. The repairable valve assembly system of Embodiment 159, wherein the shear bushing and the packing rings are contiguous.

Embodiment 161. The repairable valve assembly system of any of Embodiments 142 to 162, wherein the valve body comprises clamping hubs at the inlet and outlet ends of the fluid flow bore.

Embodiment 162. A method of assembling a repairable valve from the components of the system of Embodiment 142, comprising the steps of.

installing the downstream seat through the inlet end and securing at least a portion of the downstream seat in sealing engagement with the valve body;

inserting the cartridge assembly through the inlet end and into the main passage until the arms contact the taper of the downstream seat element;

advancing the cartridge assembly to spread the arms apart and release the flow control element and the upstream seat element; and installing the retainer through the inlet end to load the spring and bias the upstream seat element against the flow control element and the flow control element against the downstream seat element.

Embodiment 163. The method of Embodiment 162, wherein the spacer comprises a distal portion having an outside diameter matching the diameter of the main passage and a proximal portion having a smaller diameter, wherein the base comprises a ring, and further comprising tightly fitting the ring around the proximal portion of the spacer.

Embodiment 164. The method of Embodiment 163, wherein the sleeve is formed from rolled metal and the arms are radially spaced apart on either side of the recess in the flow control element.

Embodiment 165. The method of Embodiment 162, wherein the base comprises an annular disc, and further comprising engaging a distal end of the spacer with the annular disc, and radially spacing the arms apart on either side of the recess in the flow control element.

Embodiment 166. The method of any of Embodiments 162 to 165, wherein the downstream seat comprises an assembly comprising the downstream seat element and a seat land, and further comprising securing the seat land to the valve body, sealingly engaging the seat land and the downstream seat element and compressing the downstream seat element between the seat land and the flow control element.

Embodiment 167. The method of Embodiment 166, further comprising forming an entry bore in the outlet end of the valve body adjacent to the main passage, and press-fitting the seat land into the entry bore.

Embodiment 168. The method of any of Embodiments 162-165, further comprising forming a tapered entry bore in the outlet end of the valve body adjacent to the main passage, wherein the downstream seat comprises a correspondingly tapered cone adapted to be press-fit in the entry bore.

Embodiment 169. The method of Embodiment 168, wherein the cone comprises ridges and further comprising forming a labyrinthine seal.

Embodiment 170. The method of any of Embodiments 162 to 165, further comprising forming a threaded entry bore in the outlet end of the valve body adjacent to the main passage, and threadedly receiving at least a portion of the downstream seat in the entry bore.

Embodiment 171. The method of Embodiment 170, wherein the downstream seat comprises trapezoidal screw threads.

Embodiment 172. The method of Embodiment 171, wherein the downstream seat comprises a flare fitting and further comprising threading the flare fitting into the entry bore.

Embodiment 173. The method of any of Embodiments 170 to 172, wherein the downstream seat comprises internal notching, and further comprising installing the downstream seat with a square bar.

Embodiment 174. The method of any of Embodiments 162 to 173, wherein the valve further comprises a valve stem having first and second ends, further comprising forming a stem bore through the valve body, engaging the flow control element with the first end of the valve stem for rotation of the flow control element, extending the valve stem from the first end through the stem bore to a second end away from the valve body, and selectively retaining or removing the valve stem in or from the stem bore.

Embodiment 175. The method of Embodiment 174, wherein the valve stem is selectively retainable by a bracket spaced laterally from the valve body on a support.

Embodiment 176. The method of Embodiment 175, wherein the bracket is preferably integral with the valve body; and further comprising:

forming a shoulder on the stem adjacent the bracket with an enlarged outer diameter relative to a main diameter of the stem;

supporting a first slide bearing surface on the shoulder;

receiving the stem in a central bore of a shear bushing;

disposing the shear bushing between the stem shoulder and the bracket;

supporting a second slide bearing surface on the shear bushing opposing the first slide bearing surface;

alternating one or more minimum outside diameter portions of the shear bushing with one or more lobes;

forming a bore through the bracket, wherein the bracket bore has one or more innermost diameter portions corresponding to the one or more minimum outside diameter portions of the shear bushing and one or more laterally extending openings corresponding to the one or more lobes of the shear bushing, wherein the outer diameter of the stem shoulder and the minimum outside diameter of the shear bushing are less than the innermost diameter of the bracket bore, wherein the one or more lobes extend radially beyond the innermost diameter of the bracket bore;

rotating the shear bushing on the stem with respect to the bracket to an alignment position wherein the one or more lobes and minimum diameter portions of the shear bushing are radially aligned with the one or more laterally extending openings and minimum outside diameter portions of the bracket bore and passing the stem and shear bushing axially through the bracket bore; and rotating the shear bushing on the stem with respect to the bracket to a radially offset position wherein the one or more lobes and minimum diameter portions of the shear bushing are radially offset with respect to the one or more laterally extending openings and minimum outside diameter portions of the bracket bore and retaining the shear bushing and stem with the bracket.

Embodiment 177. The method of Embodiment 176, wherein the valve comprises diametrically opposed pairs of the minimum diameter portions and the lobes of the shear bushing, preferably wherein the shear bushing and the bracket bore have a butterfly profile, Embodiment 178 The method of Embodiment 176 or Embodiment 177, further comprising extending a threaded member through a retention bore in the bracket into at least one of the one or more lobes of the shear bushing to retain the shear bushing in the radially offset position.

Embodiment 179. The method of any of Embodiments 176 to 178, wherein the bracket and support define an open access area between the bracket and the valve body, and further comprising:

forming a packing bore in the valve body coaxial with the stem bore;

disposing one or more packing rings about the stem in the packing bore to form a seal between the stem and the valve body;

positioning a packing gland around the stem to load the packing rings;

securing a gland flange in the open access area to the valve body around the stem to load the packing gland; and preferably disposing one or more live loading springs between the gland flange and the packing gland Embodiment 180. The method of Embodiment 179, wherein the shear bushing and the packing rings are contiguous.

Embodiment 181. The method of any of Embodiments 162 to 180, wherein the valve body comprises clamping hubs at the inlet and outlet ends of the fluid flow bore.

Embodiment 182. The method of any of Embodiments 162 to 181, further comprising disassembling the repairable valve, comprising the steps of:

removing the retainer through the inlet end;

removing the sleeve, spacer, upstream seat element and flow control element through the inlet end; and removing the downstream seat element through the inlet end.

Embodiment 183. A bidirectional valve comprising:

a valve body with an axial fluid flow bore therethrough;

a spherical flow control element disposed in the flow bore and rotatable between open and closed positions;

a bracket spaced laterally from the valve body on a support;

a valve stem having a first end engaging the flow control element for rotation thereof, the stem extending from the first end through a stem bore in the valve body to a second end adjacent to the bracket;

a shoulder formed on the stem adjacent the bracket with an enlarged outer diameter relative to a main diameter of the stem, wherein the shoulder supports a first slide bearing surface;

a shear bushing having a central bore receiving the stem, wherein the shear bushing is disposed between the stem shoulder and the bracket, wherein the shear bushing supports a second slide bearing surface opposing the first slide bearing surface, wherein the shear bushing comprises one or more minimum outside diameter portions alternated with one or more lobes;

a bore formed through the bracket, the bracket bore having one or more innermost diameter portions corresponding to the one or more minimum outside diameter portions of the shear bushing and one or more laterally extending openings corresponding to the one or more lobes of the shear bushing, wherein the outer diameter of the stem shoulder and the minimum outside diameter of the shear bushing are less than the innermost diameter of the bracket bore, wherein the one or more lobes extend radially beyond the innermost diameter of the bracket bore; and wherein the shear bushing is rotatable on the stem with respect to the bracket between an alignment position wherein the one or more lobes and minimum diameter portions of the shear bushing are radially aligned with the one or more laterally extending openings and minimum outside diameter portions of the bracket bore to pass the stem and shear bushing axially through the bracket bore, and a radially offset position wherein the one or more lobes and minimum diameter portions of the shear bushing are radially offset with respect to the one or more laterally extending openings and minimum outside diameter portions of the bracket bore wherein the shear bushing and stem are selectively retained by the bracket;

wherein the fluid flow bore comprises a main passage, an inlet end, and an outlet end, wherein the main passage has a diameter larger than a diameter of the flow control element, wherein the inlet end has an innermost diameter equal to or larger than the diameter of the main passage, wherein the innermost diameter of the inlet end is larger than the innermost diameter of the outlet end, wherein the innermost diameter of the outlet end is smaller than the main flow passage, and wherein the upstream seat assembly, flow control element, and the downstream seat element are removable through the inlet end;

valve trim comprising a downstream seat and an upstream seat assembly, the downstream seat disposed between the outlet end and the flow control element for sealing between the flow control element and the valve body, wherein the downstream seat comprises a body seal to sealingly engage the valve body and a seat element having a sealing surface to scalingly engage the flow control element, wherein the upstream seat assembly, the flow control element, and at least the downstream seat element are removable from the valve body through one end of the flow bore, wherein at least a portion of the downstream seat is secured to the valve body; and the upstream seat assembly disposed in the main passage between the inlet end and the flow control element, the upstream seat assembly comprising a spring to bias an upstream seat element against the flow control element and the flow control element against the downstream seat element, wherein the flow control element floats between the upstream and downstream seat elements; and a retainer removably attached to the valve body about the fluid flow bore and having one or more projections into the flow bore to secure the downstream seat, the flow control element, and the upstream seat assembly in the flow bore and load the spring;

wherein the upstream seat element has a sealing surface to sealingly engage the flow control element, wherein the retainer comprises an annular plug having an enlarged end threadedly engaged in the inlet end, and wherein a gasket is shouldered between the enlarged end of the plug and the valve body.

The invention is described above in reference to specific examples and embodiments. The metes and bounds of the invention are not to be limited by the foregoing disclosure, which is illustrative only, but should be determined in accordance with the full scope and spirit of the appended claims. Various modifications will be apparent to those skilled in the art in view of the description and examples. It is intended that all such variations within the scope and spirit of the appended claims be embraced thereby.

We claim:

1. A valve (100) comprising:

a valve body (102) comprising a flow bore (104) and a stem bore (158);

a flow control element (106) rotatably disposed in the flow bore;

a bracket (150) fixedly supported from the valve body and comprising a stem opening (162) aligned with the stem bore;

a valve stem (108) rotatably disposed in the stem bore and comprising a first end (160) disposed in a central bore (193) of a shear bushing (186) adjacent the bracket, a stem shoulder (182) to engage the shear bushing adjacent the first end, and a second end (156) engaging the flow control element; and a bushing profile (187) of the shear bushing cooperating with an opening profile (163) of the stem opening for selective retention and release of the valve stem, wherein the shear bushing is rotatable between a stem release position (165), wherein the bushing profile is aligned with the opening profile and the shear bushing can pass through the stem opening, and a stem retention position (167), wherein the bushing profile is offset with respect to the opening profile and the bracket and stem shoulder engage opposite sides of the shear bushing to retain the valve stem in the stem bore.

2. The valve of claim 1, wherein:

the bushing profile comprises a minor outside diameter (OD) (190*a*), a major OD (192*a*), and one or more minor OD portions (190) along the minor OD alternated with one or more lobes (192) extending radially from the minor OD to the major OD;

the opening profile comprises a minor inside diameter (ID) (194*a*) larger than the minor OD, a major ID (194*b*) larger than the major OD, one or more minor ID portions (195*a*) along the minor ID alternated with one or more major ID portions (195*b*) along the major ID, and one or more opening passages (194) extending radially from the minor ID to the major ID.

3. The valve of claim 1, comprising a bushing retention member (196) securing the shear bushing in the stem retention position.

4. The valve of claim 1, comprising:

a packing bore (170) formed in the valve body coaxial with the stem bore;

one or more contiguous packing rings (168) disposed around the valve stem in the packing bore to form a seal between the valve stem and the valve body;

a packing gland (166) positioned around the valve stem;

a gland flange (174) in an open access area (154) between the bracket and the valve body secured to the valve body around the valve stem; and one or more live loading springs (180, 180A, 180B) disposed between the gland flange and the packing gland to load the packing gland and the packing rings.

5. The valve of claim 1, wherein the valve body is a single piece body, the bracket is integrally forged with the valve body, and the shear bushing is contiguous.

6. The valve of claim 5, comprising:

valve trim (117) comprising the flow control element, a downstream seat (110) to form a seal between the valve body and the flow control element, and an upstream seat (112) that is spring-driven to bias the flow control element against the downstream seat, wherein the flow control element floats between the upstream seat and the downstream seat;

wherein the valve trim is insertable into the flow bore through one end of the flow bore:

wherein the upstream seat and the flow control element are removable through the one end; and a retainer (132) having an annular structure in the one end to secure the valve trim in the flow bore.

7. The valve of claim 6, wherein the valve trim comprises a cartridge assembly (304, 353, 368, 612) comprising the flow control element, the upstream seat, and a sleeve (306, 352) to hold the flow control element and the upstream seat together in relative position for insertion through an inlet bore (116) of the flow bore into a main bore (118) of the flow bore, wherein the sleeve is expandable to release the flow control element to float between the upstream seat and the downstream seat.

8. The valve of claim 7, comprising:

an entry bore (128) to an outlet bore (118) of the flow bore;

wherein the downstream seat comprises an annular seat body (600, 650) having a downstream sealing surface (124) to sealingly engage the flow control element and an attachment end (601, 653) for removably securing the annular seat body in the entry bore;

wherein the attachment end and the entry bore are threaded for threaded engagement; and wherein the annular seat body comprises internal notching (660) for installation with a square bar inserted through the inlet bore.

9. The valve of claim 7, comprising:

an entry bore (384) to an outlet bore (118) of the flow bore;

wherein the downstream seat comprises an annular seat body (380, 550) comprising a downstream sealing surface (124) to sealingly engage the flow control element and an attachment end (381) for removably securing the annular seat body in the entry bore;

wherein the entry bore comprises a female machine tapered cone (384A) and the attachment end comprises a male machine tapered cone (385, 554), wherein the attachment end is received in the entry bore in an interference fit.

10. The valve of claim 6, wherein the downstream seat comprises a downstream seat land (702) secured in an entry bore (704) to an outlet bore of the flow bore and a seat body comprising a downstream seat element to sealingly engage the flow control element, wherein the seat land and the seat body have opposing lapped surfaces for sealing engagement.

11. The valve of claim 6, wherein:

the downstream seat comprises a threaded element (425A, 757, 814) threadedly received in an entry bore (423, 762, 810) to an outlet bore (114) of the flow bore, and an external polygonal cut profile (428, 770, 818) for installation with a socket inserted through the inlet bore.

12. The valve of claim 5, comprising:

wherein the flow bore comprises a central bore (415) and first and second end bores (417, 412), wherein the central bore has an inside diameter (ID) larger than an ID of the first end bore and smaller than an ID of the second end bore;

a first seat (418) for sealing engagement between the flow control element and the valve body adjacent the first end bore comprising a first seat body (420) having a first sealing surface (421) for sealingly engaging the flow control element and an attachment end (422) releasably secured to the valve body;

a second seat (402) comprising a second seat body (404) having a second sealing surface (405) for sealingly engaging the flow control element;

a seat spring (406) to bias the second seat body against the flow control element, wherein the flow control element floats between the first seat and the second seat;

an annular plug (408) in sealing engagement with the valve body, the annular plug having an outer end (410) threadedly engaged in the second end bore and an inner end (411) in engagement with the seat spring; and an upstream seat land (430) between the second seat body and the inner end of the annular plug for sealingly engaging the second seat body and the inner end of the plug, wherein the inner end loads the seat spring against the second seat body to sealingly engage the flow control element when a fluid pressure is higher in the second end bore relative to the first end bore, and wherein the upstream seat land sealingly engages the second seat body and the inner end of the annular plug when a fluid pressure higher in the first end bore relative to the second end bore compresses the seat spring.

13. The valve of claim 1, comprising clamping hubs (202, 204) formed on the valve body at inlet and outlet ends (116, 118) of the flow bore.

14. A method of inserting a valve stem in a valve, comprising:

installing a flow control element in a flow bore through a valve body;

inserting a first end of a valve stem into a central bore of a shear bushing;

inserting the valve stem into a stem opening through a bracket fixedly supported from the valve body;

radially aligning the shear bushing with respect to the bracket in a stem release position wherein a bushing profile of the shear bushing cooperates with an opening profile of the stem opening for axial passage of the shear bushing through the stem opening;

axially positioning the shear bushing between the bracket and a stem shoulder on the valve stem;

inserting a second end of the valve stem into a stem bore through the valve body to engage the flow control element; and rotating the shear bushing into a stem retention position wherein the bushing profile is offset from the opening profile and the bracket and a stem shoulder on the valve stem engage opposite surfaces of the shear bushing to retain the valve stem in the stem bore.

15. The method of claim 14, wherein the flow control element is installed in the flow bore prior to the engaging of the flow control element with the second end of the valve stem.

16. The method of claim 14, comprising securing the shear bushing from rotation to retain the shear bushing in the stem retention position.

17. The method of claim 16, comprising:

passing the second end of the valve stem through a packing gland in an open access area between the bracket and the valve body;

positioning one or more contiguous packing rings on the second end of the valve stem in a packing bore; and securing a gland flange to the valve body and positioning live loading springs between the gland flange and the packing gland to bias the packing gland against the one or more packing rings.

18. The method of claim 14 wherein the bracket is integrally forged with the valve body, and wherein the stem opening through the bracket and the stem bore through the valve body are formed in alignment with the stem opening.

19. The method of claim 14, comprising removing the valve stem from the valve, comprising:

rotating the shear bushing with respect to the bracket from the stem retention position into the stem release position;

passing the shear bushing axially through the stem opening away from the valve body;

disengaging the second end of the valve stem from the flow control element; and removing the valve stem from the stem bore.

20. The method of claim 19, comprising:

after removing the valve stem from the valve bore, inspecting, replacing, or inspecting and replacing, one or more contiguous packing rings on the second end of the valve stem;

positioning the shear bushing in the stem release position and passing the shear bushing through the stem opening toward the valve body, positioning the shear bushing between the bracket and the stem shoulder, inserting the valve stem through the stem bore, engaging the flow control element with the second end of the valve stem, and positioning the one or more packing rings in the packing bore; and rotating the shear bushing into the stem retention position.

21. The method of claim 20, comprising:

disengaging a gland flange from the valve body, prior to removing the valve stem from the stem bore; and after the inspecting, replacing, or inspecting and replacing the one or more contiguous packing rings, inserting the valve stem through the stem bore and positioning the one or more packing rings in the packing bore, positioning live loading springs between the gland flange and a packing gland, and securing the gland flange to the valve body to bias the packing gland against the one or more packing rings.

22. A method of assembling and disassembling a valve, comprising:

providing a valve body with a bracket supported from the valve body;

wherein a flow bore is formed through the valve body;

wherein a stem opening is formed through the bracket;

wherein a stem bore is formed in the valve body to the flow bore in alignment with the stem opening;

inserting valve trim through one end of the flow bore, wherein the valve trim comprises a flow control element, a downstream seat to form a seal between the valve body and the flow control element, and an upstream seat to bias the flow control element against the downstream seat, wherein the flow control element floats between the upstream seat and the downstream seat;

installing a retainer having an annular structure;

inserting a first end of a valve stem into a central bore of a shear bushing;

inserting the valve stem into the stem opening;

radially aligning the shear bushing with respect to the bracket in a stem release position wherein a bushing profile of the shear bushing cooperates with an opening profile of the stem opening for axial passage of the shear bushing through the stem opening;

axially positioning the shear bushing between the bracket and a stem shoulder on the valve stem;

inserting a second end of the valve stem into the stem bore to engage the flow control element;

rotating the shear bushing into a stem retention position wherein the bushing profile is offset from the opening profile and the bracket and the stem shoulder engage opposite surfaces of the shear bushing to retain the valve stem in the stem bore;

engaging a bushing retention member to secure the shear bushing in the stem retention position;

turning the valve stem to rotate the flow control element between open and closed positions;

disengaging the bushing retention member;

rotating the shear busing into the stem release position;

passing the shear bushing through the stem opening away from the valve body to disengage the second end of the valve stem from the flow control element and remove the valve stem from the stem bore;

removing the retainer from the one end;

removing the upstream seat assembly and the flow control element through the one end; and removing at least a portion of the downstream seat through the one end.

23. The method of claim 22, wherein inserting the valve trim through the one end comprises inserting a cartridge assembly comprising the flow control element, the upstream seat, and a sleeve to hold the flow control element and the upstream seat together in relative position for the insertion into the flow bore, and expanding the sleeve to release the flow control element to float between the upstream seat and the downstream seat.

24. The method of claim 22, comprising securing a downstream seat land in an entry bore to an outlet bore of the flow bore, disposing a downstream seat element between the flow control element and the downstream seat land to sealingly engage the flow control element and sealingly a engage opposing lapped surfaces formed on the downstream seat land and the flow control element.

25. The method of claim 22, comprising threadedly receiving a threaded element of the downstream seat in an entry bore to an outlet bore of the flow bore, and engaging an external polygonal cut profile of the downstream seat with a socket inserted through the inlet bore to rotate the threaded element.

26. The method of claim 22, comprising forming a seal between the upstream seat and the flow control element, and threadedly engaging the retainer in the one end of the flow bore.

* * * * *